US012673737B2

(12) United States Patent
Allaire et al.

(10) Patent No.: US 12,673,737 B2
(45) Date of Patent: Jul. 7, 2026

(54) CONTINUOUSLY VARIABLE HELICAL TRANSMISSION SYSTEM

(71) Applicant: MOBILITES MONDIALES INC., Saint-Lambert (CA)

(72) Inventors: Xavier Allaire, Saint-Lambert (CA); Gerard Noel, Sainte-Julie (CA)

(73) Assignee: Mobilités Mondiales Inc., Montreal (CA)

( * ) Notice: Subject to any disclaimer, the term of this patent is extended or adjusted under 35 U.S.C. 154(b) by 542 days.

(21) Appl. No.: 18/261,593

(22) PCT Filed: Jan. 14, 2022

(86) PCT No.: PCT/CA2022/050056
§ 371 (c)(1),
(2) Date: Jul. 14, 2023

(87) PCT Pub. No.: WO2022/150926
PCT Pub. Date: Jul. 21, 2022

(65) Prior Publication Data
US 2024/0317337 A1 Sep. 26, 2024

Related U.S. Application Data

(60) Provisional application No. 63/137,330, filed on Jan. 14, 2021.

(51) Int. Cl.
| | |
|---|---|
| *B62D 57/036* | (2006.01) |
| *F16L 55/32* | (2006.01) |
| *F16L 101/30* | (2006.01) |

(52) U.S. Cl.
CPC ............ *B62D 57/036* (2013.01); *F16L 55/32* (2013.01); *F16L 2101/30* (2013.01)

(58) Field of Classification Search
CPC ........... G01N 2291/044; G01N 29/265; G01N 29/225; B61B 13/125; F16L 55/26;
(Continued)

(56) References Cited

U.S. PATENT DOCUMENTS

| | | | |
|---|---|---|---|
| 2,174,717 A | 10/1939 | Caldwell et al. | |
| 3,866,538 A | * 2/1975 | Forsey, Jr. ............. | B66B 23/02 |
| | | | 104/167 |

(Continued)

FOREIGN PATENT DOCUMENTS

| | | | | |
|---|---|---|---|---|
| CN | 117128389 A | * 11/2023 | ............. | F16L 55/28 |
| CN | 118149205 A | * 6/2024 | ............. | F16L 55/40 |

(Continued)

OTHER PUBLICATIONS

International Search Report dated Apr. 14, 2022 in the corresponding International Patent Application No. PCT/CA2022/050056.
(Continued)

*Primary Examiner* — Paul N Dickson
*Assistant Examiner* — Maxwell L Meshaka

(57) ABSTRACT
A continuously variable helical transmission system comprising a frame, a central drive shaft configured to rotate about its longitudinal axis within the frame, and at least one angular wheel rotatably attached to the frame and configured to pivot about an axis being radial to the frame, wherein a longitudinal translation of the central drive shaft rotates the at least one angular wheel about the radial axis.

20 Claims, 36 Drawing Sheets

(58) Field of Classification Search
CPC . F16L 55/28; F16L 55/30; F16L 55/32; F16L 55/40; B62D 57/04; B62D 57/036; F16H 37/02
USPC .................................. 104/138.1, 138.2, 139
See application file for complete search history.

(56) References Cited

U.S. PATENT DOCUMENTS

| | | | | |
|---|---|---|---|---|
| 3,903,808 A * | 9/1975 | Foldes ................... | H02K 49/04 |
| | | | | 104/288 |
| 4,055,990 A * | 11/1977 | Topping ................ | G01B 17/02 |
| | | | | 73/635 |
| 4,891,972 A * | 1/1990 | Kawaguchi ......... | G01N 29/265 |
| | | | | 73/114.79 |
| 5,204,622 A * | 4/1993 | McCaslin ............ | G21C 17/017 |
| | | | | 376/245 |
| 5,574,223 A | 11/1996 | Kiefer | |
| 7,182,025 B2 * | 2/2007 | Ghorbel ................. | F16L 55/36 |
| | | | | 104/139 |
| 10,081,374 B2 | 9/2018 | Allaire | |

| | | | |
|---|---|---|---|
| 12,313,595 B2 * | 5/2025 | Wu .......................... | F16L 55/40 |
| 2016/0059868 A1 * | 3/2016 | Allaire ................... | B61C 13/00 |
| | | | 105/26.05 |
| 2020/0344392 A1 * | 10/2020 | Huang ................... | H04N 23/56 |
| 2023/0221284 A1 * | 7/2023 | Wu .......................... | F16L 55/40 |
| | | | 73/618 |
| 2024/0317337 A1 * | 9/2024 | Allaire ................... | F16H 37/02 |

FOREIGN PATENT DOCUMENTS

| | | | | | |
|---|---|---|---|---|---|
| KR | 101486017 B1 * | 1/2015 | .......... | G01N 29/265 |
| KR | 20230114983 A * | 8/2023 | .......... | B08B 9/0495 |
| WO | WO-2022150926 A1 * | 7/2022 | ............. | F16H 37/02 |

OTHER PUBLICATIONS

Geared or Hydromatic Pitch Pitch Change Mechanism—M17 Propellers, uploaded: May 14, 2015, A short 3D animated video demonstration of propeller blade pitch change mechanism by a hydromatic system, retrieved on Oct. 10, 2023, https://images.app.goo.gl/BHqEcqBUGXt3uKWU7.

* cited by examiner

125

ML

MYZ

MLF

MYZFA

MYZFB

CONTINUOUSLY VARIABLE HELICAL TRANSMISSION SYSTEM

CROSS-REFERENCE TO RELATED APPLICATIONS

The present patent application claims the benefits of priority of U.S. Provisional Patent Application No. 63/137,330, entitled "CONTINUOUSLY VARIABLE HELICAL TRANSMISSION SYSTEM", and filed at the United States Patent and Trademark Office on Jan. 14, 2021, the content of which is incorporated herein by reference.

FIELD OF THE INVENTION

The present invention generally relates to the field of variable helical traction or helical propulsion.

BACKGROUND OF THE INVENTION

There presently exists very few industrial solutions for helical drive propellers besides undedicated examples and applications in inspection piping and pipeline pigging wherein transportation by means of opened tubular pipes and tubes longitudinally in length as rails is considered. It is proposed herein that an innovative and efficient helical propulsion systems would render said transportation means far more desirable.

SUMMARY OF THE INVENTION

The shortcomings of the prior art are generally mitigated by a progressive helical traction and/or propulsion drive shaft acting as a continuously variable transmission system which can actuate either: a combination of helically actuating angular wheels to linearly actuated angular wheels about the inside of a tubular shaped rail while having both firstly a rotational plane radial to a drive shaft's central axis of rotation and secondly a rotational plane from within the central axis of rotation of a mechanised and motorized drive shaft; including possible inclusion of a helical to linear propulsion drive shaft capacity with the same rotational plane combination previously described for angular wheels respective to drive shaft but with the inclusion of aligned capacitors or aligning inductors being respectively field actuated or field inducted, or field actuating or field inducting, about a tubular guide shaped field or shaping field from a guiding rail following a pattern made for combination of variable helical traction or propulsion with angular wheels.

In this aspect, the inventive drive shaft is modular, variable, scalable and industrially suited for industrial production and industrial use. Its inventive design is essentially multi-configurable and practically endlessly modulable and combinable in order for the inventive drive shaft system's design to execute its main purposes being to provide both the function of a progressive traction and/or propulsion helical drive shaft system and the function of a continuously variable helical transmission.

In another aspect, the invention is said to be industrially modular because of its ability to be configurable into various displays and layouts of helical drive shaft designs which are variable namely in the dimensions, lengths, diameters and shapes, motorization and actuation. It is also modular and variable following namely the number of angular wheels or alike aligned capacitors or aligning inductors, the number and intercalating alternance of angular wheel rows or alike aligned capacitor or aligning inductor rows. It is also modular and variable following the number of drive and propulsion shafts being combined according to a displacement device attaching the helically driven shaft and thereby forming part of a transportation system functional unit of which the live load is being thereafter distributed and carried by means of the tubular railing assemblies where are comprised helical to linear displacement fields. It is modular and variable in order to suit any specific transportation function from being displaced by at least one transportation functional unit based on such drive shaft combinations and mostly. It is modular and variable so that all angular wheels or alike aligned capacitors or aligning inductors can variate and be assembled in order to be operated in respect to a given linear direction of the drive system with its transportation device with any given transportation functional embodiments and the functional unit configurations.

In another aspect, the inventive drive shaft is said to be functionally and industrially scalable because its design can be produced massively and thus from a simple and central assembly of miter gears, for example, associated per angular wheels, or alike mechanism, which can be scaled altogether with potential variations of dimensions of the diameter of the angular wheels and of the aligning inductors according to the internal diameter of the tubular rail assemblies or displacement fields.

In another aspect, the invention is said to be an industrial continuously variable helical transmission because of its simplicity. Indeed, the solution as described in the patent revolves around a simple design which implies at least one single drive shaft to actuate at least two intermediate and counteracting and engaging actuating elements. In the design, there is one central external fixed drive shaft bushing with a straight groove in the length of the drive shafts axis of rotation for the drive shaft's translation within the axis of rotation of the drive shaft. In the design, the drive shaft is solidary to the drive shaft rotation in its axis or rotation, which receives at two places-being the respective endings of one actuating stud solidary perpendicularly with the drive shaft-, and whose function is to make the drive shaft solidary with the drive shaft's axis of rotation. In the design, there is a central intermediate actuating element being immediate to the drive shaft, and between the later drive shaft centrally and the said central exterior fixed drive shaft bushing, there is an actuating cylindrical bushing with a helical groove engaged with the said actuating stud solidary perpendicularly with the drive shaft whose function is to: firstly, engage into a central miter gear; secondly, engage towards an angular wheel swiveling caster's miter gear and, thirdly, to rotate it from in the axis of rotation of the drive shaft at a 90 degree angle in order to, fourthly, articulate and define directly a variable position of angular position of at least one actuating angular wheel's miter gear or aligning inductor within an axis of rotation being radial to the central axis of the drive shaft, and; lastly, in order to generate the said continuously variable transmission function with angular wheels or aligning inductors engaged rotationally about the axis of rotation of the said drive shaft and made variably rotational radially to the axis or rotation of the said drive shaft to generate an infinitely progressive and variable helical drive displacement along tubular rail assemblies or displacement fields. In the design, the infinitely progressive and variable helical drive is operated along in a driving linear direction defined from a standpoint relative to an either clockwise or counter clockwise rotation of the drive shaft axis of rotation relative to the angular wheel's and aligning inductors' angular position within the internal diameter surface of the tubular rail assemblies. The internal diameter surface of the tubular rail assemblies constitutes and provides the main traction and propulsion cylindrically helical moment of force's orientation plane of engagement or along through the displacement and induction field's differentiating direction of electromagnetic and superconducting potentialities.

The inventive design achieves the function of the progressive linear speed and direction drive and as such by a variable transmission of the angular position of actuating and actuated elements, which will be explained in greater detail in the present application.

In another aspect, the invention is dedicated to the development of a modular, variable and scalable helical drive transmission mechanical solution which allows a resistance-free and continuously variable control of the angular orientation of at least one angular wheel's swiveling casted located about an axis of rotation radial to a rotative support shaft's axis of rotation and about which swiveling casters holding the angular wheels rotate about the central axis of rotation of the said rotative support shaft to generate a helical traction or propulsion.

Thereby, in another aspect, the invention can be said to be a modular, variable, scalable and industrial helical drive transmission engaged with a shaft design for angular wheels located along the length of the drive shaft into angular row designs, mostly intercalated angular row configurations for optimal distribution of helical traction, propulsion and transmission.

Thereby, in another aspect, the invention allows modular, variable, scalable and industrial helical driving transmissions to be driven within and along tubular shaped rails designed with an open circular cross sections which, by means of the drive shaft's displacement device holding the drive shafts rotationally and transmitting the load carried outside the tubular rail, beholds the central transmission shaft's axis of rotation in such way to allow the angular wheels' swiveling caster configured around the drive shaft to define the helical angular position variably and radially about the axis of rotation of the drive shaft in such way that the angular wheels can free rotate freely about their own axis of rotation while additionally being rotating about the axis of rotation of the drive shaft.

Thereby, in another aspect, the invention allows the displacement of goods and people along the path set by an open circular cross sectional rail assembly and within which the driving transmission translates and transmits mechanically the relative directions of resistances of the angular wheels' position to generate helical traction translated into a linear displacement of a helical drive system.

In yet another aspect, the invention discloses the engaging of at least one angular wheel's swiveling caster which is engaged in at least one opposing side of at least one swiveling caster in order to transmit and combine variably either clockwise or counter clockwise the required force moments, said opposing force moments, simultaneously and solidary with at least one common drive shaft and at least two intermediate and counteracting and engaging actuating elements.

In this aspect, the constituting rationale of the invention is firstly (1) to combine with engaging and solidary made actuating elements to at least one progressively driven, continuously variable and helically engaging angular wheel for its resistance-free variation, and secondly (2) with a design which is solidary and is not affected by the rotational force and inertia when at least one progressively variable and helically drivingly engaging angular wheel system is rotating about the axis of rotation of the central transmission shaft system and rotating about a radial axis to the axis of rotation of the drive shaft, and thirdly (3) to progressively variate the driving control in both terms of linear speed and of linear direction in such way that there is no variation of resistance applied to a main actuating drive shaft when the at least one angular wheel is drivingly engaged by the central transmission shaft system variably along the linear direction set by its natural displacement path defined as a helical motion and/or traction and/or propulsion pattern along the inner surface of a tubular shaped rail and/or along a linear to tubular driving tubular shaped rail, environment or field for helical propulsion.

In another aspect, the invention allows an innovative drive shaft and multiple actuating members defined with at least two intermediate and counteracting and engaging actuating elements centrally actuated by the said central drive shaft's actuating studs. The design is inventive as it allows a multiconfigurational and logical design which consists in modular rotational swiveling caster units, pairs and so forth forming angular wheel rows, and thus engaging within the central axis of rotation of the drive shaft, indirectly with a drive shaft's translational movement while within being solidary with the rotation plane of the drive shaft by means of straight grooves internally solidary to the drive shaft and into which the drive shaft's perpendicularly oriented and solidary actuating studs can translate along longitudinally the axis of rotation of the drive shaft in order for at least one helical groove bushing's rotational actuation while surrounding the drive shaft and around which there's a drive shaft or straight groove bushing's internal surface with a said straight groove longitudinal in the axis of rotation of the drive shaft and grooved internally from and comprised with at least one to two straight grooves engaged with at least one drive shaft's actuating stud, which by being actuating the helical groove from being translationally across the helical groove of at least one central rotative helical grooved bushing, allows and constrains the helical groove bushing to rotate while being solidary and engagingly geared from one of its cylindrical side edges to control neutrally, without resistance or variation of any given resistance as aforementioned, the combined and opposed force moments required for having at least one angular wheel swiveling caster variate from the underneath described interacting mechanism relating to the drive shaft movement, which located section underneath the swiveling caster is engaging with an engaging gear, as well in rotative in the radial axis of rotation to the drive shaft's axis of rotation, with one or both its sides interacting directly with at least one helical groove bushing's geared and engaging gears being intermediate between the drive shaft and drive shaft and which is counteracting with the actuating stud which is engaged translationally by the drive shaft actuation located centrally and within the inventive design drive shaft.

In another aspect, the invention further fills the room left for an industrially viable solution that enables the angular variation of angled wheels and other applicable helical propulsion systems. As well, the invention supplies the industrial requirements and demand for a helical drive system and transmission design contributing to alternative and innovative designs for a modular variable drive shaft helical drivers and propellers' drive shaft for infinitely progressive drive and continuously variable transmission that can be energy efficient and that can give way for a compact design to limit the inertia of the drive system, assure a smooth transmission variation of at least one to multiple sets of wheels compacted in the length of the rotor, and allow a maximal diameter of angular wheels for their lowest possible rounds per minute at higher speeds of rotation for a given round about the axis of rotation of the central transmission shaft in a tubular rail assembly with the outer diameter of the drive system defined by the angular wheels external edges and the inner diameter surface of a tubular rail assembly, both of which diameters are meant to be as optimally corresponding and engagingly fit as possible to allow an optimal angular wheel and central transmission shaft helical traction.

In another aspect, the invention further fills the room left for a variable pitch system that can variate along 180 degrees in respect to the degree of freedom of rotation of angular wheels set from a radial axis of rotation in respect to the axis of rotation of their support member being the central transmission shaft, in order to produce a progressive linear direction inversion at a continuously variable transmission rate, and with having the ability to progressively switch continuously and inversely the linear driving direction and the driving speed longitudinally along the axis of the rails. In this aspect, the angular wheels can be said to drive the direction and to determine the drive direction speed respectfully progressively and continuously from minus 90 degrees to plus 90 degrees, with having a middle angular position set at 0 degree to define an idling speed or a said stationary stopping of the drive system from its linear speed from either direction defined by the angular wheels in respect to the linear direction determined by the longitudinal driving orientation of the tubular rail assemblies and in respect to the direction of rotation of the central transmission shaft in its axis of rotation.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

The aforesaid and other objectives of the present invention are realized by generally providing a modular design for a main drive shaft drivingly engaging progressively at least one continuously variable angular wheel and/or induction actuators made rotatable around an radial axis to the central axis of rotation of a drive shaft and also made rotatable around the central axis of rotation one the central transmission shaft as a means of helical traction and propulsion system with the possibility of integrating other variable angular propulsion means.

In one aspect, there is a central transmission shaft in which at least one angular wheel's angular position is made progressively variable through a mechanical pattern combining and neutralizing at all times the overall force resistance and moments relating to the controlled rotation of at least one swiveling caster of at least one angular wheel, for example, for up to and over a 90 degrees rotation clockwise and anti clockwise by means of at least one drive shaft and at least with two intermediate and counteracting and engaging actuating elements to each sides of at least one swiveling caster of at least one angular wheel.

In such previous aspect, the invention allows thereby a controlled and resistance-free rotation of at least one swiveling caster comprised solidary of at least one angular wheel, for example, for up to and over a 90 degrees rotation clockwise and 90 degrees anti clockwise, thereby to act a resistance-free and continuously variable transmission in which the rotation of at least one angular caster about a respective axis radial to the central transmission shaft system.

In such previous aspect, the said pattern can be made configurable with more than one angular wheels at different positions, said sets of angular wheels or sets of helical propulsion means, along the length of the central transmission shaft, with at with at least one drive shaft and at least with two intermediate and counteracting and engaging actuating elements equivalent to reaching two opposing sides of at least one or more swiveling casters of at least one or more angular wheel wheels in order to combine and neutralize at all times the overall force resistance and moments relating to the controlled rotation of at least one or more swiveling casters of at least one or more angular wheels from the at least one main drive shaft and at least two intermediate and counteracting and engaging actuating elements equivalently reaching at least two opposing sides of at least one or more swiveling casters of at least one or more angular wheel wheels.

In another aspect, the progressive rotation and variation of the angular position and actuating induction defines a helical motion along the inner surface of a tubular shaped rail and the displacement and induction field differentiating direction of electromagnetic and superconducting potentialities relating with the tubular shaped rail which determines both continuously the linear speed and progressively the direction of the linear movement of the drive system as a whole in respect to the longitudinal axis of the tubular rails and the direction of rotation of the central transmission shaft which supports the angular wheels and/or induction actuators as they can reach plus 90 degrees or minus 90 degrees, set from a middle idling position defined as 0 degree in respect of the direction of the axis of rotation of the main drive shaft.

The features of the present invention which are believed to be novel are set forth with particularity in the appended claims.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

A novel continuously variable helical transmission system will be described hereinafter. Although the invention is described in terms of specific illustrative embodiments, it is to be understood that the embodiments described herein are by way of example only and that the scope of the invention is not intended to be limited thereby.

The figures of the present invention are classified in 9 categories of drawings.

Figure 1:
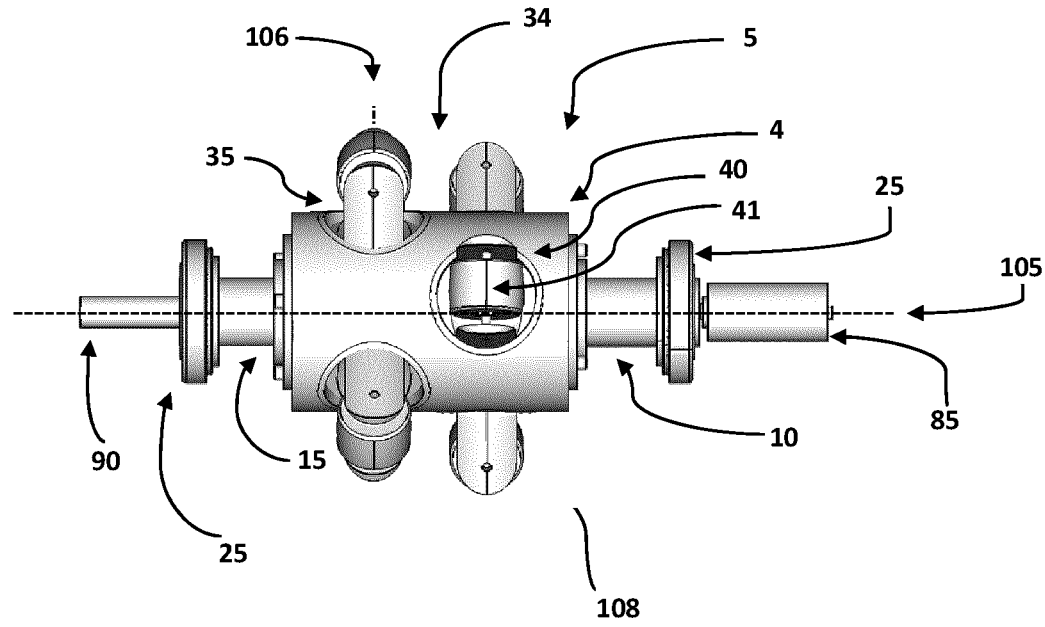
FIG. 1 is a schematic tridimensional lateral view of the whole central transmission shaft system in accordance with a particular embodiment according to FIGS. 23 and 24.
Figure 2:
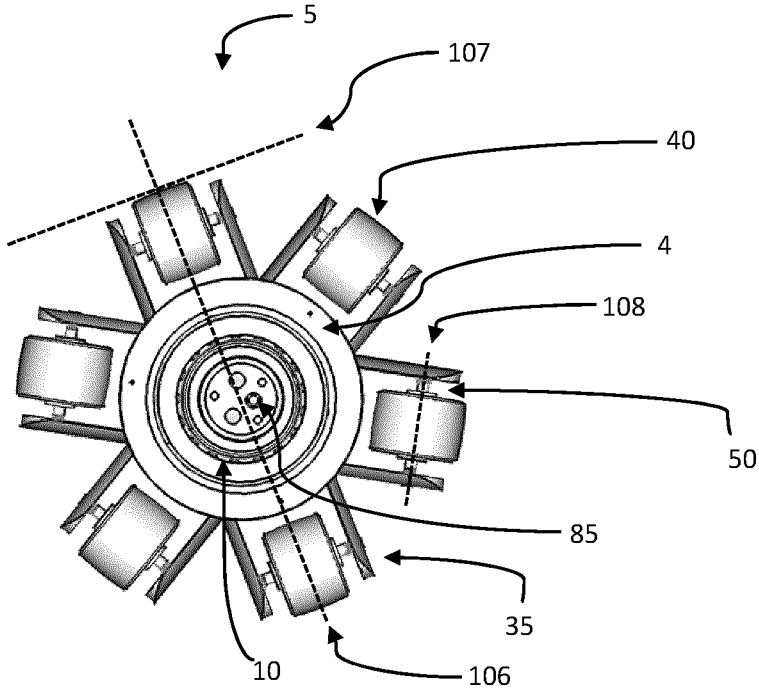
FIG. 2 is a schematic tridimensional view of the whole central transmission shaft system in accordance with a particular embodiment such as shown on FIG. 1.

The first category, covered firstly by FIGS. 1 and 2, presents respectively an overall lateral and overall face view of the central drive system 5.

Figure 3:
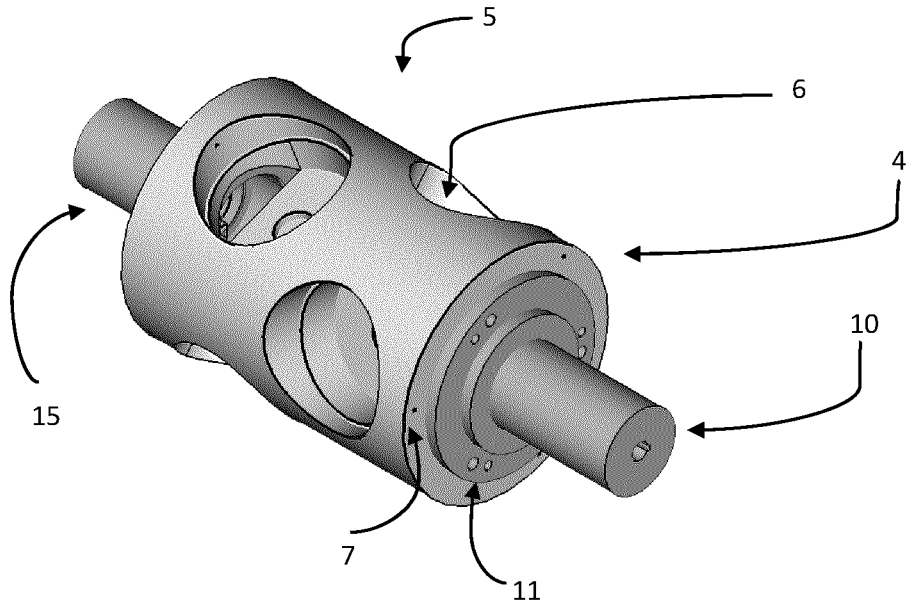
FIG. 3 is a schematic tridimensional view of the whole central transmission shaft system in accordance with a particular embodiment such as shown on FIG. 1.
Figure 4:
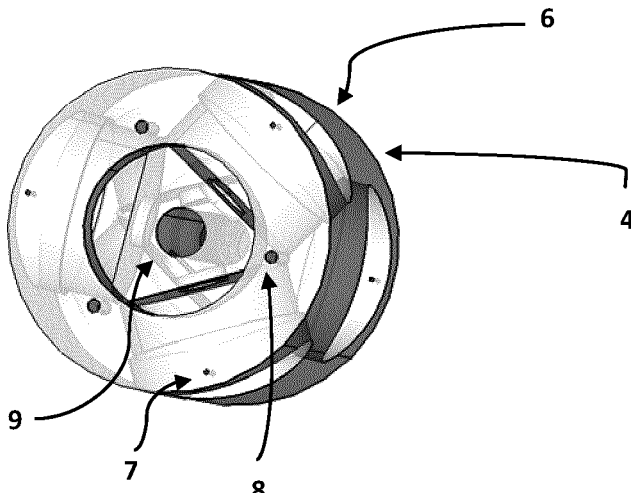
FIG. 4 is a cross-sectional schematic tridimensional view of the whole central transmission shaft system in accordance with a particular embodiment such as shown on FIG. 1.

In FIGS. 1 and 2, there is a central transmission shaft 5 which comprises a main supporting member 4, such as shown in greater detail in FIGS. 3 and 4.

The main supporting member 4 is a central part of the central transmission shaft 5. The main supporting member 4 supports an assembly of angular wheels 40 and/or aligning inductors 41 onto swiveling casters 35.

The central transmission shaft 5 comprises on both of its ends of two flanges 10 and 15, respectively on the motor 85 side and on the actuator 86 side.

The motor 85 can engagingly drive the central transmission shaft 5 either with being solidary with the flange 10 and/or 15 and/or directly with main supporting member 4 and/or the drive shaft 90, such as presented in FIG. 1, and in greater details in FIGS. 5 to 10.

The flanges 10 and 15 are comprised of fixation accesses 11 and 8 to secure with screws 20 the flanges 10 and 15 to main central support member 4 of the support shaft 5.

In FIGS. 3 and 4 the central transmission shaft is made of six rounded grooves said fixation base 6 which allow a rotation within and along of the swiveling casters 35.

Figure 23:
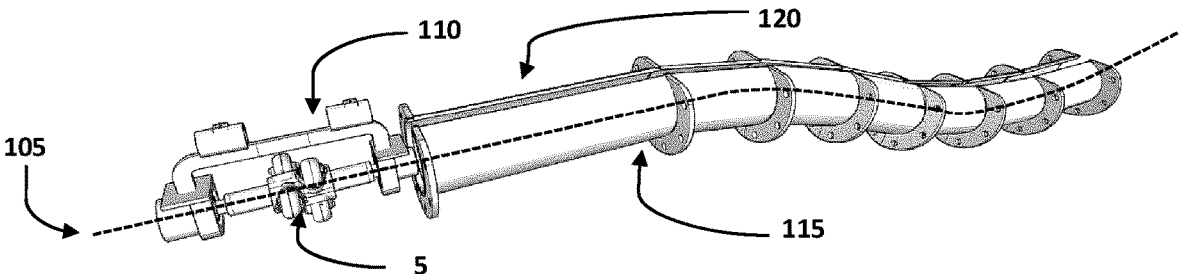
FIG. 23 is a schematic tridimensional view of the central transmission shaft system assembled in a transportation device apparatus for its helical propulsion along a single longitudinally cross-opened and tubular rail shaped guiding means in a particular embodiment of the central transmission shaft system such as shown on FIG. 1.
Figure 24:
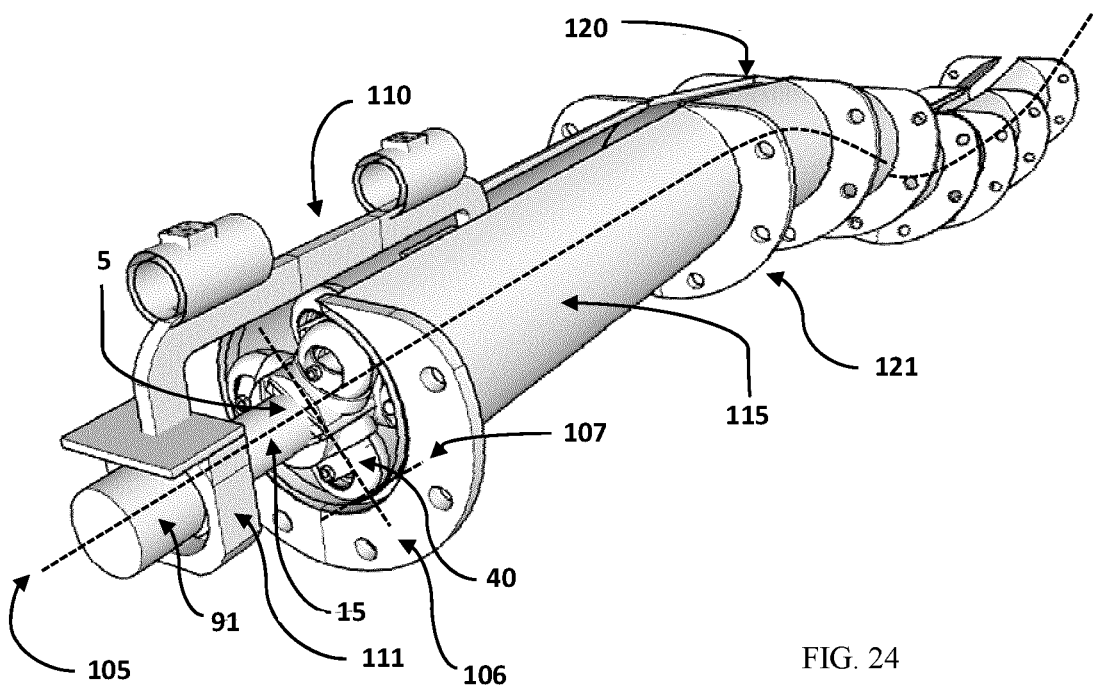
FIG. 24 is a schematic tridimensional view of the central transmission shaft system assembled in a transportation device apparatus for a single longitudinally cross-opened and tubular rail shaped guiding means in a particular embodiment of the central transmission shaft system such as shown on FIGS. 1 and 10.
Figure 25:
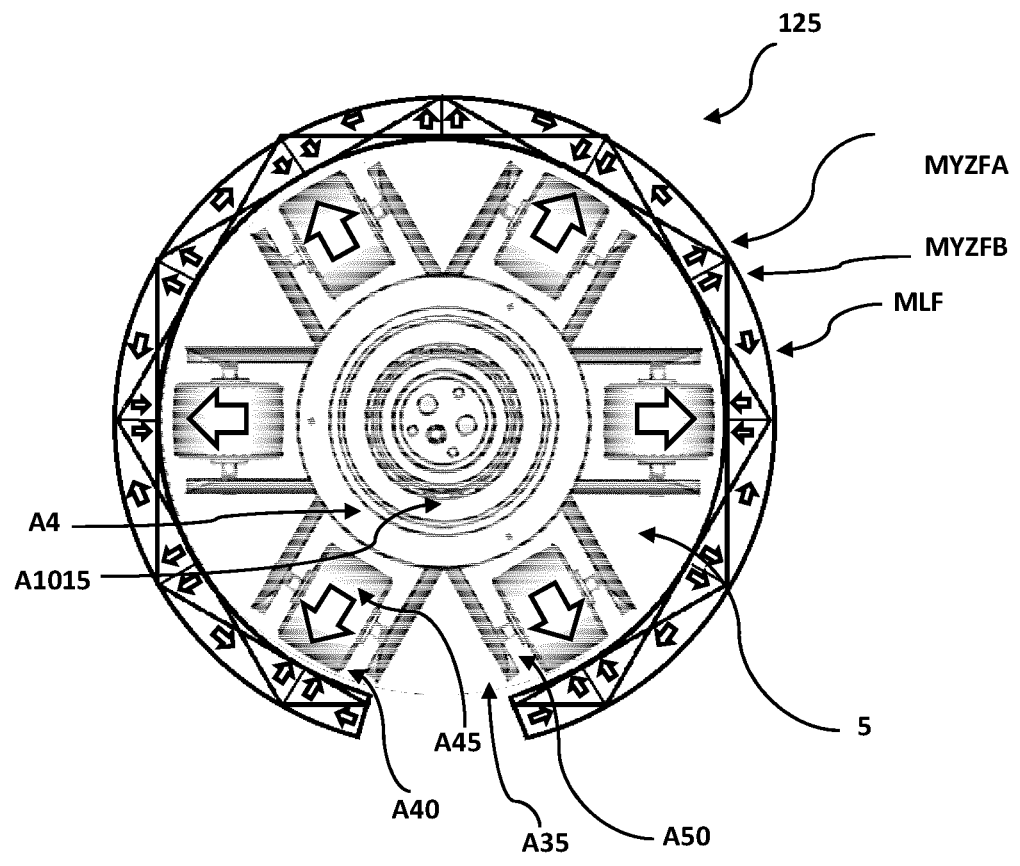
FIG. 25 is a lateral view of the design for the drive shaft and tubular rail with a displacement field apparatus.
Figure 26:
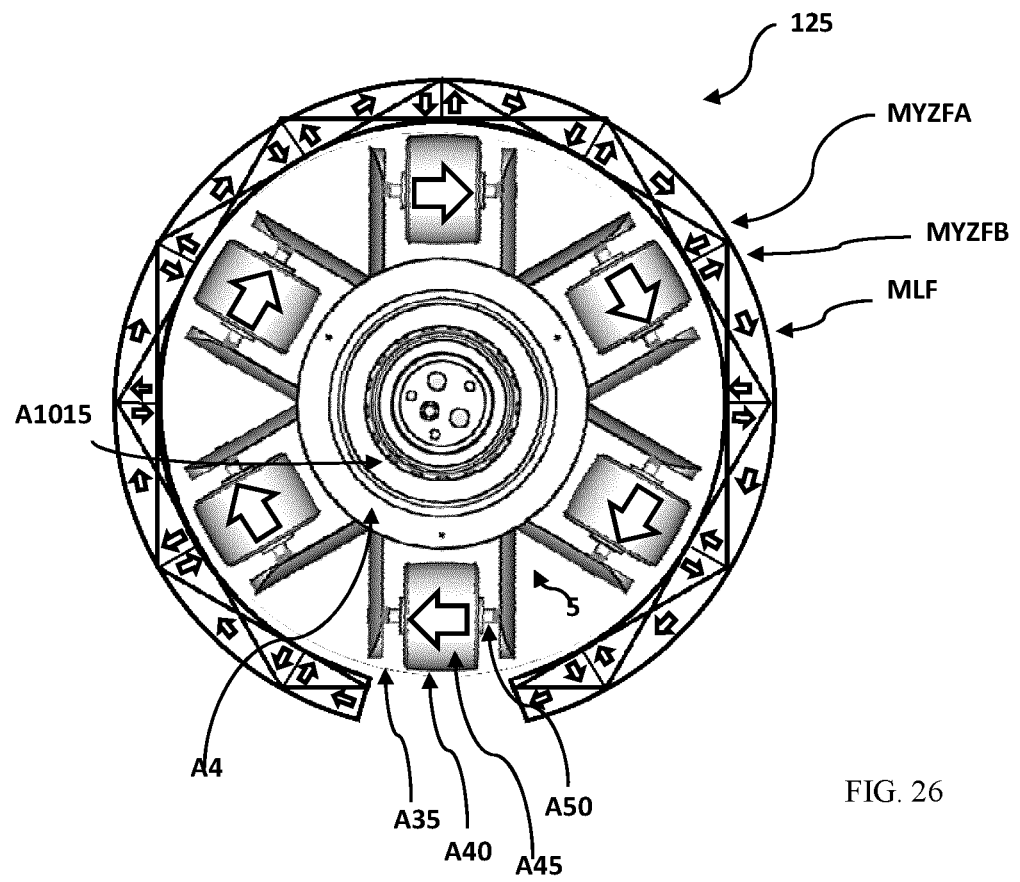
FIG. 26 is a lateral view of the design for the drive shaft and tubular rail with displacement field apparatus.
Figure 27:
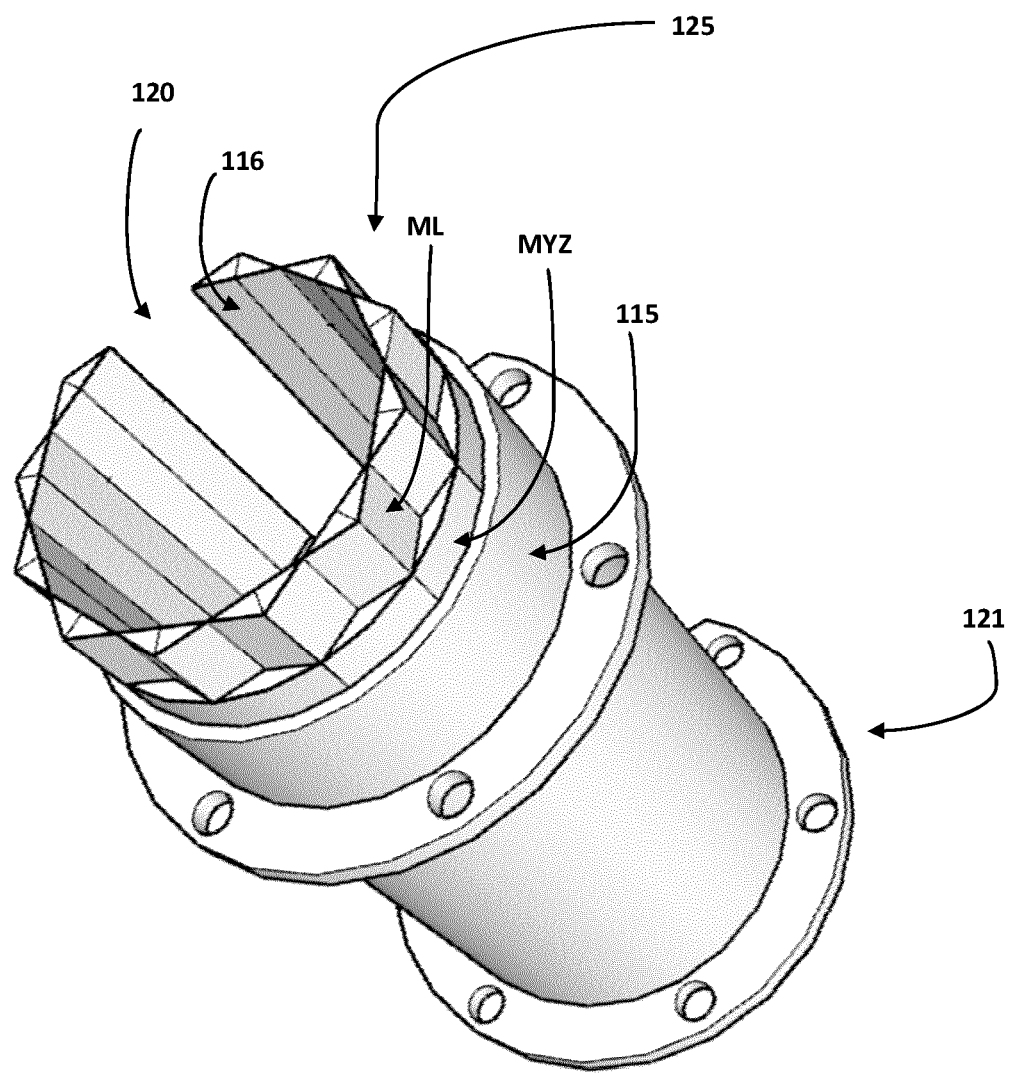
FIG. 27 is a schematic tridimensional view of the embodiment induction angular wheel and/or induction actuator mechanically and applied invention of a displacement and induction field differentiating direction of electromagnetic and superconducting potentialities within the particular embodiment such as shown on FIG. 1.
Figure 28:
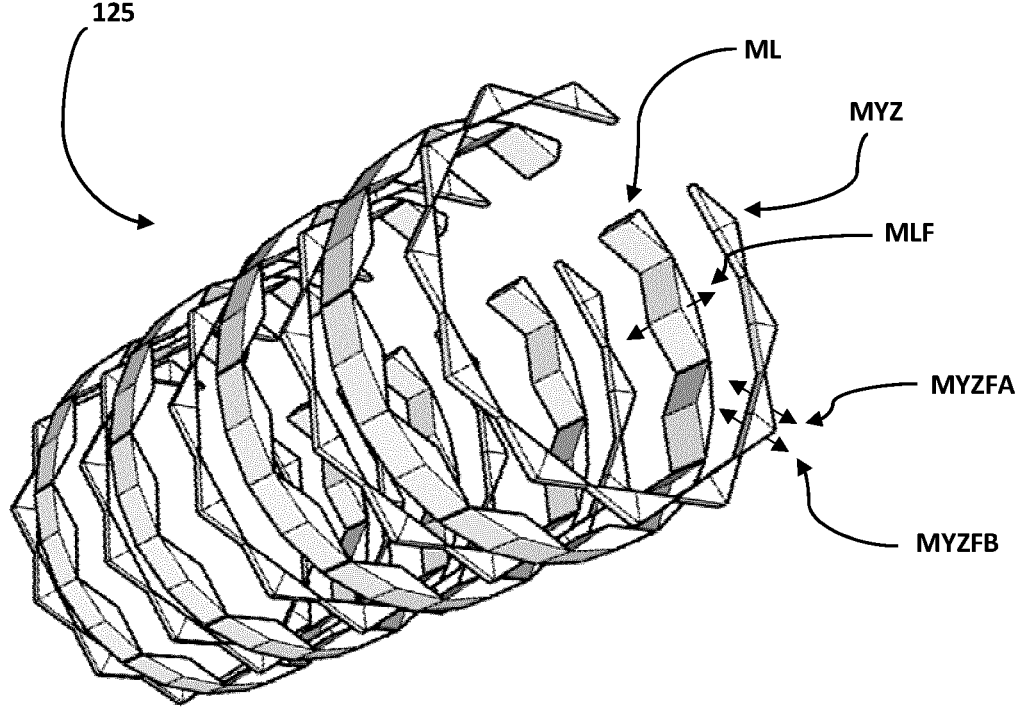
FIG. 28 is a schematic tridimensional view of the embodiment induction angular wheel and/or induction actuator mechanically and applied invention of a displacement and induction field differentiating direction of electromagnetic and superconducting potentialities within the particular embodiment such as shown on FIG. 1.
Figure 29:
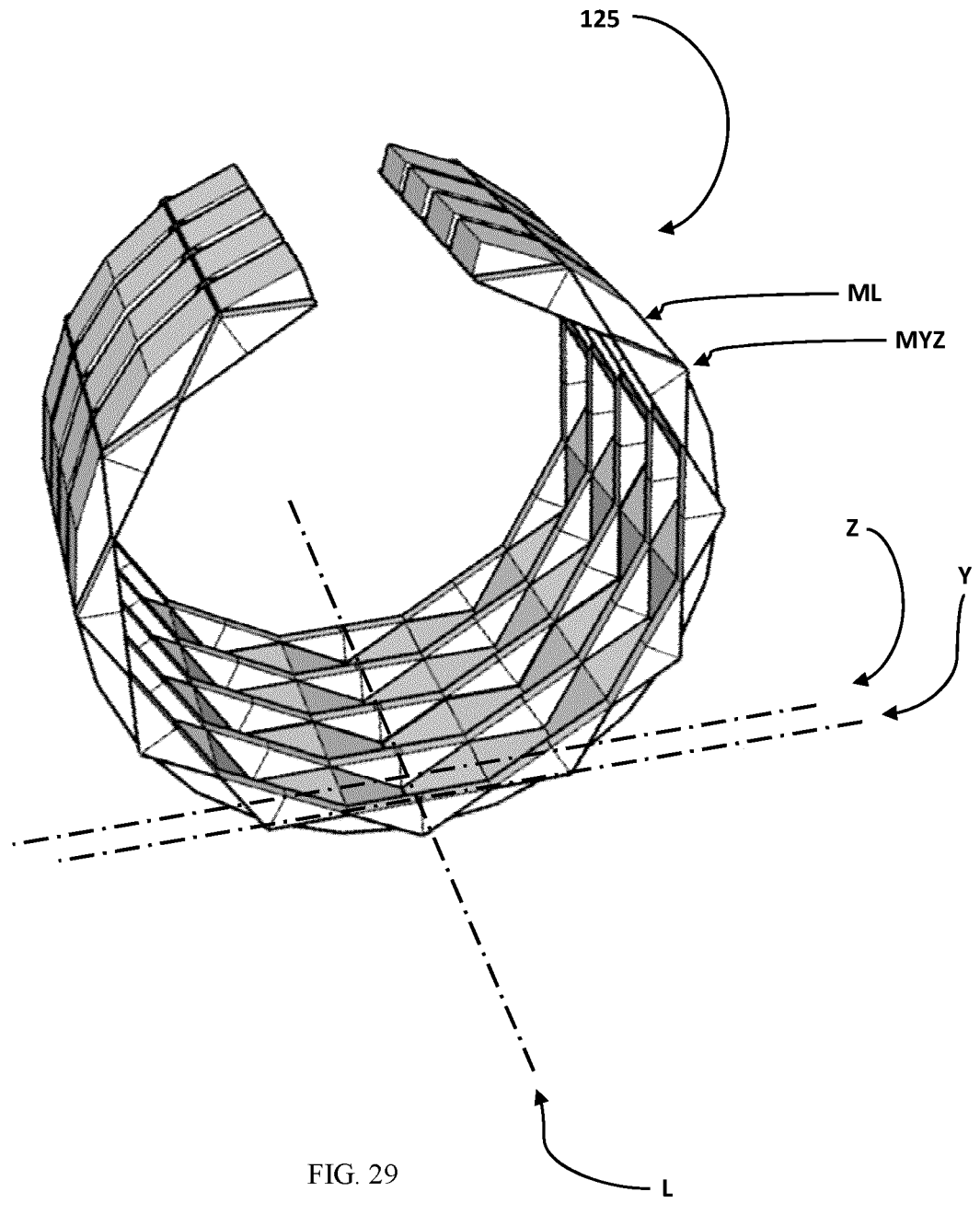
FIG. 29 is another schematic tridimensional view of the embodiment induction angular wheel and/or induction actuator mechanically and applied invention of a displacement and induction field differentiating direction of electromagnetic and superconducting potentialities within the particular embodiment such as shown on FIG. 1.
Figure 30:
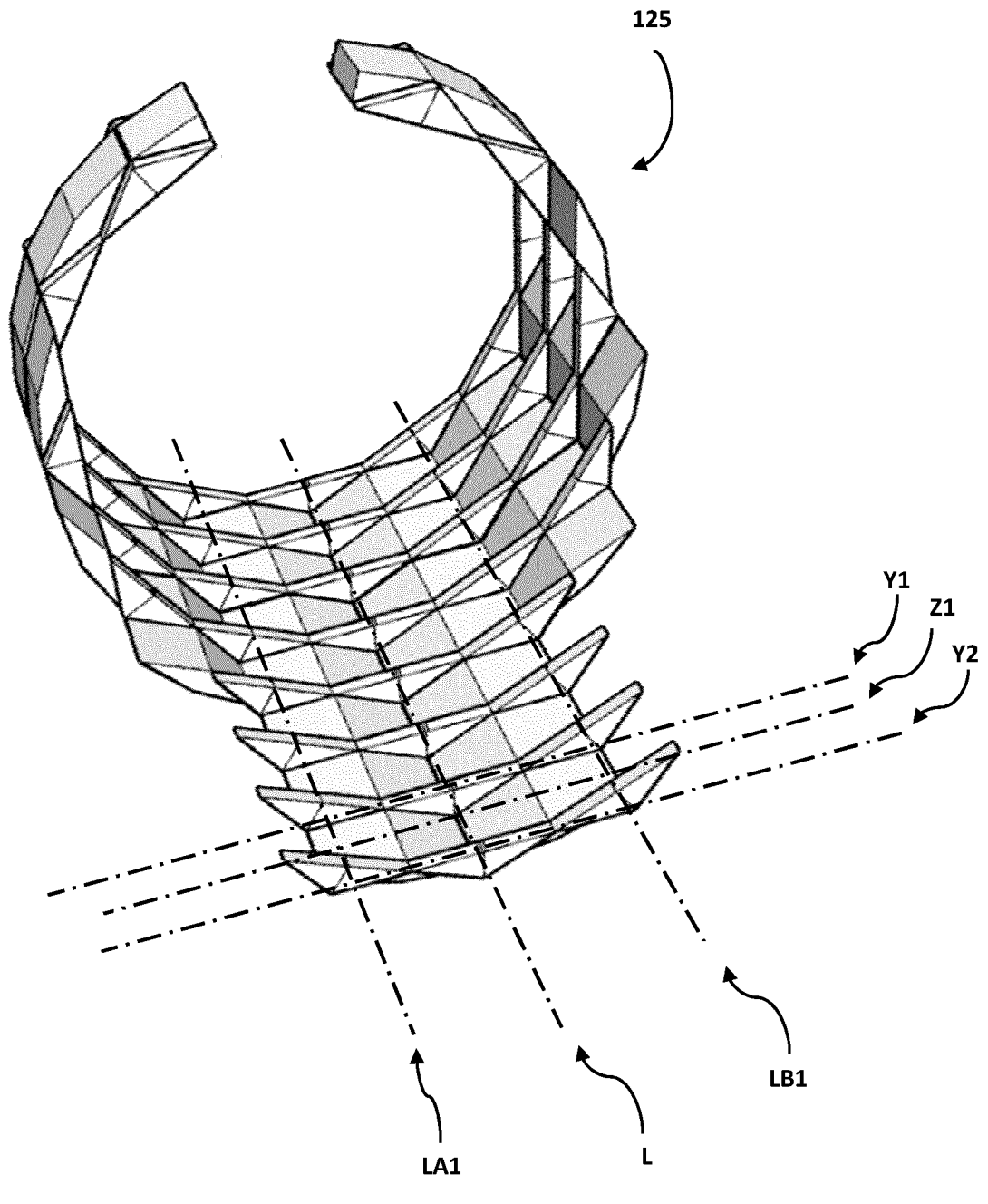
FIG. 30 is another schematic tridimensional view of the embodiment induction angular wheel and/or induction actuator mechanically and applied invention of a displacement and induction field differentiating direction of electromagnetic and superconducting potentialities within the particular embodiment such as shown on FIG. 1.

Referring now to FIGS. 1, 23 and 24, there is a displacement device 110 with a central transmission shaft 5 of which the embodiment holds the main drive shaft rotationally by means of intermediate bearing 25. And in the FIG. 1, there are bearings 25 onto and surrounding the flanges 10 and 15 on each side of the main supporting member to allow the free rotation of the central transmission shaft 5 in the axis 105 of rotation. In that embodiment, the main supporting member is being central and rotational within a guiding tubular rail 115, as shown FIGS. 23 and 24, and also compatible for the displacement and induction fields 125 forming differentiating direction of electromagnetic and superconducting potentialities.

Figure 8:
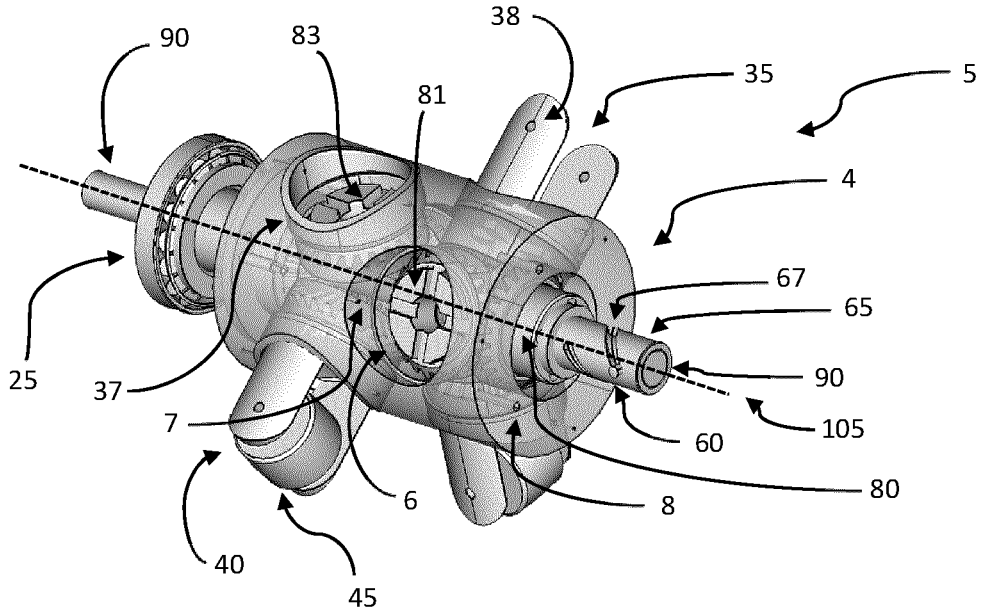
FIG. 8 is a schematic and cross-sectional tridimensional view of the central transmission shaft system with the mechanically applied inventive display within the particular embodiment such as shown on FIGS. 1, 3 and 4.

In FIGS. 3, 4 and 8, a swiveling caster fixation base set within through the central transmission shaft allows the swiveling caster to interact and to be secured with a said fixation access 39 and a retaining element 37 acting as a main retaining element.

In FIG. 2, the angular wheels 40 or induction actuators 41 are meant to rotate along their axis of rotation 108 relative to the angular wheel axle 50.

In FIGS. 2 and 24, the angular wheels 40 or induction actuators 41 are meant to rotate along their axis of rotation 105 relative to the central transmission shaft 5; or to be actuated about the L axis of linear inducting centerline and both Y and/or Z axis of radial inducting centerlines. The angular wheels 40 or induction actuators 41 are meant to be interacting with the main displacement moment of force 107. The interaction is being set by the common point of moment of force between angular wheel's most external diameter 103 interacting with inner surface of rail 115; or the moment of force of the aligning inductor actuating field 125 which allows the displacement induction field variations into differentiating direction of electromagnetic and superconducting potentialities such as defined in FIGS. 25 to 36.

In FIG. 8, the retaining element 37 is located around and within the main support member's fixation base 6.

Figure 9:
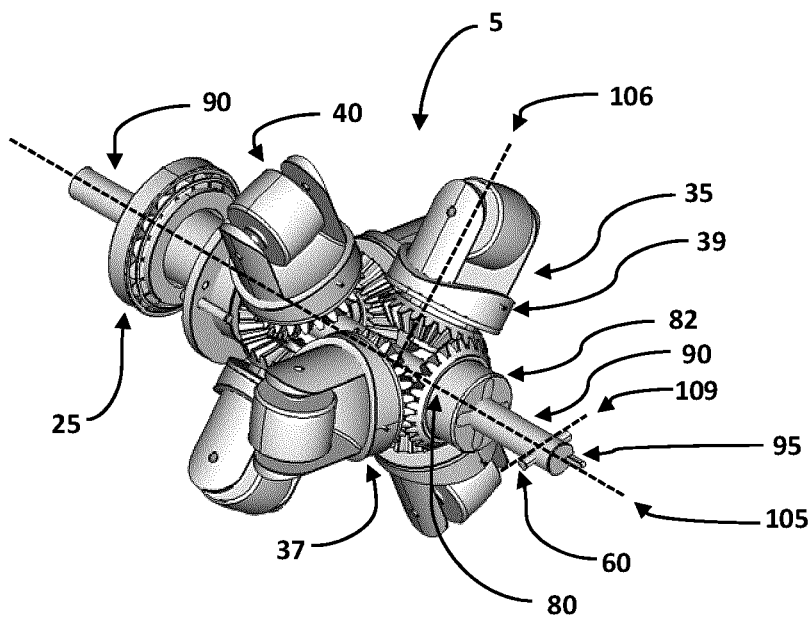
FIG. 9 is a schematic tridimensional view of the central transmission shaft system with only the mechanically applied inventive display within the particular embodiment such as shown on FIGS. 1,3, 5, 6, 7 and 8.

In FIGS. 2, 8 and 9, the wheel caster 35 and its bore 38 allow space and holds the angular wheel 40 axel and/or induction actuator 41 location to be solidary with variable caster orientation C in the axis 106 of rotation radial to the axis of rotation 105 of the main support member with the central transmission shaft.

The angular wheel 40 axel and/or induction actuator component 41 can thereby swivel about an axis 106, radial to axis 105, and remain solidary to main support member 4 of central transmission shaft 5, and rotate and align along in the axis 108 of the axel 50.

The angular wheel embodiment can be comprised of various and alternative coatings 45 according to the operational helical traction and/or propulsion drive meant to be generated.

Within and centrally across part of the main support member of the central transmission shaft, is located a flange fixation access of the central transmission shaft 8 for flanges 10 and 15 in relation to fixation access 11 and 8 that can be secured with screws 20.

Within and centrally across all of the main support member of the central transmission shaft, is located a central bore opening 9 of the central transmission shaft for the drive shaft 90.

Figure 5:
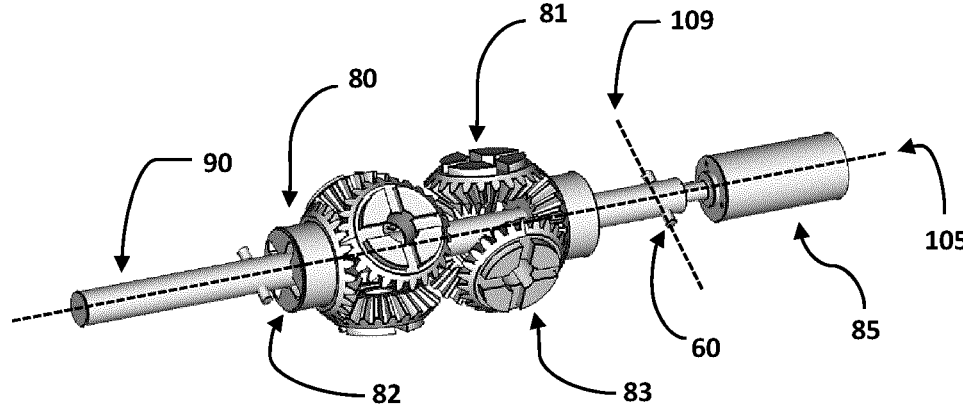
FIG. 5 is a schematic tridimensional view of the central drive shaft system mechanically applied invention within the particular embodiment such as shown on FIG. 1.
Figure 6:
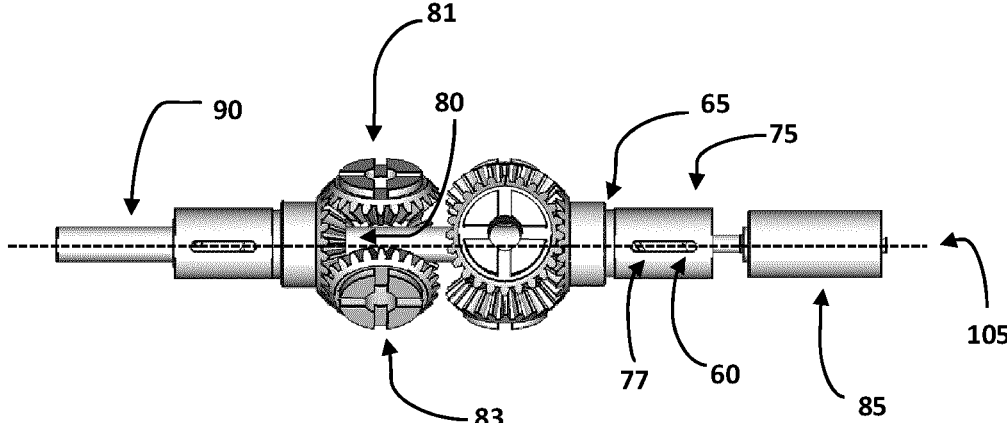
FIG. 6 is a schematic tridimensional view of the central drive shaft system mechanically applied within the particular embodiment such as shown on FIGS. 1 and 5.
Figure 7:
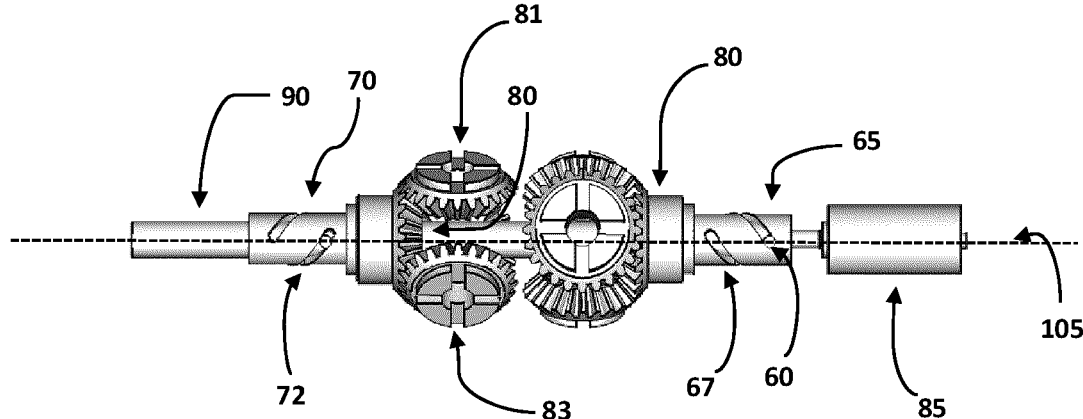
FIG. 7 is a schematic tridimensional view of the central drive shaft system mechanically applied invention within the particular embodiment such as shown on FIG. 1.
Figure 10:
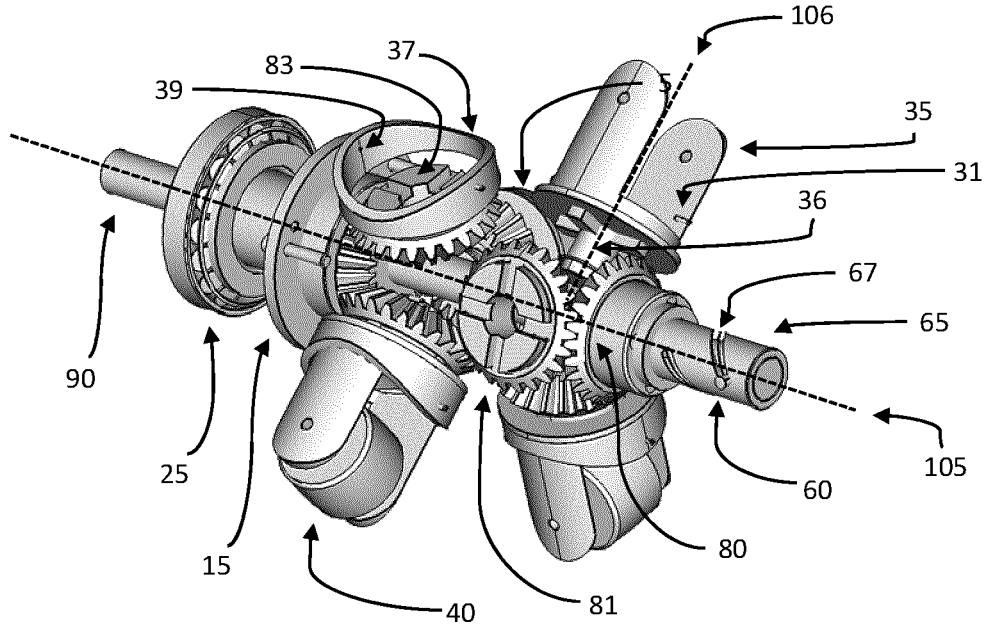
FIG. 10 is a schematic tridimensional view of the central transmission shaft system with only the mechanically applied inventive display within the particular embodiment such as shown on FIGS. 1,3, 5, 6, 8 and 9.

About the said bore 9 located within and centrally in the main support member can be located centrally a drive shaft, covered by FIGS. 5, 6 and 7, and covered by FIGS. 8, 9 and 10, around which there is a inventive design for a progressive drive of the angular wheels 40 and/or aligning inductor 41 onto swiveling caster. The design allows a continuously variable transmission of the swiveling casters with a modular and scalable set of angular wheel rows defined by at least one swiveling caster of at lest one angular wheel according to distance and location, such as defined in designs 150 to 157 of FIG. 12, and designs 205 to 1208 of FIGS. 13 to 22, all defined about a single central drive shaft 90 translational actuation along the central axis 105 of the central transmission shaft.

The second category, covered mainly by FIGS. 3 and 4, presents respectively a detailed lateral view of the main parts from of the central transmission shaft and an overall face view of the assembly of the angular wheels and swiveling casters.

The third category, covered by FIGS. 5, 6 and 7, presents the most central and internal embodiment of the invention which allows the actuation of the angular position of the angular wheels and/or induction actuators.

In those figures of the continuously variable helical transmission system within the central transmission shaft 5, there is translational displacement of the actuating drive shaft 90 with its actuating studs 60, which are rotating solidary within the axis of rotation of the central drive because of at least one straight groove 77 of a central external fixed drive shaft bushing 75. The said at least one straight groove of a central external fixed drive shaft bushing can either be independent or entirely solidary to the central transmission shaft, from which the actuating studs are firsthand located across, perpendicular and solidary with the drive shaft, and which the groove allows the a translational and guided displacement of the drive shaft plane longitudinally along axis 105 while being rotating rotationally around axis 105 within the plane of rotation of the central transmission shaft 5.

In the embodiment of FIGS. 5 to 10, there are 2 actuating studs and for each, one central external fixed drive shaft bushing around the drive shaft, and the studs are located within part of the flanges 10 or 15, and part of the supporting member of the central transmission shaft.

There is at least up to 180 degrees of rotation made possible for the angular wheels and according to their casters, in respect to the plane of rotation of axis 105. From the location of actuating stud, around the drive shaft, and from being surrounded and guided by a straight groove of the central external fixed drive shaft bushing being either independent or entirely solidary to the central transmission shaft, the studs can force simultaneously the actuation of a central right cam bushing cage 65 with helical groove 66 or a central left cam bushing cage 70 with helical groove 72, across which the studs 60, when translationally along axis 109 and displaced along longitudinally the axis 105, actuate rotationally such said bushing cage 65 and 72 either clockwise or counter clockwise.

The rotation of the cam bushing cages 65 and 70 are central and modular in themselves, can vary to carry functions of infinitely progressive drive and continuous variable transmission as described along designs 205 to 1208.

Figure 12:
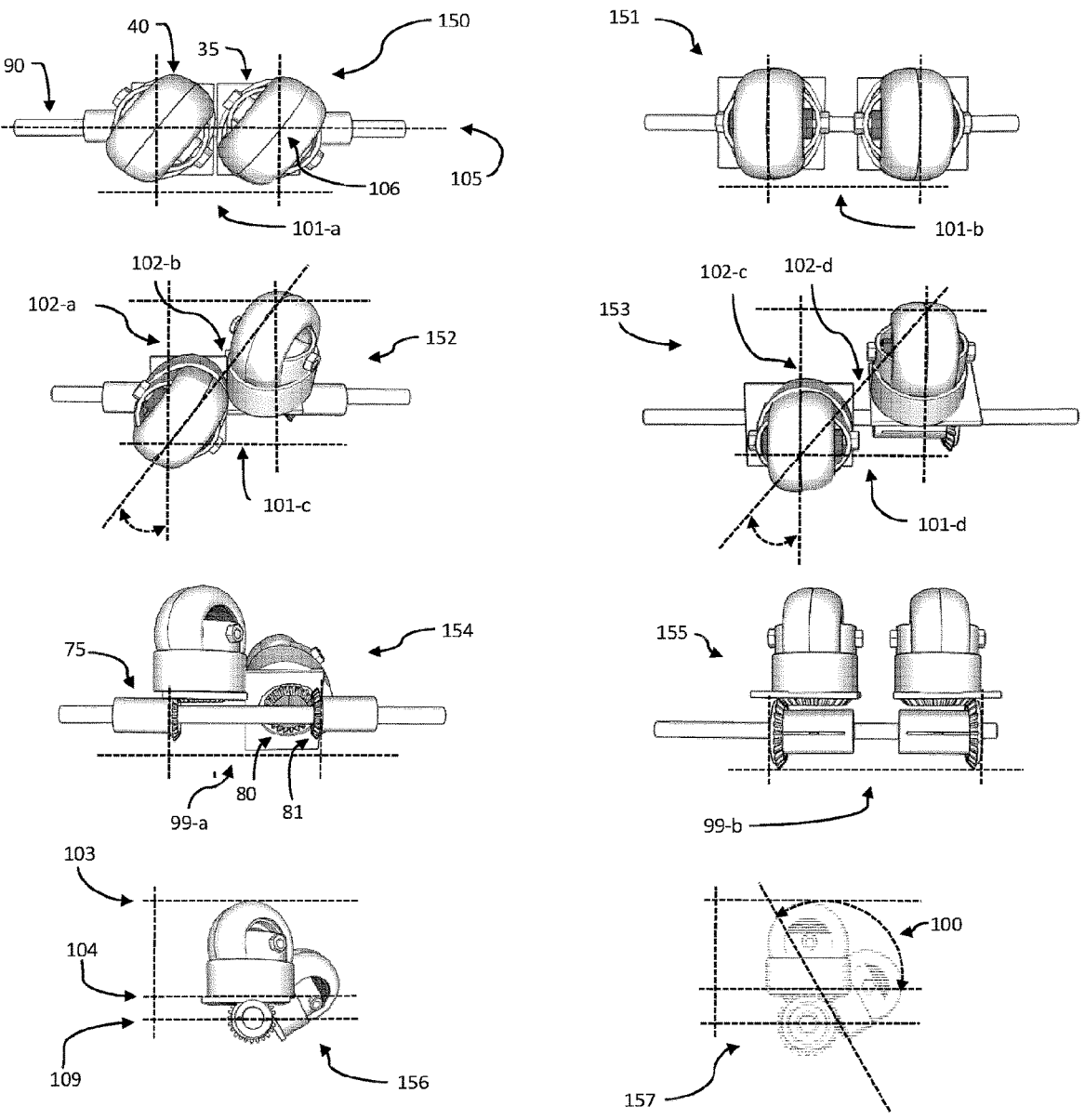
FIG. 12 is a schematic tridimensional view of the innovative embodiment in respect to distances characterizing the design of invention and its optimal display of functionalities.

The design revolves around a modular design suited for intercalated rows 34 of angular wheels 40 and/or aligning actuators 41 constituted of at least one angular wheel 40 in which with each one of the swiveling casters is being engaged respectively left and/or right laterally with a dual configuration and design of intercalated rows 34, This is demonstrated in FIGS. 1 to 10, where in which the central right and left external rotatable cam bushing cage configuration 65 and 70 are respectively solidary with at least one actuating miter gears 80 derived from design 154 and/or 155 of FIG. 12; and where in which, such as designs 205 to 1208 of FIGS. 12 to 22, there is at least one external rotatable bushing cage 65 or 70 functionally external and oriented respectively towards engaging within part of a solidary miter gear 80 engaging rotationally in the axis 105, on the one of the sides respectively of at least one caster 35. Furthermore, from one of the outer and/or inner limits of the distance and location 99-a and/or 99-b, there is an engagement mechanism made centrally and solidary with at least one miter gear 81, which is thereby made rotational in the axis 106 for the swiveling caster 35 in order to actuate its angular and/or aligning position being radial to axis 105 and engaged on either right and/or left sides respectively to at least one caster 35.

In respect to the logical layout of the embodiment of the drive shaft 90 displayed with external rotatable drive shaft bushings 65 and/or 70, actuated in respect to embodiment of FIGS. 5, 6 and 7, would consequentially actuate and generate, according the layout of the design 205 to 1208, applicable in all principles for the design as described with the drawings, a variable translational and linear displacement orientation of plane B to the right as defined in the design 205 to 1208 of FIGS. 13 to 22 by DBR.

The fourth category, covered by FIGS. 8, 9 and 10, presents both the central and internal embodiment of the invention which allows the actuation of the angular position of the angular wheels 40 and/or induction actuators 41 and the surrounding embodiment of the central transmission shaft 5.

From the aforementioned embodiment covered among FIGS. 5 to 10, there is on each external rotatable cam bushing cage 65 or 70, a side which, from the cylindrical edge of the bushing design of cam bushing cage 65 or 70, which is characterized by being formed of as a solidarization interface 66 and 71, respectively engaging solidary a another gear solidarization interface of the central of miter gear of the drive shaft, and thus which actuation actuates at least one miter gear 81 of the angular wheel 40 and/or induction actuator 41 from the miter gear 80 of central right and left cam bushing cages 65 and 70.

From the aforementioned embodiment covered among FIGS. 5 to 10, there is on each miter gear 81 of the angular wheel and/or induction actuator, as well as a Gear solidarization interface 83 of the miter gear 81 of the angular wheel and/or induction actuator, which is respectively engaging solidary another gear solidarization interface 36 from the swiveling caster which is engaging with solidarization interface of the miter gear 81 of the angular wheel and/or induction actuator.

The gear mechanism relating to gears 80 and 81 can be executed with other and equivalent designs, namely either from the interior or the exterior of said gears 80 and 81, and can thus be engaging with other types of gears such as bevel gears and other designs of actuation of the drive shaft 90 such as interacting along with at least one helical grooved rack, bevel gear and pinion.

Figure 11:
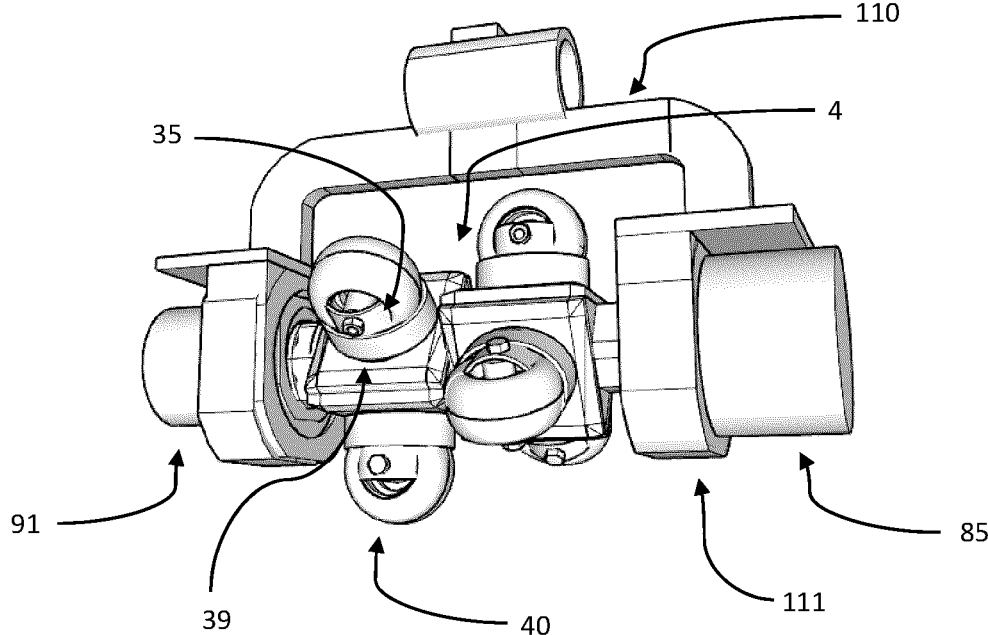
FIG. 11 is a schematic tridimensional view of the central transmission shaft system with only the mechanically applied inventive display within the particular embodiment such as shown on FIGS. 1,3, 5, 6, 7, 8 and 9.

The fifth category, covered by FIG. 11, presents an alternative embodiment design for the central transmission shaft 5 with alike internal design and surrounding embodiment to allows the actuation of the angular position of the angular wheels 40 and/or induction actuators 41.

There is the embodiment of FIG. 11 an actuator motor 91 located from the flange 15 and being solidary displacing the drive shaft 90 along longitudinally in the axis 105, but not necessarily also rotating within the axis of rotation axis.

The sixth category, covered by FIG. 12, presents the fundamental inventive aspects of the central transmission shaft 5 design from the standpoint of the location of the actuation mechanism relating to the drive shaft 90, and rotative cam bushing 65 and/or 70, and moreover from the distance defined from the location and direction of actuation of the swiveling casters 35 with respect to the aforementioned miter gear mechanism which allows the actuation of the angular position of the angular wheels 40 and/or induction actuators 41, and thus along designs 150 to 157 for modular intercalated possibilities of rows 34 of angular wheel 40 or induction actuator 41 rows defined by at least one swiveling caster of one angular wheel and/or inductor actuator according to a said distance and location 99-a or 99-b.

| | |
|---|---|
| 99-a | The closest distance between the two most external parts of at least two external rotatable cam bushing cages, ex. 65 and 70, with their actuated and actuating miter gear configurations along within the central transmission shaft 5, in dual combination and over when applicable, where in which the external rotatable cam bushing cages 65 and 70 are being external to the internal distance and location in 99-a for the 153 design (ex. more than one drive shaft bushing). |
| 99-b | The closest distance between the two most external parts of at least two external rotatable cam bushing cages, ex. 65 and 70, with their actuated and actuating miter gear configurations along within the central transmission shaft 5, in dual combination and over when applicable, where in which the external rotatable cam bushing cages are being partly or in whole internal within the distance and location in 99-b for the 155 design (ex. more than one drive shaft bushing). |
| 100 | Angle θ defined by the two radial axis defined by the axis of rotation 106 of at least two angular wheels 40 which are radial to the central transmission shaft axis of rotation 105, leading to the two extending points of distance 102-b or 102-d, and defined either with one row of at least two angular wheels, or by two rows of at | least two intercalating planes of two angular wheels moreover defined each by their swiveling caster's plane of rotation.

101 Distance between two rows of angular wheels crossing perpendicularly the centerline axis of rotation of two angular wheels swiveling casters orientation and the centerline axis of rotation of the central transmission shaft 102-a Closest distance defined by 102-a, for one row of at least two angular wheels or for at least two angular wheels located each onto two rows of intercalated angular wheels each along an intercalated radial orientation perpendicular to the axis of rotation 106 from of the central transmission shaft axis 105, such as located at distance 104, and thus distance 102-a defines the closest distance between two angular wheels' most external diameter centerline longitudinally along their respective in contact with the internal surface and diameter of the rail, such as defined by their radial lines of 107 along angle 100 of the intercalated dual angular row design 157.

102-b Closest diagonal distance defined by 102-b, being the distance generated by the later description of 102-a, but being diagonally in respect to said at least each one additional angular wheel from at least one set of intercalated rows of angular wheels on a given central transmission shaft (ex. Two intercalated rows of 3 angular wheels, each containing a total of 6 wheel sets can produce an hexagonal shaped pattern in respect to the 6 potential internal diameter common points of moments of force in the tubular rail at the (107) = the distance between two 107)

102-c Closest distance defined by 102-c, for one row of at least two angular wheels or for at least two angular wheels located each onto two rows of intercalated angular wheels each along an intercalated radial orientation perpendicular to the axis of rotation 106 from of the central transmission shaft axis 105, such as located at distance 104, and thus distance 102-c defines the closest distance between two angular wheels' most external diameter centerline longitudinally along their respective in contact with the internal surface and diameter of the rail, such as defined by their radial lines of 107 along angle 100 of the intercalated dual angular row design 157.

102-d Closest diagonal distance defined by 102-d, being the distance generated by the later description of 102-c, but being diagonally in respect to said at least each one additional angular wheel from at least one set of intercalated rows of angular wheels on a given central transmission shaft (ex. Two intercalated rows of 3 angular wheels, each containing a total of 6 wheel sets can produce an hexagonal shaped pattern in respect to the 6 potential internal diameter common points of moments of force in the tubular rail at the (107) = the distance between two 107)

103 Diameter of the angular wheel.

104 Distance set by the most internal diameter surface of the angular wheel relative to the axis of rotation, and the very axis of rotation of the central transmission shaft.

105 Axis of rotation of the central transmission shaft, of rail driving orientation, and axis of rotation of both central left and right bushing cages 65 and 70.

106 Axis and plane of rotation of the swiveling caster of the angular wheel radial to axis of rotation of central transmission shaft 107 Common point of moment of force between angular wheel most external diameter surface and rail internal diameter defined surface.

108 Axis of rotation of an angular wheel or of alignment of the induction actuators defined by the bore of its swiveling caster in respect to the longitudinal axis of rotation 105 of the central drive system 5.

109 Axis of translation relative along the drive shaft of the actuating pins which the displacement is guided by straight grooves 77 perpendicular to the axis 105 of the central transmission shaft 5.

150 Longitudinally to the central transmission shaft 5 axis of rotation 105, a compact design 150 for two angular wheel rows and more, according to distance 101-a.

151 Longitudinally to the central transmission shaft 5 axis of rotation 105, a design 150 with more space between two angular wheel rows according to design 150 and distance 101-b.

152 Radially to the central transmission shaft axis of rotation 105, a compact design 152 for two intercalated angular wheel rows and more, which according to the closest possible diagonal distance 102-b with the inventive compact design 152, can define the closest possible distance 101-c between at least two intercalated angular wheels' external diameters in contact with the internal surface and diameter of the rail in respect to the rail driving orientation in the axis of rotation 105, for at least two intercalated angular wheels' external diameters in contact with the internal surface and diameter of the rail such as defined by distance 102-a at angle 100, such as displayed in design 157, and thus when compared to design 153 in which a greater distance 102-d is proportional to a greater distance 101-d.

153 Radially to the central transmission shaft axis of rotation 105, a design 153 with more space between two angular wheel rows, and more, which according to greater distance 101-d of design 153, can define a more remote and greater distance 102-d for at least two intercalated angular wheels' external diameters in contact with the internal surface and diameter of the rail such as defined by distance 102-c at angle 100, such as displayed in design 157.

154 Longitudinally to the central transmission shaft 5 axis of rotation 105, a compact design 154 for two intercalated angular wheel rows, and more, such as in design 152, which according to distance 99-b, defines both the distance and location from the swiveling casters under which, among which and between which are interacting at least one or two and more cam bushing cages with helical grooves, like bushing cages 67 or 72, and thus with corresponding central miter gears -continued activated from the drive shaft 80, all rotationally in the axis of rotation of the central transmission shaft 105. The compact design 154 allows the location of the said bushings 67 and 72, to be external from the distance and location 99-b, thus, as displayed in design face angle 156, thus leaving room for swiveling caster to be closer from the axis of rotation 105 to lower inertia and thereby relatively increase energy efficiency; and as well allow maximal diameter of angular wheels 103 from a given rail internal diameter. Indeed the 154 design frees the most possible space along the radially defined distance between the rotation plane of the swiveling caster of the angular wheel 104 radial from the axis of translation of the drive shaft actuating studs 109 along the axis of rotation of the central drive 105 such as displayed by distance between 109 and 104 of the design 154 face view in design 156.

155 Longitudinally to the central transmission shaft 5 axis of rotation 105, a design 155 in which the distance and location defined by 99-b, between two aligned angular wheel rows with at least one angular wheel each, and more, is defined by having located within distance and location 99-b at least one cam bushing cage with miter gear located radially within the distance between the rotation plane of the swiveling caster of the angular wheel 104 located radially from the axis of translation of the drive shaft actuating studs 109 along the axis of rotation of the central drive 105 such as displayed by distance between 109 and 104 of the design 154 face view in design 156.

156 Radially from the axis of translation of the drive shaft actuating studs 109, a compact design 156, being a face view of design 154, displays at least two intercalated angular wheel rows and more, in which the distance is the lowest possible between the lower bottom of the rotation plane of the swiveling caster of the angular wheel 104 located radially from the axis of translation of the drive shaft actuating studs 109 along the axis of rotation of the central drive 105. Design 154 allows both lower inertia and greatest possible diameter of the angular wheels for a given internal diameter of tubular rail, when compared to design 155 when compared to face view of design 155 in design face view 157, which displays the said angle 100 formed by at least two angular wheels onto a given central transmission shaft 5.

157 Radially from the axis of translation of the drive shaft actuating studs 109, a design 157, being a face view of design 155, but with two intercalated angular wheels' external diameters to be in contact with the internal surface and diameter of the rail such as defined at angle 100, such as displayed in design 157 face view of design 155. Design 155 generates greater inertia and allows lower diameter of the angular wheels for a given internal diameter of tubular rail, when compared to design 154 face view in design 156 from design face view of 157 of design 155, which displays the said angle 100 formed by at least two angular wheels onto a given central transmission shaft 5.

The seventh category, covered by FIGS. 13 to 22, presents in the following respective order, designs 205, 206, 207, 208, 209, 210, 211, 212, 405, 406, 407, 408, 409, 410, 404, 412, 413, 414, 415, 416, 417, 418, 419, 420, 450, 451, 452, 453, 454, 455, 605, 606, 607, 608, 609, 610, 805, 806, 807, 808, 809, 810, 811, 812, 813, 814, 815, 816, 817, 818, 819, 820, 1005, 1006, 1007, 1205, 1206, 1207, 1208; which designs present all industrially suitable, inventive and non-evident designs from one row 34 of angular wheels 40 constituted into a one to six, and more, angular wheel 40 and/or inducting actuator 41 row designs along at least a one central transmission shaft 5 design driven in the rotational plane orientation A to the central drive system 5, and being rotational in the axis 106, radial to axis of rotation 105, namely for a displacement device 110 or 112 and embodiment from the designs ranging among 205 to 1208.

All inventive designs of the embodiments ranging among designs 205 to 1208 are always referred to a main design being either 205, 405, 450, 605, 805, 811, 815, 1005 or 1205, which determine the two main functions of the design of the central transmission shaft 5, being the infinitely progressive drive and continuously variable transmission of the angular wheels 40 and/or induction actuators 41 from the actuation of the drive shaft 90.

| | |
|---|---|
| A | Rotational plane orientation of the central drive system 5 radial to axis of rotation 105. |
| ACW | Clockwise direction of rotation of plane A of central drive system 5 in respect to the longitudinal axis of rotation 105 of the central drive system 5. |
| ACCW | Counterclockwise direction of rotation of plane A of central drive system 5 in respect to the longitudinal axis of rotation 105 of the central drive system 5. |
| B | Translational and linear displacement orientation plane from the driving and engaging relating defining a path of helical traction or propulsion transmission generated by actuating rotationally the axis 108 of the angular wheels or field actuated or actuating helical actuators, from direction of translation F of the drive shaft's translational actuating axis of translation 107 with its actuating studs 60, and generated from by actuating the rotational plane orientation of the central drive system 5 radial to axis of rotation 105 in order to transmit a translational displacement from the common point of moment of forces 107 defining a translation plane of orientation B of the whole drive system 5 with transportation device 110 along the longitudinal centerline axis of the rail and/or actuating or actuated helical leading or led field. |

-continued

| | |
|---|---|
| C | Variation of orientation axis and plane of rotation of angular wheels 40 defined by axis of rotation 106 |
| CL | Right variation of orientation axis and plane of rotation of angular wheels 40 defined by axis of rotation 106 as defined in the drawing. |
| CR | Left variation of orientation axis and plane of rotation of angular wheels 40 defined by axis of rotation 107 as defined in the drawing. |
| D | Direction of translational and linear displacement orientation plane B. |
| DBR | Right direction of the translational and linear displacement orientation plane B to the right as defined in the drawing. |
| DBL | Left direction of the translational and linear displacement orientation plane B to the left as defined in the drawing. |
| E | Speed of rotation of plane orientation A for a given time frame, (ex. RPM). |
| F | Direction of translation F of the drive shaft's translational actuating axis of translation 107. |
| FR | Right direction of translation F of the drive shaft's translational actuating axis of translation 107. |
| FL | Left direction of translation F of the drive shaft's translational actuating axis of translation 107. |
| 205 | Design 205 is a lateral view of one row 34 of angular wheels 40 constituted into a one angular wheel row design of a one central transmission shaft 5 design driven in the rotational plane orientation A to the central drive system 5 radial to axis of rotation 105 for a displacement device 110 and embodiment 406. |
| 206 | Design embodiment 206 is a schematic tridimensional view of design 205 with one row 34 of angular wheels 40 constituted into a one angular wheel row design of the central transmission shaft 5 driven in the rotational plane orientation A to the central drive system 5 radial to axis of rotation 105 and solidary to a same actuating drive shaft 90 with attachment device 110 and made alternatively possible namely by designs 154 and 155 of FIG. 12. |
| 207 | Design 207 is a lateral view of one row 34 of angular wheels 40 constituted of one angular wheel in which the one swiveling caster 35 is engaged left and right laterally with a dual configuration of the central right and left external rotatable cam bushing cage configuration 65 and 70 respectively solidary with two actuating miter gears 80 derived from design 154 of FIG. 12; where in which, such as design 208, there is one external rotatable bushing cage functionally external and oriented respectively towards engaging within part of one solidary miter gear 80 engaging on the left side respectively of the one caster 35 from the left outer limit of the distance and location 99-a towards engaging within centrally one miter gear 81 engaged on the left side respectively of the one caster 35 from the left; and where in which, such as design 209, there is one external rotatable bushing cage functionally external and oriented respectively towards engaging within part of one solidary miter gear 80 engaging on the right side respectively of the one caster 35 from the right outer limit of the distance and location 99-a towards engaging within centrally one miter gear 81 engaged on the right side respectively of the one caster 35 from the left; and which in respect to the logical layout of the embodiment of the drive shaft 90 displayed in design 207 with external rotatable drive shaft bushings actuated in respect to FIGS. 5, 6 and 7 and their descriptions, would consequentially actuate and generate, according the layout of the design 205, applicable in all principles for the design 207 a variable translational and linear displacement orientation of plane B to the right as defined in the design 205 of FIG. 13 by DBR. |
| 208 | Design 208 is a lateral view of one row 34 of angular wheels 40 constituted of one angular wheel in which the one swiveling caster 35 is engaged left laterally with a single configuration of the central left external rotatable cam bushing cage configuration 65 respectively solidary with one actuating miter gear 80 derived from design 154 of FIG. 12; where in which, such as in part of design 207, there is one external rotatable bushing cage functionally external and oriented respectively towards engaging within part of a solidary miter gear 80 engaging on the left side respectively of the one caster 35 from the left outer limit of the distance and location 99-a towards engaging within centrally one miter gear 81 engaged on the left side respectively of the one caster 35 from the left; and which in respect to the logical layout of the embodiment of the drive shaft 90 displayed in design 208 with external rotatable drive shaft bushings actuated in respect to FIGS. 5, 6 and 7 and their descriptions, would consequentially actuate and generate, according the layout of the design 205, applicable in all principles for the design 208 a variable translational and linear displacement orientation of plane B to the right as defined in the design 205 of FIG. 13 by DBR. |
| 209 | Design 209 is a lateral view of one row 34 of angular wheels 40 constituted of one angular wheel in which the one swiveling caster 35 is engaged right laterally with a single configuration of the central right external rotatable cam bushing cage configuration 70 respectively solidary with one actuating miter gear 80 derived from design 154 of FIG. 12; where in which, such as in part of design 207, there is one external rotatable bushing cage functionally external and oriented respectively towards engaging within part of a solidary miter gear 80 engaging on the right side respectively of the one caster 35 from the right outer limit of the distance and location 99-a towards |

Figure 13:
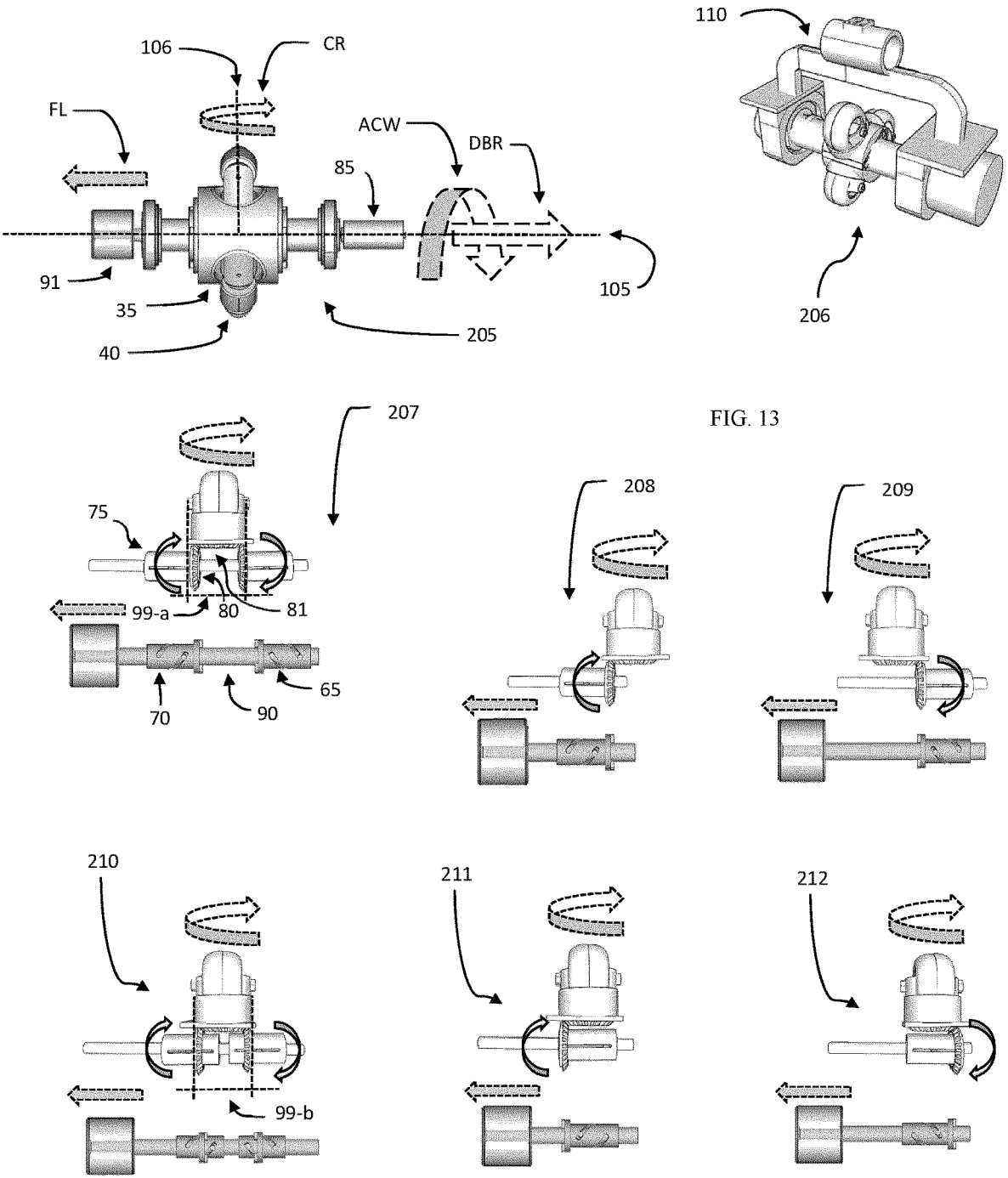
FIG. 13 is a category schematic tridimensional view.

-continued engaging within centrally one miter gear 81 engaged on the right side
respectively of the one caster 35 from the left; and which in respect to the
logical layout of the embodiment of the drive shaft 90 displayed in design
209 with external rotatable drive shaft bushings actuated in respect to FIGS.
5, 6 and 7 and their descriptions, would consequentially actuate and
generate, according the layout of the design 205, applicable in all principles
for the design 209 a variable translational and linear displacement
orientation of plane B to the right as defined in the design 205 of FIG. 13
by DBR.

210    Design 210 is a lateral view of one row 34 of angular wheels 40 constituted
       of one angular wheel in which the one swiveling caster 35 is engaged left
       and right laterally with a dual configuration of the central right and left
       external rotatable cam bushing cage configuration 65 and 70 respectively
       solidary with two actuating miter gears 80 derived from design 155 of FIG.
       12; where in which, such as design 211, there is one external rotatable
       bushing cage functionally, partly or in whole, internal and oriented
       respectively towards engaging within part of one solidary miter gear 80
       engaging the left side respectively of the one caster 35 from within the left
       outer limit of the distance and location 99-b towards engaging within
       centrally with one miter gear 81 engaged on the left side respectively of the
       one caster 35 from the left; and where in which, such as design 212, there is
       one external rotatable bushing cage functionally, partly or in whole, internal
       and oriented respectively towards engaging within part of one solidary miter
211    gear 80 engaging the right side respectively of the one caster 35 from within
       the right outer limit of the distance and location 99-b towards engaging
       within centrally with one miter gear 81 engaged on the right side
       respectively of the one caster 35 from the left; and which in respect to the
       logical layout of the embodiment of the drive shaft displayed in design 210
       with external rotatable drive shaft bushings actuated in respect to FIGS. 5, 6
       and 7 and their descriptions, would consequentially actuate and generate,
       according the layout of the design 205, applicable in all principles for the
       design 210, a variable translational and linear displacement orientation of
       plane B to the right as defined in the drawing by DBR.
       Design 211 is a lateral view of one row 34 of angular wheels 40 constituted
       of one angular wheel in which the one swiveling caster 35 is engaged left
       laterally with a single configuration of the central external rotatable cam
       bushing cage configuration 65 or 70 respectively solidary with one actuating
       miter gear 80 derived from design 155 of FIG. 12; where in which, such as
       in part of design 210, there is one external rotatable bushing cage
       functionally, partly or in whole, internal and oriented respectively towards
       engaging within part of one solidary miter gear 80 engaging the left side
       respectively of the one caster 35 from within the left outer limit of the
       distance and location 99-b towards engaging within centrally with one miter
       gear 81 engaged on the left side respectively of the one caster 35 from the
       left; and which in respect to the logical layout of the embodiment of the
       drive shaft displayed in design 211 with external rotatable drive shaft
       bushings actuated in respect to FIGS. 5, 6 and 7 and their descriptions,
       would consequentially actuate and generate, according the layout of the
       design 205, applicable in all principles for the design 211, a variable
       translational and linear displacement orientation of plane B to the right as
       defined in the drawing by DBR.

212    Design 212 is a lateral view of one row 34 of angular wheels 40 constituted
       of one angular wheel in which the one swiveling caster 35 is engaged left
       laterally with a single configuration of the central external rotatable cam
       bushing cage configuration 65 or 70 respectively solidary with one actuating
       miter gear 80 derived from design 155 of FIG. 12; where in which, such as
       in part of design 210, there is one external rotatable bushing cage
       functionally, partly or in whole, internal and oriented respectively towards
       engaging within part of one solidary miter gear 80 engaging the right side
       respectively of the one caster 35 from within the right outer limit of the
       distance and location 99-b towards engaging within centrally with one miter
       gear 81 engaged on the right side respectively of the one caster 35 from the
       left; and which in respect to the logical layout of the embodiment of the
       drive shaft displayed in design 212 with external rotatable drive shaft
       bushings actuated in respect to FIGS. 5, 6 and 7 and their descriptions,
       would consequentially actuate and generate, according the layout of the
       design 205, applicable in all principles for the design 212, a variable
       translational and linear displacement orientation of plane B to the right as
       defined in the drawing by DBR.

405    Design 405 is a lateral view of two intercalated rows 34 of angular wheels
       40 constituted into a two intercalated angular wheel row design of a one
       central transmission shaft 5 design driven in the rotational plane orientation
       A to the central drive system 5 radial to axis of rotation 105 for a
       displacement device 110 and embodiment 406.

406    Design embodiment 406 is a schematic tridimensional view of design 404
       with two intercalated rows 34 of angular wheels 40 constituted into a two
       interspersed angular wheel row design of the central transmission shaft 5
       driven in the rotational plane orientation A to the central drive system 5
       radial to axis of rotation 105 and solidary to a same actuating drive shaft 90 with attachment device 110 and made alternatively possible namely by designs 154 and 155 of FIG. 12.

Figure 14:
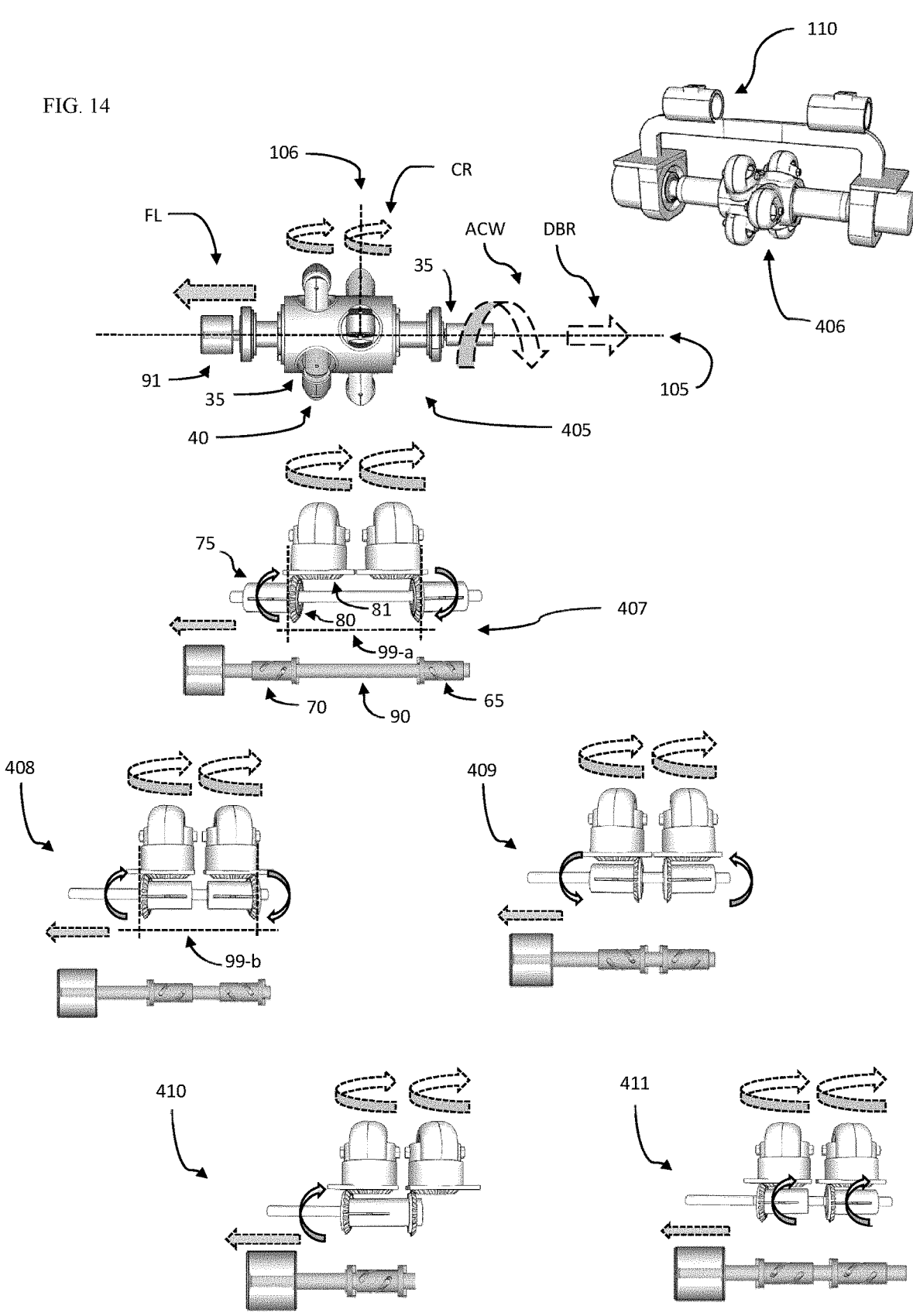
FIG. 14 is a logical set of schematic tridimensional views.

407    Design 407 is a lateral view of two intercalated rows 34 of angular wheels 40 constituted of two angular wheels in which each one of the swiveling casters 35 is engaged respectively left and right laterally with a dual configuration of the central right and left external rotatable cam bushing cage configuration 65 and 70 respectively solidary with two actuating miter 408    gears 80 derived from design 154 of FIG. 12; where in which, such as design 207 of FIG. 13, there is one external rotatable bushing cage functionally external and oriented respectively towards engaging within part of a solidary miter gear 80 engaging on the left side respectively of the one caster 35 from the left outer limit of the distance and location 99-a towards engaging within centrally one miter gear 81 engaged on the left side respectively of the first caster 35 from the left; and where in which, such as design 209, there is one external rotatable bushing cage functionally external and oriented respectively towards engaging within part of a solidary miter gear 80 engaging on the right side respectively of the one caster 35 from the right outer limit of the distance and location 99-a towards engaging within centrally one miter gear 81 engaged on the right side respectively of the second caster 35 from the left; and which in respect to the logical layout of the embodiment of the drive shaft displayed in design 407 with external rotatable drive shaft bushings actuated in respect to FIGS. 5, 6 and 7 and their descriptions, would consequentially actuate and generate, according the layout of the design 405, applicable in all principles for the design 407, a variable translational and linear displacement orientation of plane B to the right as defined in the design 405 of FIG. 14 by DBR.

Design 408 is a lateral view of two intercalated rows 34 of angular wheels 40 constituted of two angular wheels in which each one of the swiveling casters 35 is engaged respectively right and left laterally from the inside with a dual configuration of the central right and left external rotatable cam bushing cage configuration 65 and 70 respectively solidary with two actuating miter gears 80 derived from design 155 of FIG. 12; where in which, such as deriving from design 211 of FIG. 13, there is one first external rotatable bushing cage functionally, partly or in whole, internal and oriented respectively towards engaging within part of one solidary miter gear 80 engaging on the left side respectively the first caster 35 from within the left outer limit of the distance and location 99-b towards engaging within centrally one miter gear 81 engaged on the left side respectively of a first caster 35 from the left; and where in which, such as deriving from design 212 of FIG. 13, there is one second external rotatable bushing cage functionally, partly or in whole, internal and oriented respectively towards engaging within part of one solidary miter gear 80 engaging the right side respectively of the second caster 35 from within the right outer limit of the distance and location 99-b towards engaging within centrally one miter gear 81 engaged on the right side respectively of the second caster 35 from the left; and which in respect to the logical layout of the embodiment of the drive shaft displayed in design 408 with external rotatable drive shaft 90 bushings actuated in respect to FIGS. 5, 6 and 7 and their descriptions, would consequentially actuate and generate, according the layout of the design 405, applicable in all principles for the design 408, a variable translational and linear displacement orientation of plane B to the right as defined in the drawing by DBR.

409    Design 409 is a lateral view of two intercalated rows 34 of angular wheels 40 constituted of two angular wheels in which each one of the swiveling casters 35 is engaged respectively right and left laterally from the inside with a dual configuration of the central right and left external rotatable cam bushing cage configuration 65 and 70 respectively solidary with two actuating miter gears 80 derived from design 155 of FIG. 12; where in which, such as deriving from design 212 of FIG. 13, there is one first external rotatable bushing cage functionally, partly or in whole, internal and oriented respectively towards engaging within part of one solidary miter gear 80 engaging the right side respectively of the first caster 35 from within the right outer limit of the distance and location 99-b towards engaging within centrally one miter gear 81 engaged on the right side respectively of the first caster 35 from the left; and where in which, such as deriving from design 211 of FIG. 13, there is one second external rotatable bushing cage functionally, partly or in whole, internal and oriented respectively towards engaging within part of one solidary miter gear 80 engaging the left side respectively of the second caster 35 from within the left outer limit of the distance and location 99-b towards engaging within centrally one miter gear 81 engaged on the left side respectively of a second caster 35 from the left;

410    and which in respect to the logical layout of the embodiment of the drive shaft displayed in design 409 with external rotatable drive shaft 90 bushings actuated in respect to FIGS. 5, 6 and 7 and their descriptions, would consequentially actuate and generate, according the layout of the design 405, applicable in all principles for the design 409, a variable translational and linear displacement orientation of plane B to the right as defined in the drawing by DBR.

Design 410 is a lateral view of two intercalated rows 34 of angular wheels 40 constituted of two angular wheels in which each one of the swiveling casters 35 is engaged respectively left laterally with a configuration of a one central right or left external rotatable cam bushing cage configuration 65 or 70 respectively solidary with two actuating miter gears 80 derived from design 155 of FIG. 12; where in which, such as deriving from design 211 of FIG. 13, there is one external rotatable bushing cage functionally, partly or in whole, internal and oriented respectively towards engaging within part of two solidary miter gears 80 engaging the left side respectively of the first and second casters 35 from within the left outer limit of the distance and location 99-b towards engaging within centrally two miter gears 81 engaged on the left side respectively of the first and second casters 35 from the left; and which in respect to the logical layout of the embodiment of the drive shaft displayed in design 410 with external rotatable drive shaft 90 bushings actuated in respect to FIGS. 5, 6 and 7 and their descriptions, would consequentially actuate and generate, according the layout of the design 405, applicable in all principles for the design 410, a variable translational and linear displacement orientation of plane B to the right as defined in the drawing by DBR.

411 Design 411 is a lateral view of two intercalated rows 34 of angular wheels 40 constituted of two angular wheels in which each one of the swiveling casters 35 is engaged respectively left laterally with a configuration of a two central right or left external rotatable cam bushing cage configuration 65 or 70 respectively solidary with two actuating miter gears 80 derived from design 155 of FIG. 12; where in which, such as deriving from design 211 of FIG. 13 and design 408 of FIG. 14, there is one first external rotatable bushing cage functionally, partly or in whole, internal and oriented respectively towards engaging within part of one solidary miter gear 80 engaging on the left side respectively of the first caster 35 from within the left outer limit of the distance and location 99-b towards engaging within centrally with one first miter gear 81 engaged on the left side respectively of a first caster 35 from the left;
and where in which, such as deriving from design 211 of FIG. 13 and design 408 of FIG. 14, there is a second external rotatable bushing cage functionally, partly or in whole, internal and oriented respectively towards engaging within part of one solidary miter gear 80 engaging on the left side respectively of the second caster 35 from within the left outer limit of the distance and location 99-b towards engaging within centrally with one second miter gear 81 engaged on the left side respectively of a second caster 35 from the left; and which in respect to the logical layout of the embodiment of the drive shaft displayed in design 411 with external rotatable drive shaft 90 bushings actuated in respect to FIGS. 5, 6 and 7 and their descriptions, would consequentially actuate and generate, according the layout of the design 405, applicable in all principles for the design 411, a variable translational and linear displacement orientation of plane B to the right as defined in the drawing by DBR.

404 Design 404 is a lateral view of two intercalated rows 34 of angular wheels 40 constituted of two intercalated angular wheels for a compact design of central transmission shaft 5 design driven in the rotational plane orientation A to the central drive system 5 radial to axis of rotation 105 and solidary to a same actuating drive shaft 90 and/or left and/or right flanges 10 and 15 design for a displacement device 110 and embodiment 412 made possible namely by designs 408, 409, 410 and 411 of FIG. 14.

412 Design embodiment 412 is a schematic tridimensional view of design 404 with two intercalated rows 34 of angular wheels 40 constituted into a two intercalated angular wheel row design of the central transmission shaft 5 driven in the rotational plane orientation A to the central drive system 5 radial to axis of rotation 105 and solidary to a same actuating drive shaft 90 with attachment device 110 and made possible with laterally compact design 404 of central transmission shaft 5 which is in return made alternatively possible namely by designs 154 and 155 of FIG. 12, and moreover namely by designs 408, 409, 410 and 411 of FIG. 14 based on external rotative bushing cage distance and location of 99-b in design 155 of FIG. 12.

413 Design 413 is a lateral view of two intercalated rows 34 of angular wheels 40 constituted into a two interspersed angular wheel row design of an elongated central transmission shaft 5 driven in the rotational plane orientation A to the central drive system 5 radial to axis of rotation 105 and solidary to a same actuating drive shaft 90 and/or left and/or right flanges 10 and 15 design for a displacement device 110 and embodiment 414.

414 Design embodiment 414 is a schematic tridimensional view of design 413 with two intercalated rows 34 of angular wheels 40 constituted into a two intercalated angular wheel row design of the central transmission shaft 5 driven in the rotational plane orientation A to the central drive system 5 radial to axis of rotation 105 and solidary to a same actuating drive shaft 90 and/or left and/or right flanges 10 and 15 with elongated attachment device 110 and made possibly elongated though adapting the central transmission shaft 5 length and/or left and/or right flanges 10 and 15 presence and configuration of an elongated design 413 of central transmission shaft 5 which is in return made alternatively possible namely by designs 154 and 155 of FIG. 12.

-continued

Figure 15:
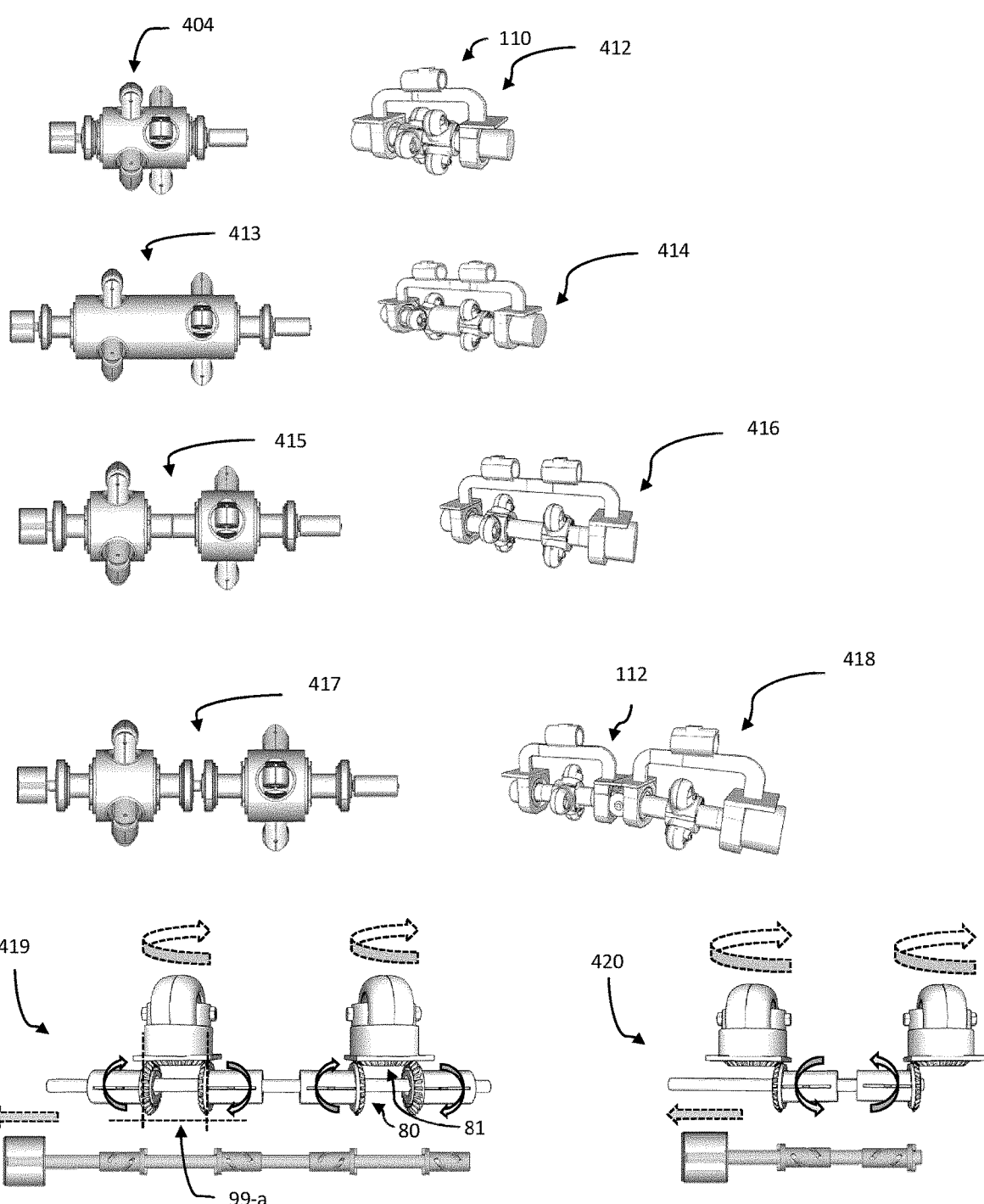
FIG. 15 is a logical set of schematic tridimensional views, from FIG. 14.

| 415 | Design 415 is a lateral view of two intercalated rows 34 of angular wheels 40 constituted into a two interspersed angular wheel row design of a two central transmission shaft 5 design driven in the rotational plane orientation A to the central drive system 5 radial to axis of rotation 105 for a displacement device 110 and embodiment 416. |
|---|---|
| 416 | Design embodiment 416 is a schematic tridimensional view of design 415 with two intercalated rows 34 of angular wheels 40 constituted into a two intercalated angular wheel row design of the central transmission shaft 5 with elongated attachment device 110 and made possible with two central transmission shafts 5 driven in the rotational plane orientation A to the central drive system 5 radial to axis of rotation 105 and solidary to a same actuating drive shaft 90 and/or left and/or right flanges 10 and 15 presence and configuration of an elongated design 415 of dual central transmission shaft 5 which is in return made alternatively possible namely by designs 153 and 155 of FIG. 12. |
| 417 | Design 417 is a lateral view of two intercalated rows 34 of angular wheels 40 constituted into a two intercalated angular wheel row design of a two central transmission shaft 5 design driven in the rotational plane orientation A to the central drive system 5 radial to axis of rotation 105 for a dual displacement device 112 and embodiment 418. |
| 418 | Design embodiment 418 is a schematic tridimensional view of design 417 with two intercalated rows 34 of angular wheels 40 constituted into a two intercalated angular wheel row design of the two central transmission shafts 5 with dual displacement device embodiment 112 and made possible with two central transmission shafts 5 driven in the rotational plane orientation A to the central drive system 5 radial to axis of rotation 105 and solidary to a same actuating drive shaft 90 and/or left and/or right flanges 10 and 15 presence and configuration for the biasing of an dual displacement device embodiment design 417 with a dual central transmission shaft 5 which is in return made alternatively possible namely by designs 153 and/or 155 of FIG. 12. |
| 419 | Design 419 is a lateral view of two intercalated rows 34 of angular wheels 40 constituted of two angular wheels in which each one of the swiveling casters 35 is engaged respectively left and right laterally with each a dual configuration of central right and left external rotatable cam bushing cage configuration 65 and 70 respectively solidary with a total of four actuating miter gears 80 derived from design 154 of FIG. 12; where in which, such as deriving from the design 207 of FIG. 13, there is one first external rotatable bushing cage functionally external and oriented respectively towards engaging within part of a solidary miter gear 80 engaging on the left side respectively of a first caster 35 from the left outer limit of the distance and location 99-a towards engaging within centrally one miter gear 81 engaged on the left side respectively of a first caster 35 from the left; and where in which, there is one second external rotatable bushing cage functionally external and oriented respectively towards engaging within part of a solidary miter gear 80 engaging on the right side respectively of a second caster 35 from the right outer limit of the distance and location 99-a towards engaging within centrally one miter gear 81 engaged on the right side respectively of a first caster 35 from the left; and where in which, there is one third external rotatable bushing cage functionally external and oriented respectively towards engaging within part of a solidary miter gear 80 engaging on the left side respectively of a second caster 35 from the left outer limit of the distance and location 99-a towards engaging within centrally one miter gear 81 engaged on the left side respectively of a second caster 35 from the left; and where in which, there is one fourth external rotatable bushing cage functionally external and oriented respectively towards engaging within part of a solidary miter gear 80 engaging on the right side respectively of a second caster 35 from the right outer limit of the distance and location 99-a towards engaging within centrally one miter gear 81 engaged on the right side respectively of a second caster 35 from the left; and which in respect to the logical layout of the embodiment of the drive shaft displayed in design 419 of FIG. 15 with external rotatable drive shaft bushings actuated in respect to FIGS. 5, 6 and 7 and their descriptions, would consequentially actuate and generate, according the layout of the design 405 of FIG. 14 applicable in all principles for the design 419, a variable translational and linear displacement orientation of plane B to the right such as defined in the design 405 of FIG. 14 by DBR. |
| 420 | Design 420 is a lateral view of two intercalated rows 34 of angular wheels 40 constituted of two angular wheels in which each one of the swiveling casters 35 is engaged respectively right and left laterally with each a dual configuration of central right and left external rotatable cam bushing cage configuration 65 and 70 respectively solidary with a total of four actuating miter gears 80 derived from design 154 of FIG. 12; where in which, such as deriving from the design 209 and 208 of FIG. 13, there is one first external rotatable bushing cage functionally external and oriented respectively towards engaging within part of a solidary miter gear 80 engaging on the right side respectively of a first caster 35 from the right outer limit of the distance and location 99-a towards engaging within centrally one miter gear 81 engaged on the right side respectively of a first caster 35 from the left; |

-continued and where in which, there is one second external rotatable bushing cage functionally external and oriented respectively towards engaging within part of a solidary miter gear 80 engaging on the left side respectively of a second caster 35 from the left outer limit of the distance and location 99-a towards engaging within centrally one miter gear 81 engaged on the left side respectively of a second caster 35 from the left; and which in respect to the logical layout of the embodiment of the drive shaft displayed in design 420 of FIG. 15 with external rotatable drive shaft bushings actuated in respect to FIGS. 5, 6 and 7 and their descriptions, would consequentially actuate and generate, according the layout of the design 405 of FIG. 14 applicable in all principles for the design 420, a variable translational and linear displacement orientation of plane B to the right such as defined in the design 405 of FIG. 14 by DBR 450    Design 450 is a lateral view of two intercalated rows 34 of angular wheels 40 constituted into a two intercalated angular wheel row design of a two central transmission shaft 5 design driven each in different rotational plane orientations A to the central drive system 5 radial to axis of rotation 105 for a dual displacement device 112 of embodiment 451.

451    Design embodiment 451 is a schematic tridimensional view of design 450 with two intercalated rows 34 of angular wheels 40 constituted into a two intercalated angular wheel row design evenly displaying each in two rows among two central transmission shafts 5 with each one of the swiveling casters 35 being of each of the two central transmission shaft 5 with dual displacement device embodiment 112 and made possible with two central transmission shafts 5 each driven in different rotational plane orientations A to the central drive system 5 radial to axis of rotation 105 both solidary to a same actuating drive shaft 90 and/or left and/or right flanges 10 and 15 presence and configuration for the biasing of an dual displacement device embodiment design 417 with a dual central transmission shaft 5 which is in return made alternatively possible namely by designs 153 and/or 155 of FIG. 12.

Figure 16:
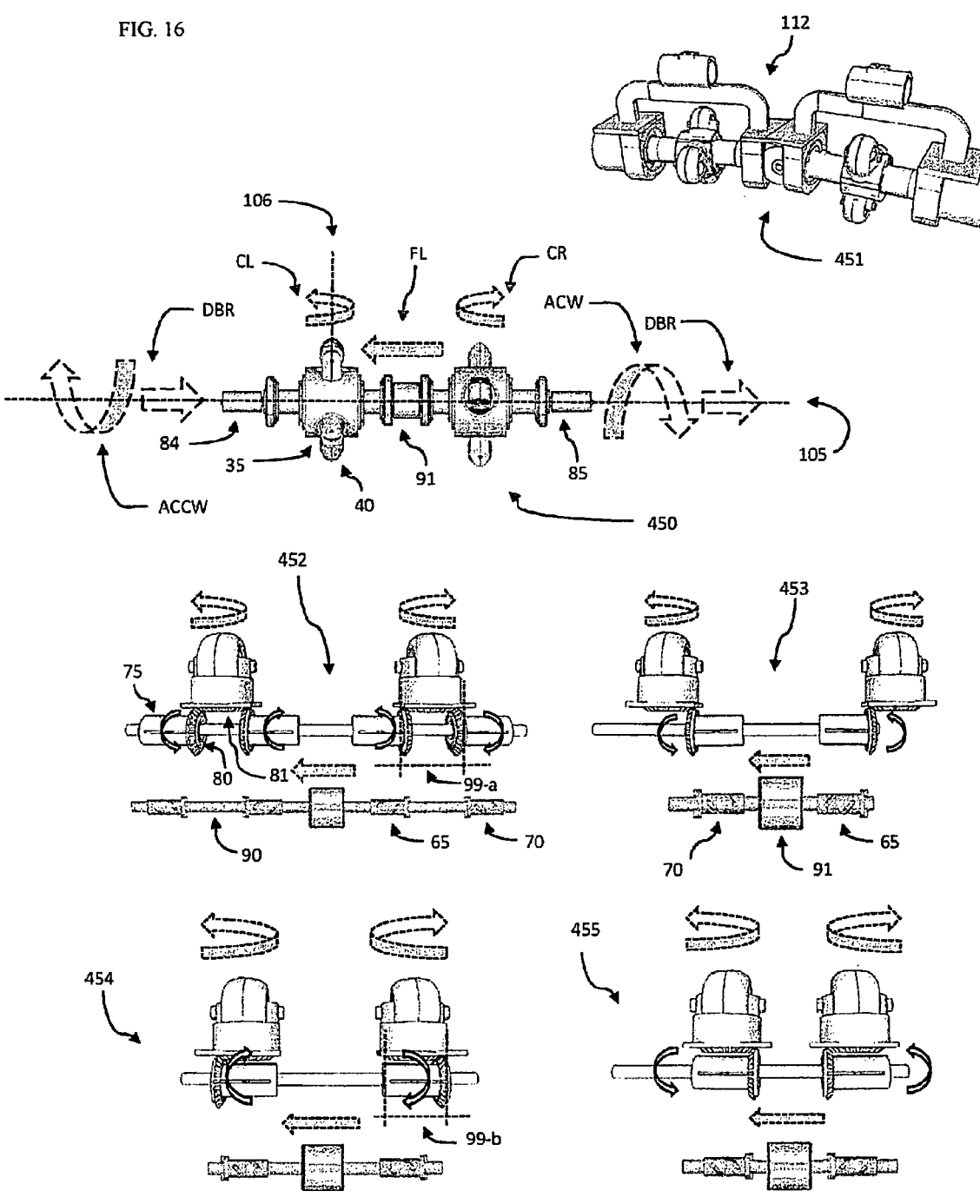
FIG. 16 is another logical set of schematic tridimensional view.

452    Design 452 is a lateral view of two intercalated rows 34 of angular wheels 40 constituted of two angular wheels evenly displayed each in two rows among two central transmission shafts 5 with each one of the swiveling casters 35 being engaged respectively right and left laterally with each a dual configuration of central right and left external rotatable cam bushing cage configuration 65 and 70 respectively solidary with a total of four actuating miter gears 80 derived from design 154 of FIG. 12; where in which, such as deriving from the design 207 of FIG. 13 and design 419 of FIG. 15, there is one first central transmission shaft 5 and there is one first external rotatable bushing cage functionally external and oriented respectively towards engaging within part of a solidary miter gear 80 engaging on the left side respectively of a first caster 35 from the left outer limit of the distance and location 99-a towards engaging within centrally one miter gear 81 engaged on the left side respectively of a first caster 35 from the left; and where in which, in the second central transmission shaft 5 there is one second central transmission shaft and there is one second external rotatable bushing cage functionally external and oriented respectively towards engaging within part of a solidary miter gear 80 engaging on the right side respectively of the first caster 35 from the right outer limit of the distance and location 99-a towards engaging within centrally one miter gear 81 engaged on the right side respectively of a first caster 35 from the left; and where in which, there is a second central transmission shaft 5 and there is one third external rotatable bushing cage functionally external and oriented respectively towards engaging within part of a solidary miter gear 80 engaging on the left side respectively of a second caster 35 from the left outer limit of the distance and location 99-a towards engaging within centrally one miter gear 81 engaged on the left side respectively of a second caster 35 from the left; and where in which, in the second central transmission shaft 5 there is one fourth external rotatable bushing cage functionally external and oriented respectively towards engaging within part of a solidary miter gear 80 engaging on the right side respectively of the second caster 35 from the right outer limit of the distance and location 99-a towards engaging within centrally one miter gear 81 engaged on the right side respectively of a second caster 35 from the left; and which in respect to the logical layout of the embodiment of the drive shaft displayed in design 452 of FIG. 16 with external rotatable drive shaft bushings actuated in respect to FIGS. 5, 6 and 7 and their descriptions, would consequentially actuate and generate, according the layout of the design 450 applicable in all principles for the design 452, a variable translational and linear displacement orientation of plane B to the right such as defined in the design 450 of FIG. 16 by DBR.

453    Design 453 is a lateral view of two intercalated rows 34 of angular wheels 40 constituted of two angular wheels evenly displayed each in two rows among two central transmission shafts 5 with each one of the swiveling casters 35 being engaged respectively right and left laterally with each a dual configuration of central right and left external rotatable cam bushing cage configuration 65 and 70 respectively solidary with a total of four actuating miter gears 80 derived from design 154 of FIG. 12; where in which, such as -continued deriving from the design 209 and 208 of FIG. 13 and design 420 of FIG. 15, there is one first central transmission shaft 5 and there is one first external rotatable bushing cage functionally external and oriented respectively towards engaging within part of a solidary miter gear 80 engaging on the right side respectively of a first caster 35 from the right outer limit of the distance and location 99-a towards engaging within centrally one miter gear 81 engaged on the right side respectively of a first caster 35 from the left; and where in which, there is a second central transmission shaft 5 there is one second external rotatable bushing cage functionally external and oriented respectively towards engaging within part of a solidary miter gear 80 engaging on the left side respectively of a second caster 35 from the left outer limit of the distance and location 99-a towards engaging within centrally one miter gear 81 engaged on the left side respectively of a second caster 35 from the left; and which in respect to the logical layout of the embodiment of the drive shaft displayed in design 453 of FIG. 16 with external rotatable drive shaft bushings actuated in respect to FIGS. 5, 6 and 7 and their descriptions, would consequentially actuate and generate, according the layout of the design 450 applicable in all principles for the design 453, a variable translational and linear displacement orientation of plane B to the right such as defined in the design 450 of FIG. 16 by DBR.

454      Design 454 is a lateral view of two intercalated rows 34 of angular wheels 40 constituted of two angular wheels evenly displayed each in two rows among two central transmission shafts 5 with each one of the swiveling casters 35 being engaged respectively right and left laterally from the inside with a dual configuration of the central right and left external rotatable cam bushing cage configuration 65 and 70 respectively solidary with two actuating miter gears 80 derived from design 155 of FIG. 12; where in which, such as deriving from design of 408 FIG. 14 and design 211 and design 212 of FIG. 13, there is one first central transmission shaft 5 and there is one first external rotatable bushing cage functionally, partly or in whole, internal and oriented respectively towards engaging within part of one solidary miter gear 80 engaging on the left side respectively the first caster 35 from within the left outer limit of the distance and location 99-b towards engaging within centrally one miter gear 81 engaged on the left side respectively of a first caster 35 from the left; and where in which, such as deriving from design 408 of FIG. 14 and design 211 and design 212 of FIG. 13, there is one second central transmission shaft 5 and there is one second external rotatable bushing cage functionally, partly or in whole, internal and oriented respectively towards engaging within part of one solidary miter gear 80 engaging the right side respectively of the second caster 35 from within the right outer limit of the distance and location 99-b towards engaging within centrally one miter gear 81 engaged on the right side respectively of the second caster 35 from the left; and which in respect to the logical layout of the embodiment of the drive shaft displayed in design 454 with external rotatable drive shaft 90 bushings actuated in respect to FIGS. 5, 6 and 7 and their descriptions, would consequentially actuate and generate, according the layout of the design 450, applicable in all principles for the design 454, a variable translational and linear displacement orientation of plane B to the right as defined in the drawing by DBR.

455      Design 455 is a lateral view of two intercalated rows 34 of angular wheels 40 constituted of two angular wheels evenly displayed each in two rows among two central transmission shafts 5 with each one of the swiveling casters 35 being engaged respectively right and left laterally from the inside with a dual configuration of the central right and left external rotatable cam bushing cage configuration 65 and 70 respectively solidary with two actuating miter gears 80 derived from design 155 of FIG. 12; where in which, such as deriving from design 409 FIG. 14 and design 212 and design 211 of FIG. 13, there is one first central transmission shaft 5 and there is one first external rotatable bushing cage functionally, partly or in whole, internal and oriented respectively towards engaging within part of one solidary miter gear 80 engaging the right side respectively of the first caster 35 from within the right outer limit of the distance and location 99-b towards engaging within centrally one miter gear 81 engaged on the right side respectively of the first caster 35 from the left; and where in which, such as deriving from design 409 FIG. 14 and design 212 and design 211 of FIG. 13, there is one second central transmission shaft 5 and there is one second external rotatable bushing cage functionally, partly or in whole, internal and oriented respectively towards engaging within part of one solidary miter gear 80 engaging the left side respectively of the second caster 35 from within the left outer limit of the distance and location 99-b towards engaging within centrally one miter gear 81 engaged on the left side respectively of a second caster 35 from the left; and which in respect to the logical layout of the embodiment of the drive shaft displayed in design 455 with external rotatable drive shaft 90 bushings actuated in respect to FIGS. 5, 6 and 7 and their descriptions, would consequentially actuate and generate, according the layout of the design 450, applicable in all principles for the design 455, a variable translational and linear displacement orientation of plane B to the right as defined in the drawing by DBR.

-continued

Figure 17:
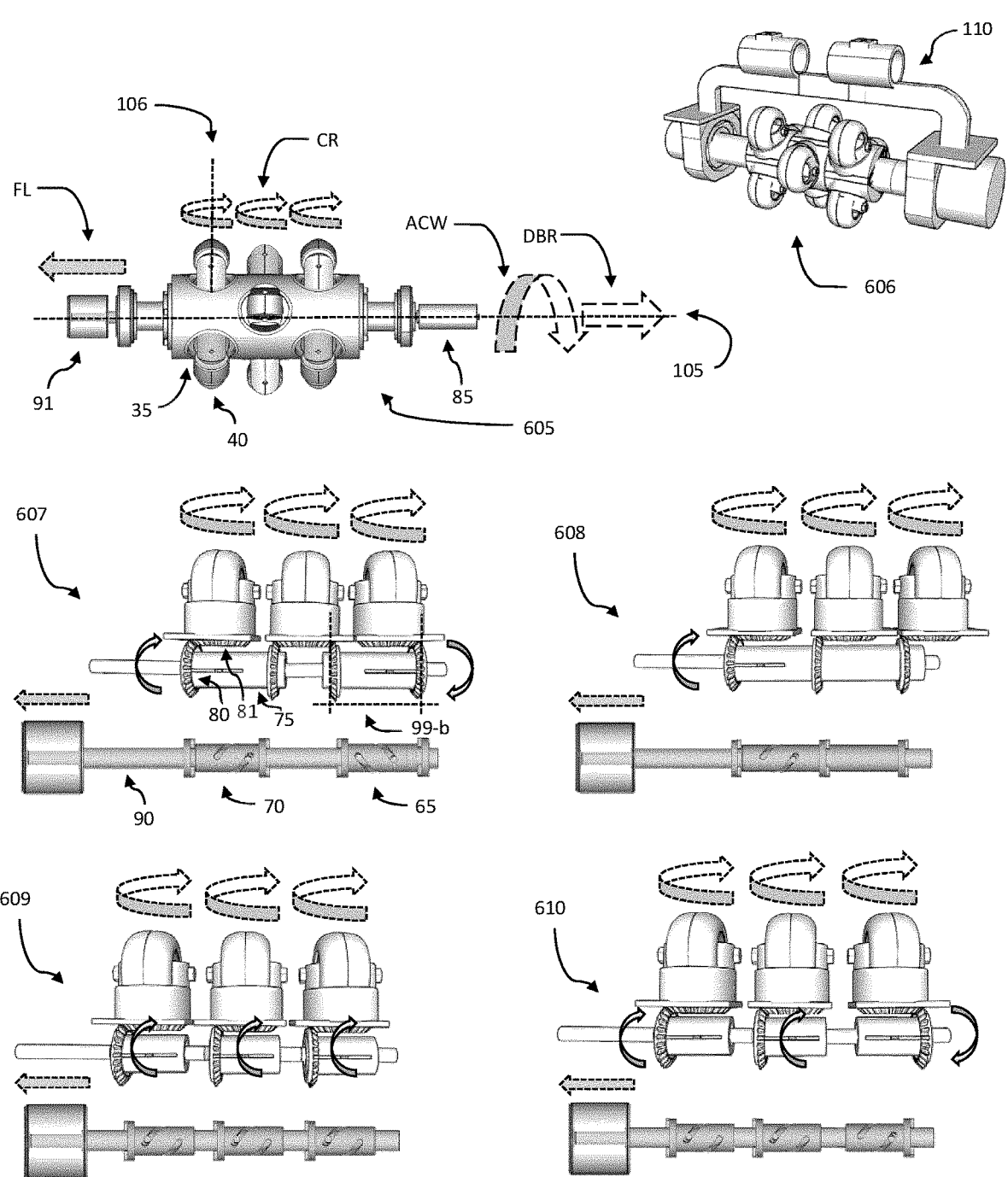
FIG. 17 is another logical set of schematic tridimensional view.

| 605 | Design 605 is a lateral view of three intercalated rows 34 of angular wheels 40 constituted into a three intercalated angular wheel row design of a one central transmission shaft 5 design driven in the rotational plane orientation A to the central drive system 5 radial to axis of rotation 105 for a displacement device 110 and embodiment 606. |
| 606 | Design embodiment 606 is a schematic tridimensional view of design 605 with three intercalated rows 34 of angular wheels 40 constituted into a three intercalated angular wheel row design of the central transmission shaft 5 driven in the rotational plane orientation A to the central drive system 5 radial to axis of rotation 105 and solidary to a same actuating drive shaft 90 with attachment device 110 and made alternatively possible namely by designs 154 and 155 of FIG. 12, and in itself by design 155 of FIG. 12. |
| 607 | Design 607 is a lateral view of three intercalated rows 34 of angular wheels 40 constituted of three angular wheels in which each one of the swiveling casters 35 is engaged respectively left or right laterally with a configuration of a two central right and left external rotatable cam bushing cage configuration 65 or 70 respectively solidary with four actuating miter gears 80 derived from design 155 of FIG. 12; where in which, such as deriving from design 211 of FIG. 13 and design 410 of FIG. 14, there is one first external rotatable bushing cage functionally, partly or in whole, internal and oriented respectively towards engaging within part of two solidary miter gears 80 engaging the left side respectively of the first and second casters 35 from within the left outer limit of the distance and location 99-b towards engaging within centrally two miter gears 81 engaged on the left side respectively of the first and second casters 35 from the left; where in which, such as deriving from design 211 of FIG. 13, there is one second external rotatable bushing cage functionally, partly or in whole, internal and oriented respectively towards engaging within part of two solidary miter gears 80 engaging the right side respectively of the second and third casters 35 from within the right outer limit of the distance and location 99-b towards engaging within centrally two miter gears 81 engaged on the right side respectively of the second and third casters 35 from the left; and which in respect to the logical layout of the embodiment of the drive shaft displayed in design 607 with external rotatable drive shaft 90 bushings actuated in respect to FIGS. 5, 6 and 7 and their descriptions, would consequentially actuate and generate, according the layout of the design 605, applicable in all principles for the design 607 in FIG. 17, a variable translational and linear displacement orientation of plane B to the right as defined in the drawing by DBR. |
| 608 | Design 608 is a lateral view of three intercalated rows 34 of angular wheels 40 constituted of three angular wheels in which each one of the swiveling casters 35 is engaged respectively left laterally with a configuration of a one external rotatable cam bushing cage configuration 65 or 70 respectively solidary with three actuating miter gears 80 derived from design 155 of FIG. 12; where in which, such as deriving from design 211 of FIG. 13 and design 410 of FIG. 14 and design 607 of FIG. 17, there is one external rotatable bushing cage functionally, partly or in whole, internal and oriented respectively towards engaging within part of three solidary miter gears 80 engaging the left side respectively of the first, second and third casters 35 from within the left outer limit of the distance and location 99-b towards engaging within centrally three miter gears 81 engaged on the left side respectively of the first, second and third casters 35 from the left; and which in respect to the logical layout of the embodiment of the drive shaft displayed in design 608 with external rotatable drive shaft 90 bushings actuated in respect to FIGS. 5, 6 and 7 and their descriptions, would consequentially actuate and generate, according the layout of the design 605 in FIG. 17, applicable in all principles for the design 608, a variable translational and linear displacement orientation of plane B to the right as defined in the drawing by DBR. |
| 609 | Design 609 is a lateral view of three intercalated rows 34 of angular wheels 40 constituted of three angular wheels in which each one of the swiveling casters 35 is engaged respectively left laterally with a configuration of a three external rotatable cam bushing cage configuration 65 or 70 respectively solidary with three actuating miter gears 80 derived from design 155 of FIG. 12; where in which, such as in part of design 210 of FIG. 13 and design 411 of FIG. 405, there are three external rotatable bushing cages functionally, partly or in whole, internal and oriented respectively towards engaging within part of three solidary miter gears 80 engaging the left side respectively of the three casters 35 from within the left outer limit of the distance and location 99-b towards engaging within centrally with each one of the three miter gears 81 engaged on the left side respectively of each one the three casters 35 from the left; and which in respect to the logical layout of the embodiment of the drive shaft displayed in design 609 with external rotatable drive shaft 90 bushings actuated in respect to FIGS. 5, 6 and 7 and their descriptions, would consequentially actuate and generate, according the layout of the design 605 in FIG. 17, applicable in all principles for the design 609, a variable translational and linear displacement orientation of plane B to the right as defined in the drawing by DBR. |

-continued

Figure 18:
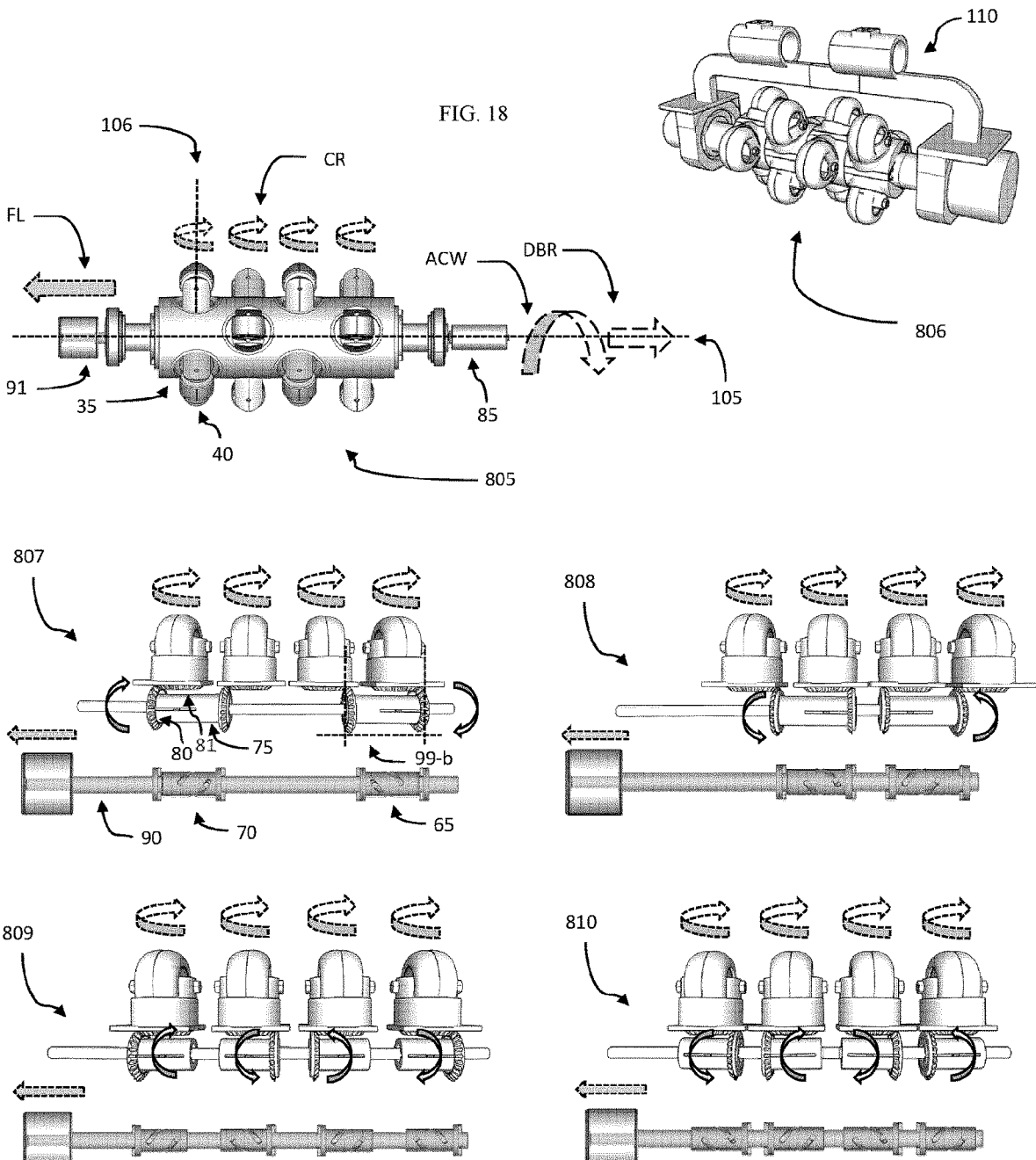
FIG. 18 is another logical set of schematic tridimensional view.

| 610 | Design 610 is a lateral view of three intercalated rows 34 of angular wheels 40 constituted of three angular wheels in which the first two swiveling casters 35 are engaged respectively left laterally and in which the third swiveling casters 35 is engaged respectively right laterally with a configuration of a total of a three external rotatable cam bushing cage configuration 65 or 70 respectively solidary with three actuating miter gears 80 derived from design 155 of FIG. 12; where in which, such as in part of design 210 of FIG. 13 and design 411 of FIG. 405, there are three external rotatable bushing cages functionally, partly or in whole, internal and oriented respectively towards engaging within part of a total of three solidary miter gears 80, of which the two first gears 80 are engaging the left side respectively of the first two casters 35 from within the left outer limit of the distance and location 99-b towards engaging within centrally with each of the two first miter gears 81 engaged on the left side respectively of two first casters 35 from the left, and of which the third gear 80 is engaging the right side respectively of the third caster 35 from within the right outer limit of the distance and location 99-b towards engaging within centrally with the third miter gear 81 engaged on the right side respectively of the third caster 35 from the left; and which in respect to the logical layout of the embodiment of the drive shaft displayed in design 610 with external rotatable drive shaft 90 bushings actuated in respect to FIGS. 5, 6 and 7 and their descriptions, would consequentially actuate and generate, according the layout of the design 605 in FIG. 17, applicable in all principles for the design 610, a variable translational and linear displacement orientation of plane B to the right as defined in the drawing by DBR. |
| 805 | Design 805 is a lateral view of four intercalated rows 34 of angular wheels 40 constituted into a four intercalated angular wheel row design of a one central transmission shaft 5 design driven in the rotational plane orientation A to the central drive system 5 radial to axis of rotation 105 for a displacement device 110 and embodiment 806. |
| 806 | Design embodiment 806 is a schematic tridimensional view of design 805 with four intercalated rows 34 of angular wheels 40 constituted into a four intercalated angular wheel row design of the central transmission shaft 5 driven in the rotational plane orientation A to the central drive system 5 radial to axis of rotation 105 and solidary to a same actuating drive shaft 90 with attachment device 110 and made alternatively possible namely by designs 154 and 155 of FIG. 12, and in itself by design 155 of FIG. 12. |
| 807 | Design 807 is a lateral view of four intercalated rows 34 of angular wheels 40 constituted of four angular wheels in which each one of the swiveling casters 35 is engaged respectively left or right laterally with a configuration of a two central right and left external rotatable cam bushing cage configuration 65 or 70 respectively solidary with four actuating miter gears 80 derived from design 155 of FIG. 12; where in which, such as deriving from design 211 of FIG. 13 and design 410 of FIG. 14 and design 607 of FIG. 17, there is one first external rotatable bushing cage functionally, partly or in whole, internal and oriented respectively towards engaging within part of two solidary miter gears 80 engaging the left side respectively of the first and second casters 35 from within the left outer limit of the distance and location 99-b towards engaging within centrally two miter gears 81 engaged on the left side respectively of the first and second casters 35 from the left; and where in which, such as deriving from design 211 of FIG. 13 and design 410 of FIG. 14 and design 607 of FIG. 17, there is one second external rotatable bushing cage functionally, partly or in whole, internal and oriented respectively towards engaging within part of two solidary miter gears 80 engaging the right side respectively of the third and fourth casters 35 from within the right outer limit of the distance and location 99-b towards engaging within centrally two miter gears 81 engaged on the right side respectively of the third and fourth casters 35 from the left; and which in respect to the logical layout of the embodiment of the drive shaft displayed in design 807 with external rotatable drive shaft 90 bushings actuated in respect to FIGS. 5, 6 and 7 and their descriptions, would consequentially actuate and generate, according the layout of the design 805, applicable in all principles for the design 807 in FIG. 18, a variable translational and linear displacement orientation of plane B to the right as defined in the drawing by DBR. |
| 808 | Design 808 is a lateral view of four intercalated rows 34 of angular wheels 40 constituted of four angular wheels in which each one of the swiveling casters 35 is engaged respectively left or right laterally with a configuration of a two central right and left external rotatable cam bushing cage configuration 65 or 70 respectively solidary evenly with four actuating miter gears 80 derived from design 155 of FIG. 12; where in which, such as deriving from design 211 of FIG. 13 and design 410 of FIG. 14 and design 607 of FIG. 17 and design 807 of FIG. 18, there is one first external rotatable bushing cage functionally, partly or in whole, internal and oriented respectively towards engaging within part of two solidary miter gears 80 engaging the right side respectively of the first and second casters 35 from within the right outer limit of the distance and location 99-b towards engaging within centrally two miter gears 81 engaged on the right side respectively of the first and second casters 35 from the left; and where in |

-continued which, such as deriving from design 211 of FIG. 13 and design 410 of FIG. 14 and design 607 of FIG. 17 and design 807 of FIG. 18, there is one second external rotatable bushing cage functionally, partly or in whole, internal and oriented respectively towards engaging within part of two solidary miter gears 80 engaging the left side respectively of the third and fourth casters 35 from within the left outer limit of the distance and location 99-b towards engaging within centrally two miter gears 81 engaged on the left side respectively of the third and fourth casters 35 from the left; and which in respect to the logical layout of the embodiment of the drive shaft displayed in design 808 with external rotatable drive shaft 90 bushings actuated in respect to FIGS. 5, 6 and 7 and their descriptions, would consequentially actuate and generate, according the layout of the design 805, applicable in all principles for the design 808 in FIG. 18, a variable translational and linear displacement orientation of plane B to the right as defined in the drawing by DBR.

809    Design 809 is a lateral view of four intercalated rows 34 of angular wheels 40 constituted of four angular wheels in which each one of the swiveling casters 35 is engaged respectively left or right laterally with a configuration of a four central right and left external rotatable cam bushing cage configuration 65 or 70 respectively solidary with four actuating miter gears 80 derived from design 155 of FIG. 12; where in which, such as deriving from design 211 of FIG. 13, there is one first external rotatable bushing cage functionally, partly or in whole, internal and oriented respectively towards engaging within part of one solidary miter gear 80 engaging on the left side respectively the first caster 35 from within the left outer limit of the distance and location 99-b towards engaging within centrally one miter gear 81 engaged on the left side respectively of a first caster 35 from the left; and where in which, such as deriving from design 212 of FIG. 13, there is one second external rotatable bushing cage functionally, partly or in whole, internal and oriented respectively towards engaging within part of one solidary miter gear 80 engaging the right side respectively of the second caster 35 from within the right outer limit of the distance and location 99-b towards engaging within centrally one miter gear 81 engaged on the right side respectively of the second caster 35 from the left; and where in which, such as deriving from design 211 of FIG. 13, there is one third external rotatable bushing cage functionally, partly or in whole, internal and oriented respectively towards engaging within part of one solidary miter gear 80 engaging on the left side respectively the third caster 35 from within the left outer limit of the distance and location 99-b towards engaging within centrally one miter gear 81 engaged on the left side respectively of a third caster 35 from the left;
and where in which, such as deriving from design 212 of FIG. 13, there is one fourth external rotatable bushing cage functionally, partly or in whole, internal and oriented respectively towards engaging within part of one solidary miter gear 80 engaging the right side respectively of the fourth caster 35 from within the right outer limit of the distance and location 99-b towards engaging within centrally one miter gear 81 engaged on the right side respectively of the fourth caster 35 from the left; and which in respect to the logical layout of the embodiment of the drive shaft displayed in design 809 with external rotatable drive shaft 90 bushings actuated in respect to FIGS. 5, 6 and 7 and their descriptions, would consequentially actuate and generate, according the layout of the design 805, applicable in all principles for the design 809 in FIG. 18, a variable translational and linear displacement orientation of plane B to the right as defined in the drawing by DBR.

810    Design 810 is a lateral view of four intercalated rows 34 of angular wheels 40 constituted of four angular wheels in which each one of the swiveling casters 35 is engaged respectively right or left laterally with a configuration of a four central right and left external rotatable cam bushing cage configuration 65 or 70 respectively solidary with four actuating miter gears 80 derived from design 155 of FIG. 12; where in which, such as deriving from design 212 of FIG. 13, there is one first external rotatable bushing cage functionally, partly or in whole, internal and oriented respectively towards engaging within part of one solidary miter gear 80 engaging the right side respectively of the first caster 35 from within the right outer limit of the distance and location 99-b towards engaging within centrally one miter gear 81 engaged on the right side respectively of the first caster 35 from the left; and where in which, such as deriving from design 211 of FIG. 13, there is one second external rotatable bushing cage functionally, partly or in whole, internal and oriented respectively towards engaging within part of one solidary miter gear 80 engaging on the left side respectively the second caster 35 from within the left outer limit of the distance and location 99-b towards engaging within centrally one miter gear 81 engaged on the left side respectively of a second caster 35 from the left; and where in which, such as deriving from design 212 of FIG. 13, there is one third external rotatable bushing cage functionally, partly or in whole, internal and oriented respectively towards engaging within part of one solidary miter gear 80 engaging the right side respectively of the third caster 35 from within the right outer limit of the distance and location 99-b towards engaging within -continued centrally one miter gear 81 engaged on the right side respectively of the third caster 35 from the left; and where in which, such as deriving from design 211 of FIG. 13, there is one fourth external rotatable bushing cage functionally, partly or in whole, internal and oriented respectively towards engaging within part of one solidary miter gear 80 engaging on the left side respectively the fourth caster 35 from within the left outer limit of the distance and location 99-b towards engaging within centrally one miter gear 81 engaged on the left side respectively of a fourth caster 35 from the left; and which in respect to the logical layout of the embodiment of the drive shaft displayed in design 810 with external rotatable drive shaft 90 bushings actuated in respect to FIGS. 5, 6 and 7 and their descriptions, would consequentially actuate and generate, according the layout of the design 805, applicable in all principles for the design 810 in FIG. 18, a variable translational and linear displacement orientation of plane B to the right as defined in the drawing by DBR.

811    Design 811 is a lateral view of four intercalated rows 34 of angular wheels 40 constituted into a four intercalated angular wheel row design of a two central transmission shaft 5 design driven in the rotational plane orientation A to the central drive system 5 radial to axis of rotation 105 for a displacement device 110 and embodiment 812.

812    Design embodiment 812 is a schematic tridimensional view of design 811 with four intercalated rows 34 of angular wheels 40 constituted into a four intercalated angular wheel row design of the two central transmission shafts 5 driven in the rotational plane orientation A to the central drive system 5 radial to axis of rotation 105 and solidary to a same actuating drive shaft 90 with attachment device 110 and made alternatively possible namely by designs 154 and 155 of FIG. 12.

Figure 19:
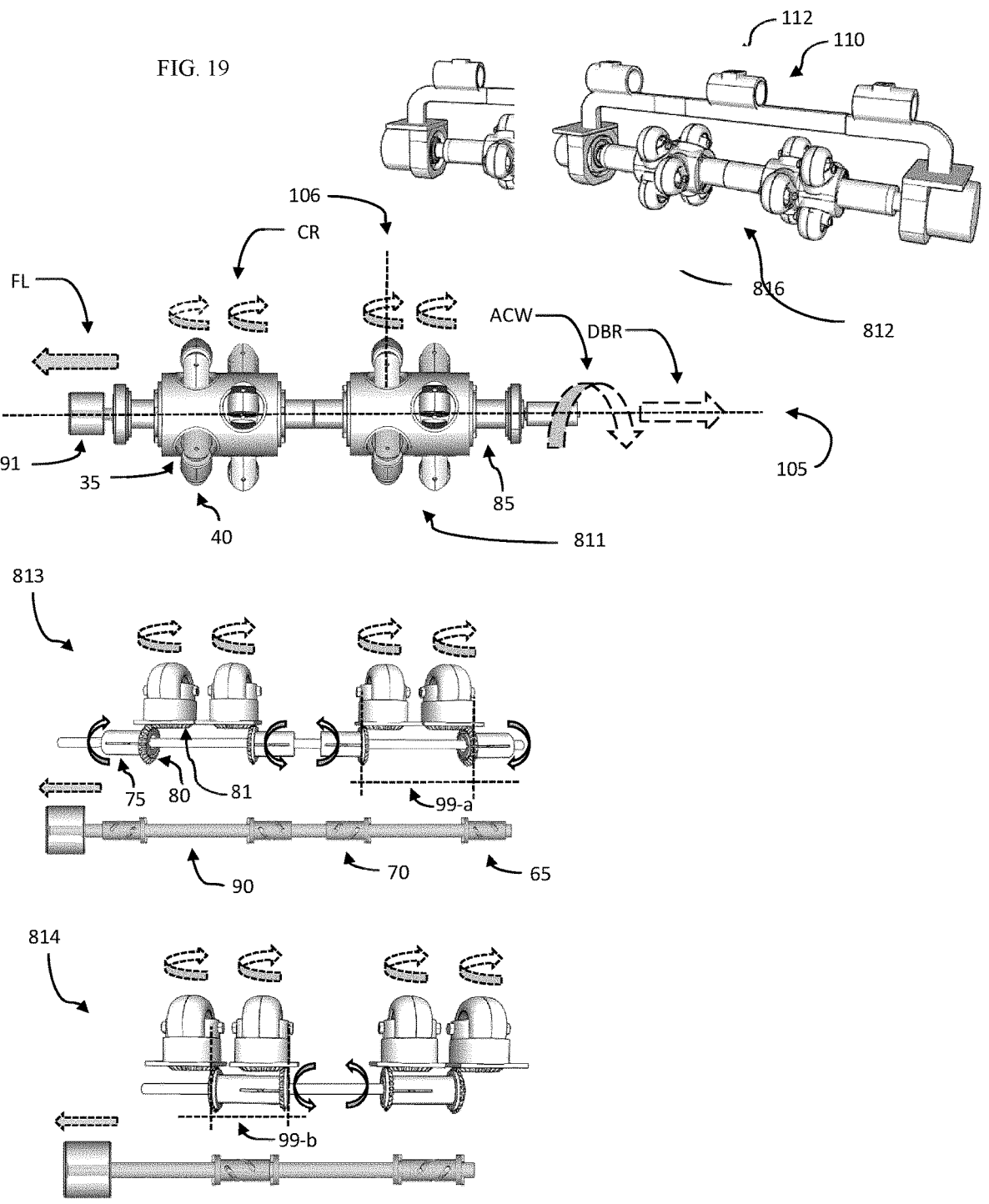
FIG. 19 is another logical set of schematic tridimensional view.

813    Design 813 is a lateral view of four intercalated rows 34 of angular wheels 40 constituted of four angular wheels evenly displayed in two pairs among two central transmission shafts in which each one of the pair of swiveling casters 35 is engaged respectively right and left laterally with each a dual configuration of central right and left external rotatable cam bushing cage configuration 65 and 70 respectively solidary with a total of four actuating miter gears 80 derived from design 154 of FIG. 12; where in which, such as deriving from the design 207 of FIG. 13 and design 419 of FIG. 15 and design 452 of FIG. 16, there is one first central transmission shaft 5 and there is one first external rotatable bushing cage functionally external and oriented respectively towards engaging within part of a solidary miter gear 80 engaging on the left side respectively a first caster 35 from the left outer limit of the distance and location 99-a towards engaging within centrally one miter gear 81 engaged on the left side respectively of a first caster 35 from the left; and where in which, in the first central transmission shaft 5 there is one second external rotatable bushing cage functionally external and oriented respectively towards engaging within part of a solidary miter gear 80 engaging on the right side respectively a second caster 35 from the right outer limit of the distance and location 99-a towards engaging within centrally one miter gear 81 engaged on the right side respectively of a second caster 35 from the left; and where in which, there is a second central transmission shaft 5 and there is one third external rotatable bushing cage functionally external and oriented respectively towards engaging within part of a solidary miter gear 80 engaging on the left side respectively of a third caster 35 from the left outer limit of the distance and location 99-a towards engaging within centrally one miter gear 81 engaged on the left side respectively of a third caster 35 from the left; and where in which, in the second central transmission shaft 5 there is one fourth external rotatable bushing cage functionally external and oriented respectively towards engaging within part of a solidary miter gear 80 engaging on the right side respectively of a fourth caster 35 from the right outer limit of the distance and location 99-a towards engaging within centrally one miter gear 81 engaged on the right side respectively of a fourth caster 35 from the left; and which in respect to the logical layout of the embodiment of the drive shaft displayed in design 813 of FIG. 19 with external rotatable drive shaft bushings actuated in respect to FIGS. 5, 6 and 7 and their descriptions, would consequentially actuate and generate, according the layout of the design 811 applicable in all principles for the design 813, a variable translational and linear displacement orientation of plane B to the right such as defined in the design 811 of FIG. 19 by DBR.

814    Design 814 is a lateral view of four intercalated rows 34 of angular wheels 40 constituted of four angular wheels evenly displayed in two pairs among two central transmission shafts in which each one pair of the swiveling casters 35 is engaged respectively right and left laterally with a configuration of a two central right and left external rotatable cam bushing cage configuration 65 or 70 respectively solidary evenly with four actuating miter gears 80 derived from design 155 of FIG. 12; where in which, such as deriving from design 211 of FIG. 13 and design 410 of FIG. 14 and design 607 of FIG. 17 and design 808 of FIG. 18, there is one first external rotatable bushing cage functionally, partly or in whole, internal and oriented respectively towards engaging within part of two solidary miter gears 80 engaging the right side respectively of the first and second casters 35 from -continued within the right outer limit of the distance and location 99-b towards
engaging within centrally two miter gears 81 engaged on the right side
respectively of the first and second casters 35 from the left; and where in
which, such as deriving from design 211 of FIG. 13 and design 410 of
FIG. 14 and design 607 of FIG. 17 and design 808 of FIG. 18, there is
one second external rotatable bushing cage functionally, partly or in whole,
internal and oriented respectively towards engaging within part of two
solidary miter gears 80 engaging the left side respectively of the third and
fourth casters 35 from within the left outer limit of the distance and location
99-b towards engaging within centrally two miter gears 81 engaged on the
left side respectively of the third and fourth casters 35 from the left; and
which in respect to the logical layout of the embodiment of the drive shaft
displayed in design 814 with external rotatable drive shaft 90 bushings
actuated in respect to FIGS. 5, 6 and 7 and their descriptions, would
consequentially actuate and generate, according the layout of the design 811,
applicable in all principles for the design 814 in FIG. 19, a variable
translational and linear displacement orientation of plane B to the right as
defined in the drawing by DBR.

815   Design 815 is a lateral view of four intercalated rows 34 of angular wheels
      40 constituted into a dual two intercalated angular wheel row design of a two
      central transmission shaft 5 design driven each in different rotational plane
      orientations A to the central drive system 5 radial to axis of rotation 105 for a
      dual displacement device 112 of embodiment 816.

816   Design embodiment 816 is a schematic tridimensional view of design 815
      with four intercalated rows 34 of angular wheels 40 constituted into a dual
      two intercalated angular wheel row design evenly displaying each in two
      pairs among two central transmission shafts 5 with each pair of the swiveling
      casters 35 being of each of the two central transmission shaft 5 with dual
      displacement device embodiment 112 and made possible with two central
      transmission shafts 5 each driven in different rotational plane orientations A
      to the central drive system 5 radial to axis of rotation 105 both solidary to a
      same actuating drive shaft 90 and/or left and/or right flanges 10 and 15
      presence and configuration for the biasing of an dual displacement device
      embodiment design 417 with a dual central transmission shaft 5 which is in
      return made alternatively possible namely by designs 153 and/or 155 of
      FIG. 12.

Figure 20:
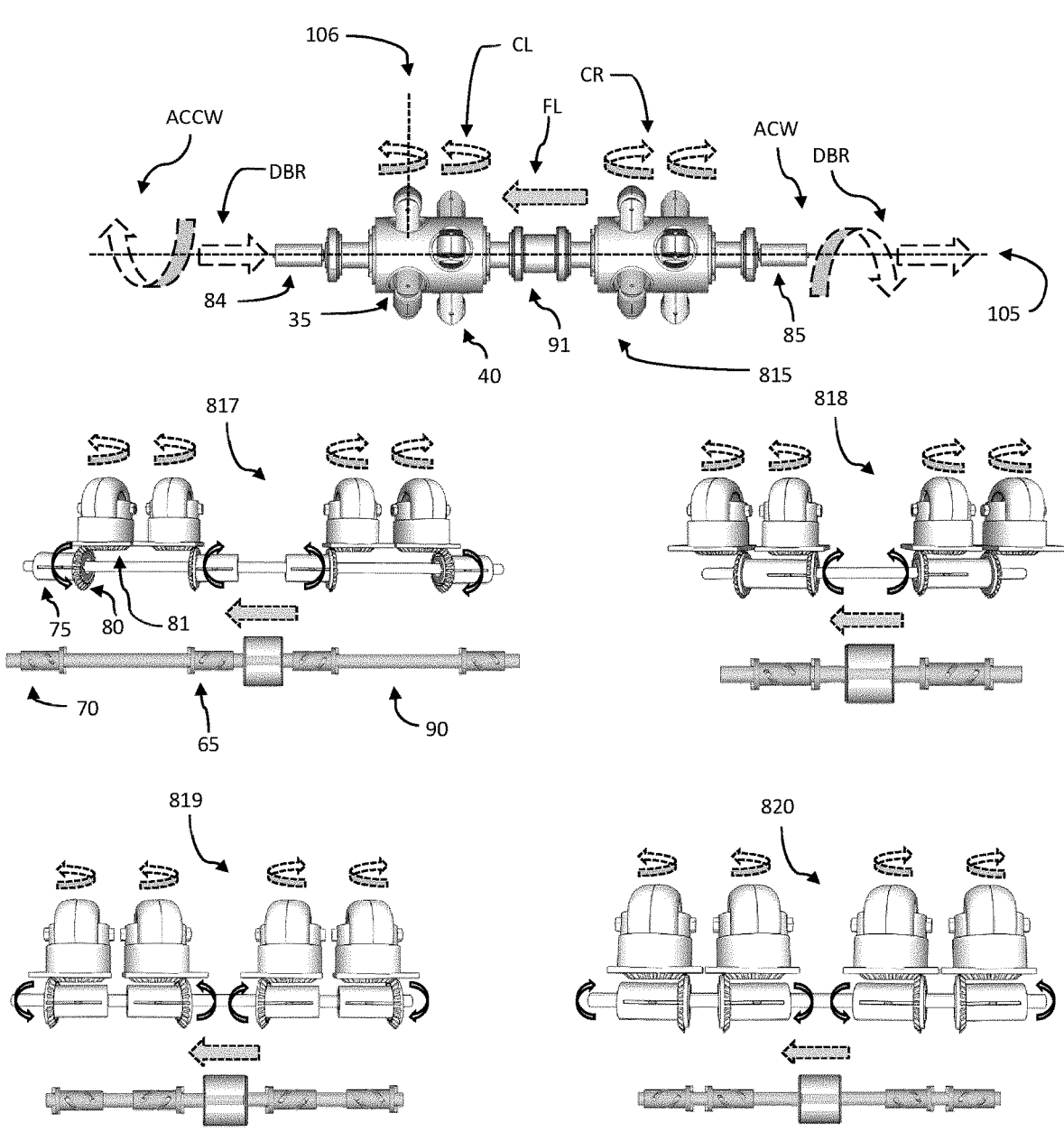
FIG. 20 is another logical set of schematic tridimensional view.

817   Design 817 is a lateral view of two intercalated rows 34 of angular wheels 40
      constituted of two angular wheels in which each one of the swiveling casters
      35 is engaged respectively right and left laterally with each a dual
      configuration of central right and left external rotatable cam bushing cage
      configuration 65 and 70 respectively solidary with a total of four actuating
      miter gears 80 derived from design 154 of FIG. 12; where in which, such as
      deriving from the design 207 of FIG. 13 and design 419 of FIG. 15 and
      design 452 of FIG. 16 and design 813 of FIG. 19, there is one first central
      transmission shaft 5 and there is one first external rotatable bushing cage
      functionally external and oriented respectively towards engaging within part
      of a solidary miter gear 80 engaging on the left side respectively a first caster
      35 from the left outer limit of the distance and location 99-a towards
      engaging within centrally one miter gear 81 engaged on the left side
      respectively of a first caster 35 from the left; and where in which, in the first
      central transmission shaft 5 there is one second external rotatable bushing
      cage functionally external and oriented respectively towards engaging within
      part of a solidary miter gear 80 engaging on the right side respectively a
      second caster 35 from the right outer limit of the distance and location 99-a
      towards engaging within centrally one miter gear 81 engaged on the right
      side respectively of a second caster 35 from the left; and where in which,
      there is a second central transmission shaft 5 and there is one third external
      rotatable bushing cage functionally external and oriented respectively
      towards engaging within part of a solidary miter gear 80 engaging on the left
      side respectively of a third caster 35 from the left outer limit of the distance
      and location 99-a towards engaging within centrally one miter gear 81
      engaged on the left side respectively of a third caster 35 from the left; and
      where in which, in the second central transmission shaft 5 there is one fourth
      external rotatable bushing cage functionally external and oriented
      respectively towards engaging within part of a solidary miter gear 80
      engaging on the right side respectively of a fourth caster 35 from the right
      outer limit of the distance and location 99-a towards engaging within
      centrally one miter gear 81 engaged on the right side respectively of a fourth
      caster 35 from the left; and which in respect to the logical layout of the
      embodiment of the drive shaft displayed in design 817 of FIG. 20 with
      external rotatable drive shaft bushings actuated in respect to FIGS. 5, 6 and
      7 and their descriptions, would consequentially actuate and generate,
      according the layout of the design 815 applicable in all principles for the
      design 817, a variable translational and linear displacement orientation of
      plane B to the right such as defined in the design 815 of FIG. 20 by DBR.

818   Design 818 is a lateral view of four intercalated rows 34 of angular wheels
      40 constituted of four angular wheels evenly displayed in two pairs among
      two central transmission shafts in which each one pair of the swiveling
      casters 35 is engaged respectively right and left laterally with a configuration -continued of a two central right and left external rotatable cam bushing cage
configuration 65 or 70 respectively solidary evenly with four actuating miter
gears 80 derived from design 155 of FIG. 12; where in which, such as
deriving from design 211 of FIG. 13 and design 410 of FIG. 14 and design
607 of FIG. 17 and design 808 of FIG. 18 and design 814 of FIG. 19,
there is one first external rotatable bushing cage functionally, partly or in
whole, internal and oriented respectively towards engaging within part of
two solidary miter gears 80 engaging the right side respectively of the first
and second casters 35 from within the right outer limit of the distance and
location 99-b towards engaging within centrally two miter gears 81 engaged
on the right side respectively of the first and second casters 35 from the left;
and where in which, such as deriving from design 211 of FIG. 13 and
design 410 of FIG. 14 and design 607 of FIG. 17 and design 808 of FIG.
18 and design 814 of FIG. 19, there is one second external rotatable
bushing cage functionally, partly or in whole, internal and oriented
respectively towards engaging within part of two solidary miter gears 80
engaging the left side respectively of the third and fourth casters 35 from
within the left outer limit of the distance and location 99-b towards engaging
within centrally two miter gears 81 engaged on the left side respectively of
the third and fourth casters 35 from the left; and which in respect to the
logical layout of the embodiment of the drive shaft displayed in design 818
with external rotatable drive shaft 90 bushings actuated in respect to FIGS.
5, 6 and 7 and their descriptions, would consequentially actuate and generate,
according the layout of the design 815, applicable in all principles for the
design 818 in FIG. 20, a variable translational and linear displacement
orientation of plane B to the right as defined in the drawing by DBR.
Design 819 is a lateral view of four intercalated rows 34 of angular wheels
40 constituted of four angular wheels evenly displayed in two pairs among
two central transmission shafts in which each one of the swiveling casters 35
819    is engaged respectively left or right laterally with a configuration of a four
central right and left external rotatable cam bushing cage configuration 65 or
70 respectively solidary with four actuating miter gears 80 derived from
design 155 of FIG. 12; where in which, such as deriving from design 211 of
FIG. 13 and design 809 of FIG. 19, there is one first external rotatable
bushing cage functionally, partly or in whole, internal and oriented
respectively towards engaging within part of one solidary miter gear 80
engaging on the left side respectively the first caster 35 from within the left
outer limit of the distance and location 99-b towards engaging within
centrally one miter gear 81 engaged on the left side respectively of a first
caster 35 from the left; and where in which, such as deriving from design
212 of FIG. 13 and design 809 of FIG. 19, there is one second external
rotatable bushing cage functionally, partly or in whole, internal and oriented
respectively towards engaging within part of one solidary miter gear 80
engaging the right side respectively of the second caster 35 from within the
right outer limit of the distance and location 99-b towards engaging within
centrally one miter gear 81 engaged on the right side respectively of the
second caster 35 from the left; and where in which, such as deriving from
design 211 of FIG. 13 and design 809 of FIG. 19, there is one third
external rotatable bushing cage functionally, partly or in whole, internal and
oriented respectively towards engaging within part of one solidary miter gear
80 engaging on the left side respectively the third caster 35 from within the
left outer limit of the distance and location 99-b towards engaging within
centrally one miter gear 81 engaged on the left side respectively of a third
caster 35 from the left; and where in which, such as deriving from design
212 of FIG. 13 and design 809 of FIG. 19, there is one fourth external
rotatable bushing cage functionally, partly or in whole, internal and oriented
respectively towards engaging within part of one solidary miter gear 80
engaging the right side respectively of the fourth caster 35 from within the
right outer limit of the distance and location 99-b towards engaging within
centrally one miter gear 81 engaged on the right side respectively of the
fourth caster 35 from the left; and which in respect to the logical layout of
the embodiment of the drive shaft displayed in design 819 with external
rotatable drive shaft 90 bushings actuated in respect to FIGS. 5, 6 and 7 and
their descriptions, would consequentially actuate and generate, according the
layout of the design 815, applicable in all principles for the design 819 in
FIG. 20, a variable translational and linear displacement orientation of
plane B to the right as defined in the drawing by DBR.
820    Design 820 is a lateral view of four intercalated rows 34 of angular wheels
40 constituted of four angular wheels evenly displayed in two pairs among
two central transmission shafts in which each one of the swiveling casters 35
is engaged respectively right or left laterally with a configuration of a four
central right and left external rotatable cam bushing cage configuration 65 or
70 respectively solidary with four actuating miter gears 80 derived from
design 155 of FIG. 12; ; where in which, such as deriving from design 212
of FIG. 13 and design 810 of FIG. 19, there is one first external rotatable
bushing cage functionally, partly or in whole, internal and oriented
respectively towards engaging within part of one solidary miter gear 80
engaging the right side respectively of the first caster 35 from within the
right outer limit of the distance and location 99-b towards engaging within centrally one miter gear 81 engaged on the right side respectively of the first caster 35 from the left; and where in which, such as deriving from design 211 of FIG. 13 and design 810 of FIG. 19, there is one second external rotatable bushing cage functionally, partly or in whole, internal and oriented respectively towards engaging within part of one solidary miter gear 80 engaging on the left side respectively the second caster 35 from within the left outer limit of the distance and location 99-b towards engaging within centrally one miter gear 81 engaged on the left side respectively of a second caster 35 from the left; and where in which, such as deriving from design 212 of FIG. 13 and design 810 of FIG. 19, there is one third external rotatable bushing cage functionally, partly or in whole, internal and oriented respectively towards engaging within part of one solidary miter gear 80 engaging the right side respectively of the third caster 35 from within the right outer limit of the distance and location 99-b towards engaging within centrally one miter gear 81 engaged on the right side respectively of the third caster 35 from the left; and where in which, such as deriving from design 211 of FIG. 13 and design 810 of FIG. 19, there is one fourth external rotatable bushing cage functionally, partly or in whole, internal and oriented respectively towards engaging within part of one solidary miter gear 80 engaging on the left side respectively the fourth caster 35 from within the left outer limit of the distance and location 99-b towards engaging within centrally one miter gear 81 engaged on the left side respectively of a fourth caster 35 from the left; and which in respect to the logical layout of the embodiment of the drive shaft displayed in design 820 with external rotatable drive shaft 90 bushings actuated in respect to FIGS. 5, 6 and 7 and their descriptions, would consequentially actuate and generate, according the layout of the design 815, applicable in all principles for the design 820 in FIG. 20, a variable translational and linear displacement orientation of plane B to the right as defined in the drawing by DBR.

1005    Design 1005 is a lateral view of five intercalated rows 34 of angular wheels 40 constituted into a five intercalated angular wheel row design of a one central transmission shaft 5 design driven in the rotational plane orientation A to the central drive system 5 radial to axis of rotation 105 for a displacement device 110 and embodiment 1006.

1006    Design embodiment 1006 is a schematic tridimensional view of design 1005 with five intercalated rows 34 of angular wheels 40 constituted into a five intercalated angular wheel row design of the central transmission shaft 5 driven in the rotational plane orientation A to the central drive system 5 radial to axis of rotation 105 and solidary to a same actuating drive shaft 90 with attachment device 110 and made alternatively possible namely by designs 154 and 155 of FIG. 12, and in itself by design 155 of FIG. 12.

Figure 21:
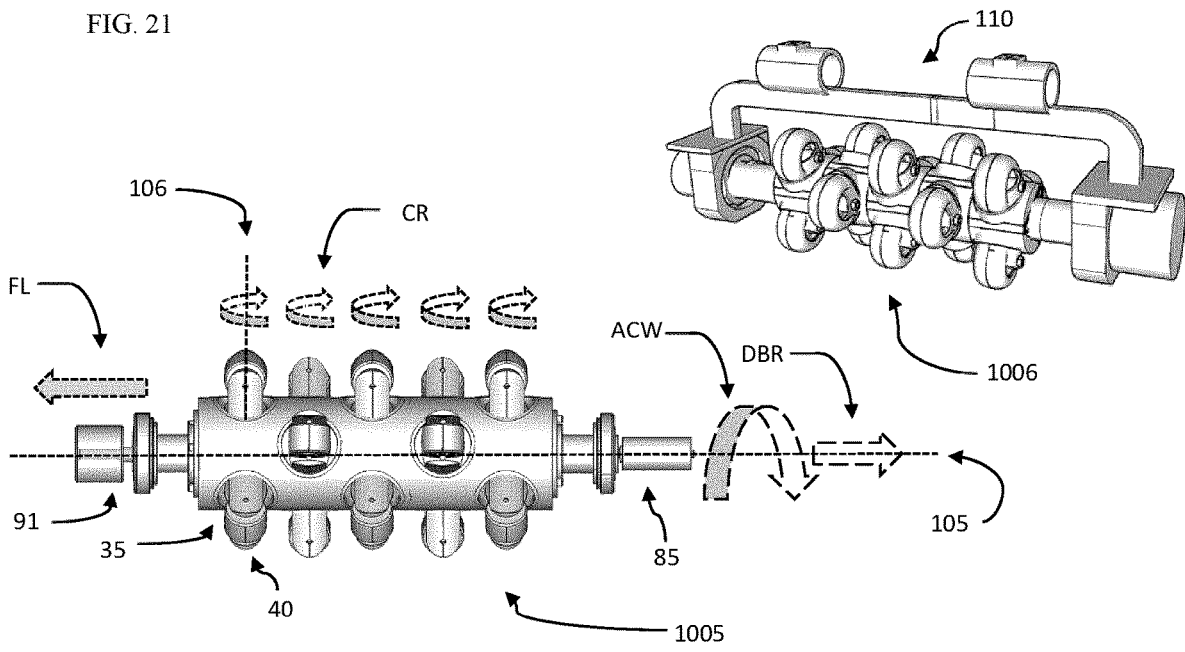
FIG. 21 is another logical set of schematic tridimensional view.
Figure 21:
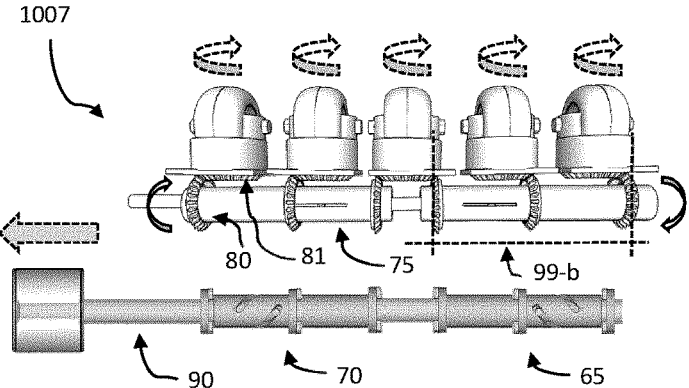

1007    Design 1007 is a lateral view of five intercalated rows 34 of angular wheels 40 constituted of five angular wheels in which each one of the swiveling casters 35 is engaged respectively left or right laterally with a configuration of a two central right and left external rotatable cam bushing cage configuration 65 or 70 respectively solidary with six actuating miter gears 80 derived from design 155 of FIG. 12; where in which, such as deriving from design 211 of FIG. 13 and design 410 of FIG. 14 and design 607 of FIG. 17 and design 808 of FIG. 18, there is one first external rotatable bushing cage functionally, partly or in whole, internal and oriented respectively towards engaging within part of three solidary miter gears 80 engaging the left side respectively of the first, second and third casters 35 from within the left outer limit of the distance and location 99-b towards engaging within centrally three miter gears 81 engaged on the left side respectively of the first, second and third casters 35 from the left; and where in which, such as deriving from design 211 of FIG. 13 and design 410 of FIG. 14 and design 607 of FIG. 17 and design 808 of FIG. 18, there is one second external rotatable bushing cage functionally, partly or in whole, internal and oriented respectively towards engaging within part of three solidary miter gears 80 engaging the right side respectively of the third, fourth and fifth casters 35 from within the right outer limit of the distance and location 99-b towards engaging within centrally three miter gears 81 engaged on the right side respectively of the third, fourth and fifth casters 35 from the left; and which in respect to the logical layout of the embodiment of the drive shaft displayed in design 1007 with external rotatable drive shaft 90 bushings actuated in respect to FIGS. 5, 6 and 7 and their descriptions, would consequentially actuate and generate, according the layout of the design 1005, applicable in all principles for the design 1007 in FIG. 21, a variable translational and linear displacement orientation of plane B to the right as defined in the drawing by DBR.

1205    Design 1205 is a lateral view of six intercalated rows 34 of angular wheels 40 constituted into a six intercalated angular wheel row design of a one central transmission shaft 5 design driven in the rotational plane orientation A to the central drive system 5 radial to axis of rotation 105 for a displacement device 110 and embodiment 1206.

1206    Design embodiment 1006 is a schematic tridimensional view of design 1005 with five intercalated rows 34 of angular wheels 40 constituted into a five intercalated angular wheel row design of the central transmission shaft 5 driven in the rotational plane orientation A to the central drive system 5

-continued

Figure 22:
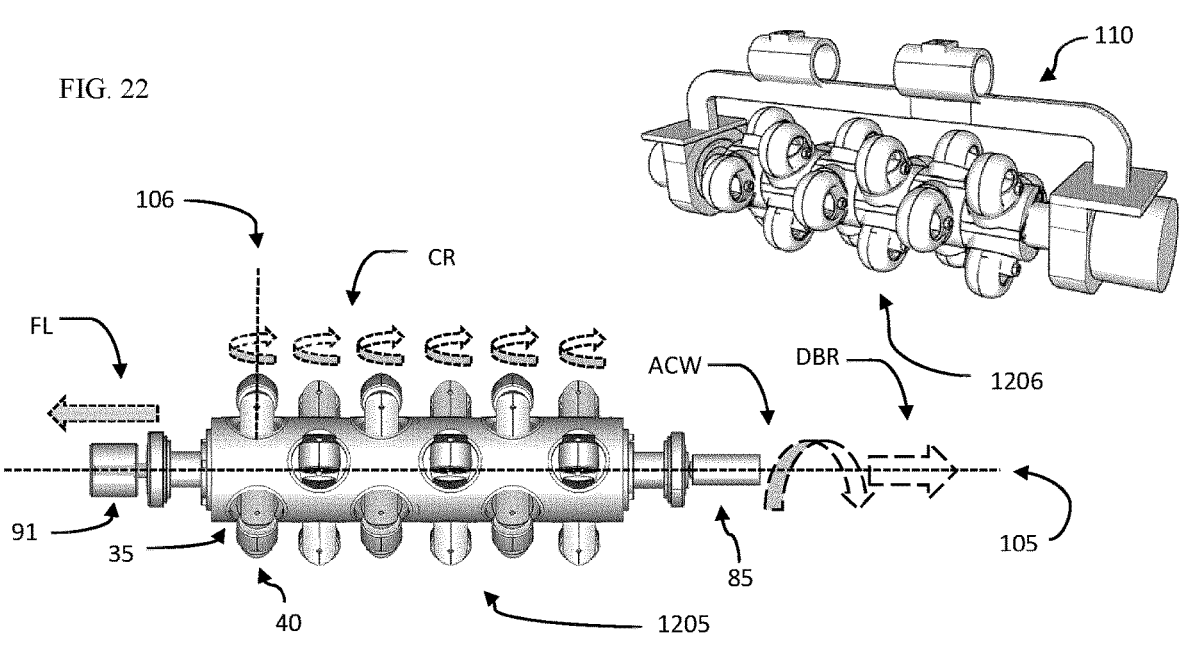
FIG. 22 is another logical set of schematic tridimensional view.
Figure 22:
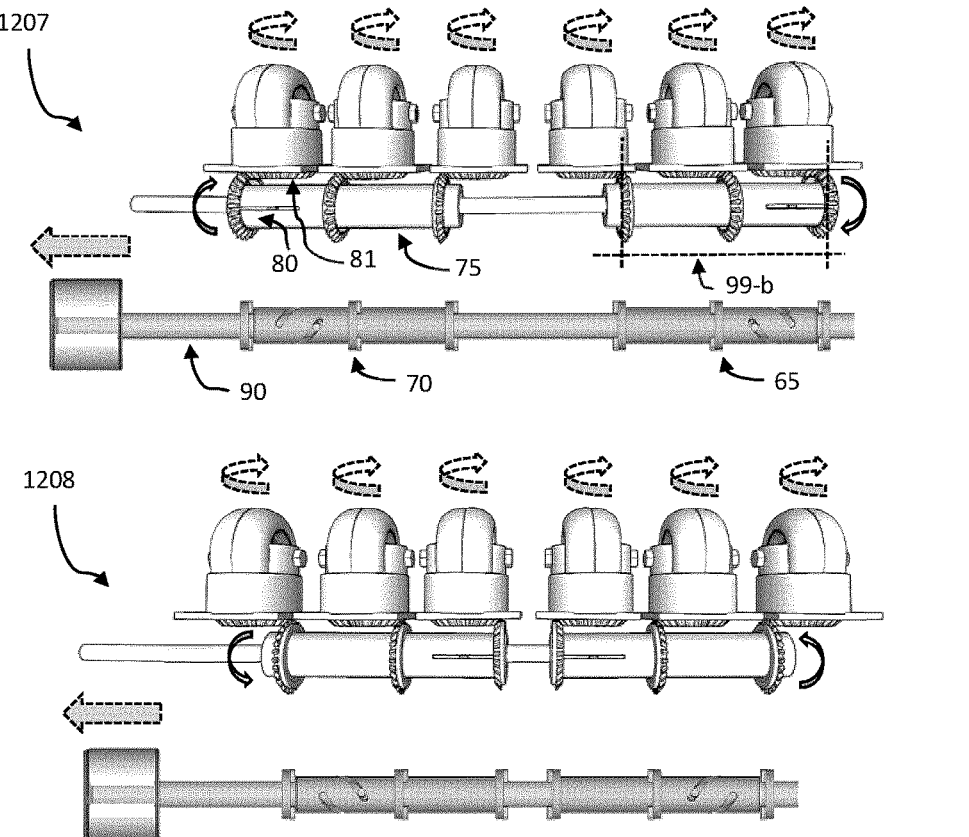

| | |
|---|---|
| | radial to axis of rotation 105 and solidary to a same actuating drive shaft 90 with attachment device 110 and made alternatively possible namely by designs 154 and 155 of FIG. 12, and in itself by design 155 of FIG. 12. |
| 1207 | Design 1207 is a lateral view of six intercalated rows 34 of angular wheels 40 constituted of six angular wheels in which each one of the swiveling casters 35 is engaged respectively left or right laterally with a configuration of a two central right and left external rotatable cam bushing cage configuration 65 or 70 respectively solidary with six actuating miter gears 80 derived from design 155 of FIG. 12; where in which, such as deriving from design 211 of FIG. 13 and design 410 of FIG. 14 and design 607 of FIG. 17 and design 808 of FIG. 18 and design 1007 of FIG. 21, there is one first external rotatable bushing cage functionally, partly or in whole, internal and oriented respectively towards engaging within part of three solidary miter gears 80 engaging the left side respectively of the first, second and third casters 35 from within the left outer limit of the distance and location 99-b towards engaging within centrally three miter gears 81 engaged on the left side respectively of the first, second and third casters 35 from the left; and where in which, such as deriving from design 211 of FIG. 13 and design 410 of FIG. 14 and design 607 of FIG. 17 and design 808 of FIG. 18 and design 1007 of FIG. 21, there is one second external rotatable bushing cage functionally, partly or in whole, internal and oriented respectively towards engaging within part of three solidary miter gears 80 engaging the right side respectively of the fourth, fifth and sixth casters 35 from within the right outer limit of the distance and location 99-b towards engaging within centrally three miter gears 81 engaged on the right side respectively of the fourth, fifth and sixth casters 35 from the left; and which in respect to the logical layout of the embodiment of the drive shaft displayed in design 1207 with external rotatable drive shaft 90 bushings actuated in respect to FIGS. 5, 6 and 7 and their descriptions, would consequentially actuate and generate, according the layout of the design 1205, applicable in all principles for the design 1207 in FIG. 22, a variable translational and linear displacement orientation of plane B to the right as defined in the drawing by DBR. |
| 1208 | Design 1208 is a lateral view of six intercalated rows 34 of angular wheels 40 constituted of six angular wheels in which each one of the swiveling casters 35 is engaged respectively right or left laterally with a configuration of a two central right and left external rotatable cam bushing cage configuration 65 or 70 respectively solidary evenly with six actuating miter gears 80 derived from design 155 of FIG. 12; where in which, such as deriving from design 211 of FIG. 13 and design 410 of FIG. 14 and design 607 of FIG. 17 and design 807 of FIG. 18 and design 1207 of FIG. 1205, there is one first external rotatable bushing cage functionally, partly or in whole, internal and oriented respectively towards engaging within part of three solidary miter gears 80 engaging the right side respectively of the first, second and third casters 35 from within the right outer limit of the distance and location 99-b towards engaging within centrally three miter gears 81 engaged on the right side respectively of the first and second casters 35 from the left; and where in which, such as deriving from design 211 of FIG. 13 and design 410 of FIG. 14 and design 607 of FIG. 17 and design 807 of FIG. 18 and design 1207 of FIG. 1205, there is one second external rotatable bushing cage functionally, partly or in whole, internal and oriented respectively towards engaging within part of three solidary miter gears 80 engaging the left side respectively of the fourth, fifth and sixth casters 35 from within the left outer limit of the distance and location 99-b towards engaging within centrally three miter gears 81 engaged on the left side respectively of the fourth, fifth and sixth casters 35 from the left; and which in respect to the logical layout of the embodiment of the drive shaft displayed in design 1208 with external rotatable drive shaft 90 bushings actuated in respect to FIGS. 5, 6 and 7 and their descriptions, would consequentially actuate and generate, according the layout of the design 1205, applicable in all principles for the design 1208 in FIG. 18, a variable translational and linear displacement orientation of plane B to the right as defined in the drawing by DBR. |

The eighth category, covered by FIGS. 23 and 24, presents the device system 110 with central transmission shaft 5 being oriented towards engaging within the axis of rotation 105 of the central transmission shaft 5 which is as well the rail driving orientation.

The central transmission shaft 5 circulates along and through tubular rail 115 and/or displacement field 125 along open circular cross sections of tubular rail 120 and/or displacement field 125.

The ninth category, covered mainly by FIGS. 25 to 36, present the motorization of the central transmission shaft 5 and the relation with angular wheels 40 angular position variation relative to induction actuator 41 relative to the generation of magnetic flux in displacement field 125.

The rotation A of the central transmission shaft 5 in its central axis 105 and the direction of such rotation, ACW or ACCW, of the central transmission shaft 5, are generally applied and determined from a motorization source 85 or additional motorization source 86 set onto either the central transmission shaft 5 and/or at least one angular wheel 40 and/or at least one induction actuator 41 which can be drivingly engaged for example with a mechanical 85 or induction source 125; and can thereby include portions of the rail 115 and of the displacement and induction field differentiating direction of electromagnetic and superconducting potentialities 125, namely relating with the energy supply of the tubular rail 115 or from displacement device 110 forming with central transmission shaft 5 transportation system, whether direct or alternative current; and can thereby include induction function in and with other portions of a central transmission shaft 5, such as, and not limited to, the main support member 4 as A4, or flange 10 and/or 15 as A1015, and not limited to, for the main propelling force of the inventive drive system device, which may imply part of the swiveling angular wheel caster and/or aligning inductor-aligned capacitor 35 as A35, the angular wheel 40 and/or induction actuator 41, the angular wheel axle 50 as A50, the angular wheel coating 45 as A45 with induction actuator components, the caster bore for the angular wheel axel 38 as A38, and the retaining element of the swiveling angular wheel caster 37 as A37. Therefore, the drive shaft can be conductive and conducted, and be driven by means of variations of inductive and capacitive reactance to the displacement and induction field differentiating direction of electromagnetic and superconducting potentialities 125.

Alternative means of supplying the energy for the actuation of drive shaft 5 along within rail 115 and in relation with displacement field 125, can include, and not limited to, the central transmission shaft A4, caster A35, bore A38, wheel and hub A35, coating A40, axel A50, including all other aforesaid potentially actuating components such as wheels, not shown in the drawings, being axial to the rail 115 while being relative and solidary to the displacement device 110, can supply and be supplied directly or indirectly by active and/or passive means such as with, and not limited to, piezoelectrical devices and akin along the rail 115 as A115 and in itself the displacement field device 125 as A125.

Whether one central drive system 5 is, or is not, directly, or indirectly driven, such as through being only pushed or pulled for example, the progressive variation C of the angular wheels 40 can be of a great interest to execute the function of breaking at 0 degree. In such display, the angular wheels 40 are idling with their axis of rotation 108 being parallelly positioned in respect to the longitudinal direction 105 of the rails 115 and of the central transmission shaft 5 or of a central idling shaft 5 which remains in a stationary moment in respect to the linear speed and linear direction B of the drive system with central transmission shaft 5 and displacement device 110 in respect to its displacement rail 115, and as such, independently of the axial rotation A of the central drive 5 and idling shafts 5 rotational movement in the axis of rotation 105.

The axial rotation A of the central idling shaft 5 can be progressively reduced to none if the progressive variation C of the angular wheels reaches plus 90 degrees or minus 90 degrees from its middle idling position set at 0 degree. Thereby the angular rollers 40 can be set in a pure progressive idling position when the angular wheels progressively reach plus 90 degrees or minus 90 degrees with respect to their axis of rotation being perpendicularly positioned at 0 degree in respect to the longitudinal direction of the rails 105 and radial 106 to the axis 105 of rotation of the central transmission shaft 5.

In drawings 25 and 26, and 27 to 30, there are respectively a lateral view and schematic tridimensional view of the design for the drive shaft 5 and tubular rail 115 with displacement field apparatus 125.

In the drawings 25 and 26, the given alternative embodiments relative to the induction actuator 41 and relative to drive shaft 5 can imply multiple sources and possibilities of induction interaction as being a prime mover actuator, the displacement field 125 being a secondary actuator relative to mover drive shaft 5.

The prime mover drive shaft 5 can comprised, and not be limited to the drive system device 5, of the swiveling angular wheel caster and/or aligning inductor-aligned capacitor 35 as A35 when being polarized and conducting and/or conducted inductively, such as the angular wheel 40 as A40 and/or induction actuator 41 itself, the angular wheel axle 50 as A50, the angular wheel coating 45 as A45 with induction actuator components, the caster bore for the angular wheel axel 38 as A38, and all potentially suitable and implied parts being solidary with the main central shaft 4 as A4, and the flanges 10 and 15 as A1015.

For example, the variation of the casters 35 as A35 polarity and angular position C, and the rotation A and the polarity of the drive shaft 5 in themselves along a full range of variable capacitive and inductive reactance with the interface of the displacement field 125 along and preferably within the tubular rail 115, with direct surface of contact and of displacement field 116 which limits the airgap.

A design with a closed tubular rail 115 may also be possible, and thus with having a capsule with live load inside the rail, for say between two terminals (pigs for pipelines, in-pipe inspection robots), and/or with having as well an a bonding field connected apparatus with an outside capsule from a closed rail 115 being capable of following the inside drive-shaft with a retaining electromagnetic field as a displacement device with the transportation system carrying the load.

In drawings 25 to 29, the polarization motorization field 125 of displacement occurs as patterns of magnetic flux direction along a tubular linearly axial and radial, with configuration of actuating stators ML for axial linear thrust in MLF induction force field potential and with configuration of actuating stators MYZ for axial and radial thrust in MYZFA and/or MYZFB induction force field potentials for the actuation of the induction actuators 41 both linearly in the L axis of linear inducting centerline and both Y and/or Z axis of radial inducting centerlines.

ML is the main axial linear inducting stator switcher of displacement and induction field differentiated direction of electromagnetic and superconducting potentialities.

MZY is the main axial radial and axial inducting stator switcher of displacement and induction field differentiating direction of electromagnetic and superconducting potentialities.

From drawing 28, MLF and MYZFA and MYZFB stators can be excited with a magnetic flux along solenoidal coils and/or permanent magnets that direct the inductive reactance axially for the MLF stators and both axially and radially for the MYZFA and MYZFB stators. The design and invention are not limited to such inductive reactance variation approach only. For instance, there could be an embodiment there in which apply superconducting magnets that can provide alternative inductive and capacitive reactance for the actuation of the induction actuators 41.

In drawing 29, the displacement field 125 embodiment is generated with ML and MYZ stators which interact by means of L, Y and Z crossings, and defined preferably but not limited to, junctions and relays of inductive and capacitive reactance. When combined, the crossings of L, Y and Z axis execute the function of directing a magnetic flux along junction relays for the actuators 41 poles YA and YB to be controlled along differentiating and differentiated directions of electromagnetic and superconducting potentialities in themselves determining the direction and speed of the drive shaft 5 with axial and radial Halbach arrays variations.

YA is the main radial and axial induction actuator 41 primary mover pole.

YB is the main radial and axial induction actuator 41 primary mover pole.

The interaction of the axial L and radial Y and Z stators and junction relays with permanent magnets and/or coils of the primary induction actuator 41 each having polarized endings that can interact both variably and produce a variable the AMF (alternative magnetic field) to generate a torque induction produced in the direction of YZ. The axis of orientation perpendicular to the 108 axis is YZ axis, both being about a radial axis 106 to the axis 105, being correlated to angular position C of the angular wheel 40.

The angular position of YZ variates correlatively with the main mechanism the aforementioned mechanism within drive shaft 5, and can actuate either linearly along attractive and repulsive forcefields of induction in axis L and/or angularly along said attractive and repulsive forcefields induction in radial and axial induction circumferential axis Z and Y all of which determines the direction and speed of the drive shaft 5 with interacting with the axial and radial Halbach array actuating variations.

Through drawings 30 to 36, the displacement field are herein described as follows:

L is the main axis of the linear, said axial more properly, inducting centerline stator switcher of displacement and induction field differentiated direction of electromagnetic and superconducting potentialities.

L axis can decline in both as LA1, LA2, LA3, and more, symmetrically from L as the main linear centerline, and in LB1, LB2, LB3, and more, as well symmetrically from L as the main axial centerline of all axial centerlines which directs inductive reactance thrust axially along the MLF stators; which produces axially and linearly a Halbach array which is interacting and inversing variably; and which the polarization from the magnetic flux frequency is axially driving the inducting actuators 41 along Y centerlines being alternated in the axial direction of L axis, and that can provide both axial and radial centerlines.

Y axis can decline in both as Y1, Y2, Y3, and more, starting from the first inductive MYZ stator perpendicularly to L as the main radial centerline which directs inductive reactance thrust axially along the MYZ stators. When the MYZ stators are interacting with angular wheels at a degree between plus 90 degrees and minus 90 degrees, the stators in ML are variably delayed at junction relays and thus preferably in the capacitive form.

Y is the main radial and axial inducting centerline switcher for the displacement and induction field differentiating direction of electromagnetic and superconducting potentialities of induction actuators 41.

The actuators 41 are comprised of primary moving poles YA and YB interacting about the MYZFA and/or MYZFB induction force field potential axial and radial patterns being led by the main driving interacting magnetic flux along junction relays for the actuators 41 poles YA and YB.

The embodiment of FIGS. 30 to 36 is a simple and innovative approach being a turnkey solution with the variation of angular position C of angular wheels 40 and actuating magnetic fluxes and inductive force fields to generate transportation magnetic fields suited for helical traction and propulsion.

The angular position C of the angular wheels 40 can be variably following the YA and YB pattern of L, Y and Z crossings, and its control can be correlated preferably along the differentiating and differentiated directions of electromagnetic and superconducting potentialities in sync with the direction and speed occurring at force moment 107 with axial and radial Halbach arrays variations.

Inductive reactance is produced within a cylindrical Halbach actuator array, axially with MLF, and/or radially and axially with MYZ within Halbach arrays interacting and inversing variably the polarization along the L axis as crossing switches of junction relays actuated by the magnetic flux induced by the actuators 41 YA and YB.

The switching of Halbach arrays along MLF and MYZ interact directly with YA and YB of the LAB of the actuators 41, and can be the central transmission shaft itself A4, for example.

The LAB is the correlated axis of Halbach array angular drive of induction actuator 41 within axis 108 of angular wheel 40.

Figure 31:
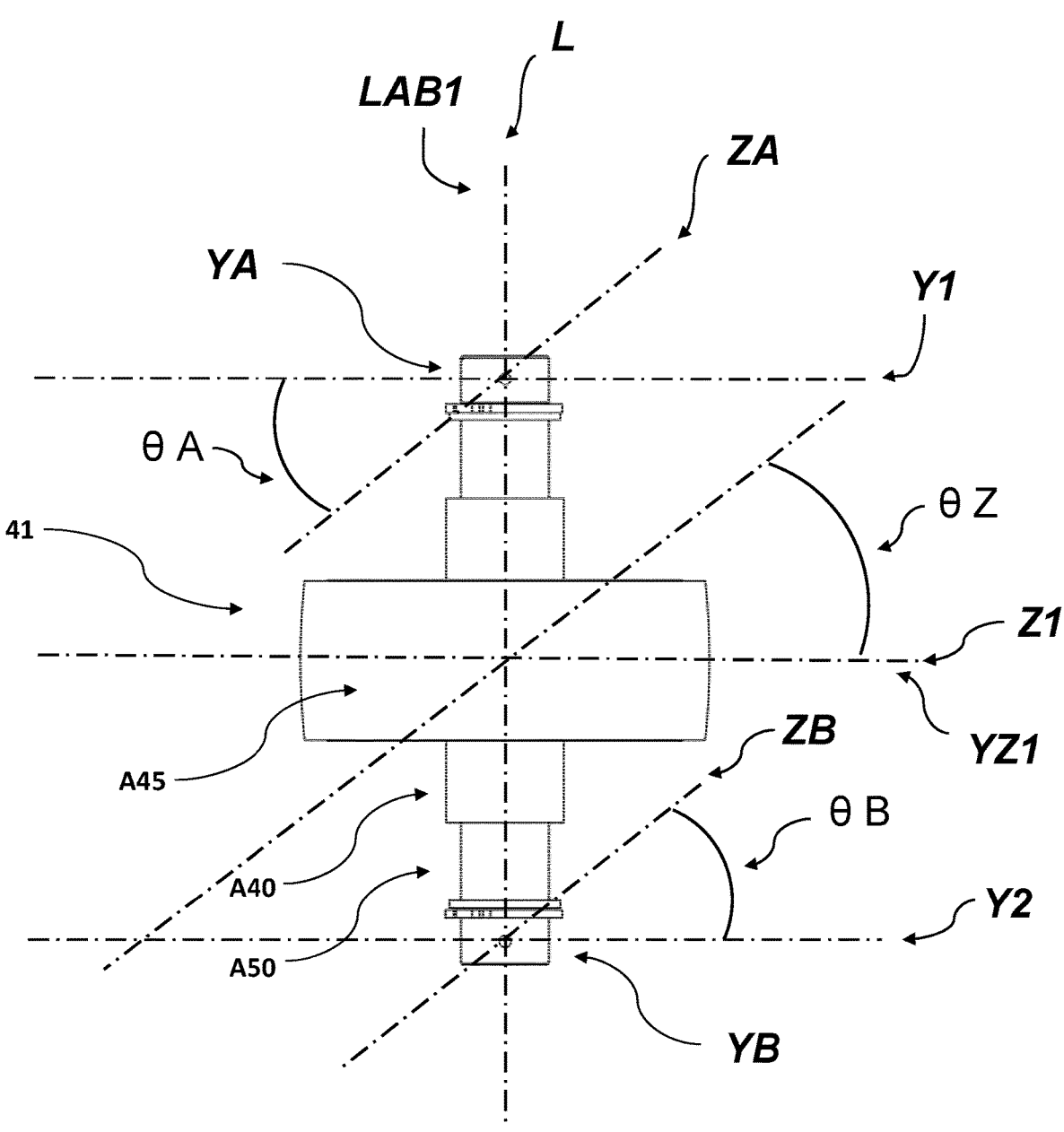
FIG. 31 is a schematic view of the embodiment induction angular wheel and/or induction actuator mechanically and applied invention of a displacement and induction field differentiating direction of electromagnetic and superconducting potentialities within the particular embodiment such as shown on FIG. 1.

In FIGS. 31, ZA is the alternative magnetic field drive orientation relative to axel 50 of main YA radial and axial orientation of induction actuator 41. And ZB is the alternative magnetic field drive orientation relative to axel 50 of main YB radial and axial orientation of induction actuator 41. When ZA and ZB of are parallel to Y and Z, they are also parallelly in aligned with YZ. The axis of orientation perpendicular to the LAB is thereby YZ. In such angular position, the YA and YB of actuators 41 are correlated to the angular position C in OZ along Z centerline axis which corresponds to YZ1.

In FIG. 31, LAB1 is parallel to axis 105, being as well axis L, and YA and YB respective degrees ZA and ZB are being aligned respectively in 0A and OB along Y centerline axis, with Z aligned with YZ.

Figure 32:
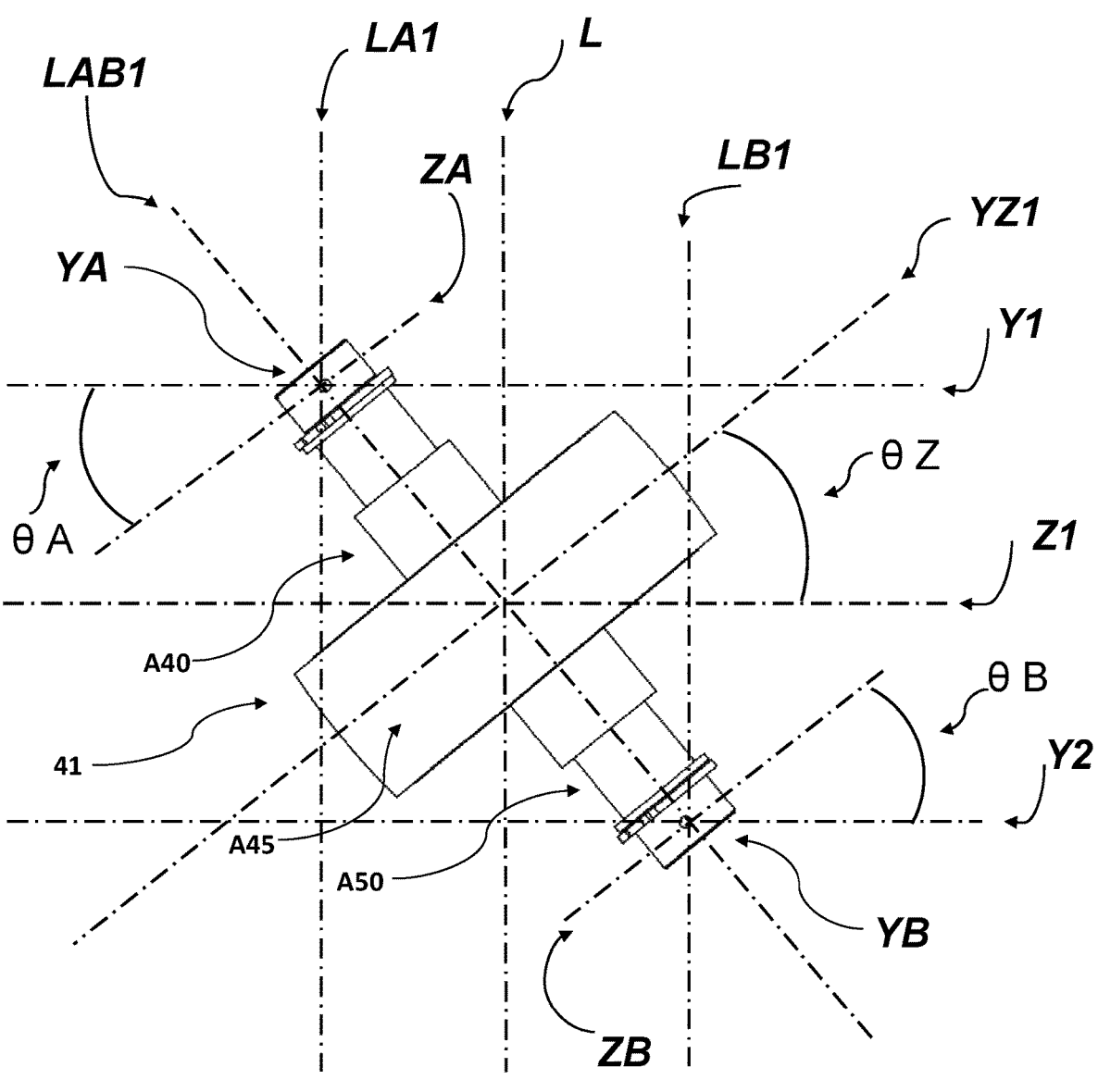
FIG. 32 is another schematic view of the embodiment induction angular wheel and/or induction actuator mechanically and applied invention of a displacement and induction field differentiating direction of electromagnetic and superconducting potentialities within the particular embodiment such as shown on FIG. 1.

In FIGS. 32, LAB1 is angular to axis 105, with YA and YB respective degrees ZA and ZB being aligned respectively in θA and θB along Y1 and LA1 centerline axis crossings and Y2 and LB1 axis crossings respectively and with Z1 aligned angularly with YZ1.

Figure 33:
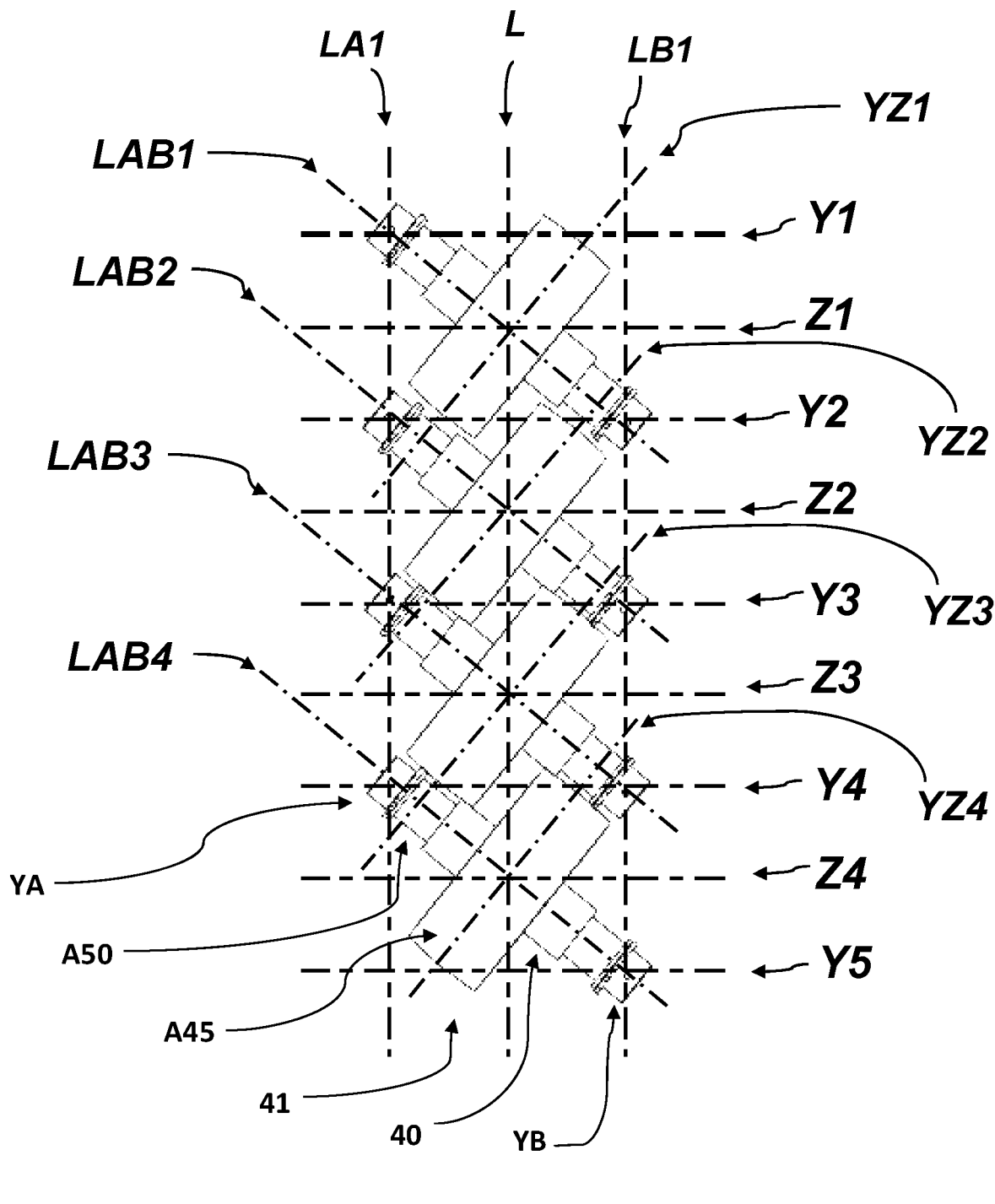
FIG. 33 is another schematic view of the embodiment induction angular wheel and/or induction actuator mechanically and applied invention of a displacement and induction field differentiating direction of electromagnetic and superconducting potentialities within the particular embodiment such as shown on FIG. 1.

In FIGS. 33, LAB1 to LAB4 are angular to axis 105, with their YA and YB respective degrees ZA and ZB being aligned respectively in θA and θB along Y1 to Y4 and LA1 centerline axis crossings and Y2 to Y5 and LB1 axis crossings respectively and with Z1 to Z 4 aligned angularly with YZ1 to YZ4.

Figure 34:
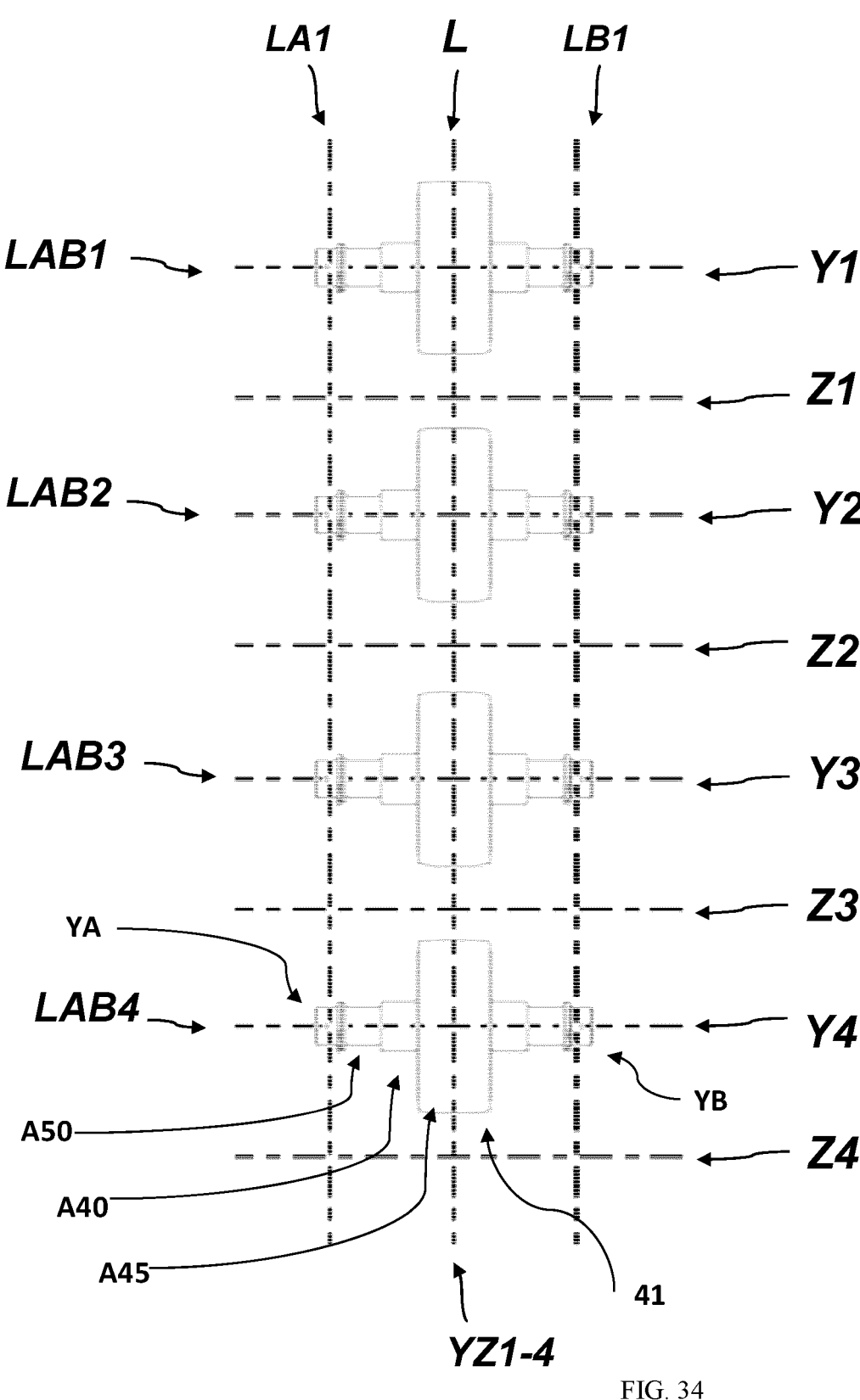
FIG. 34 is another schematic view of the embodiment induction angular wheel and/or induction actuator mechanically and applied invention of a displacement and induction field differentiating direction of electromagnetic and superconducting potentialities within the particular embodiment such as shown on FIG. 1.

In FIGS. 34, LAB1 to LAB4 are perpendicular to axis 105, with their YA and YB respective degrees ZA and ZB being aligned respectively in θA and θB along Y1 and both LA1 and LB1 centerline axis crossings, and with Z1 to Z4 being perpendicular with YZ1 to YZ4 and parallel with L.

Figure 35:
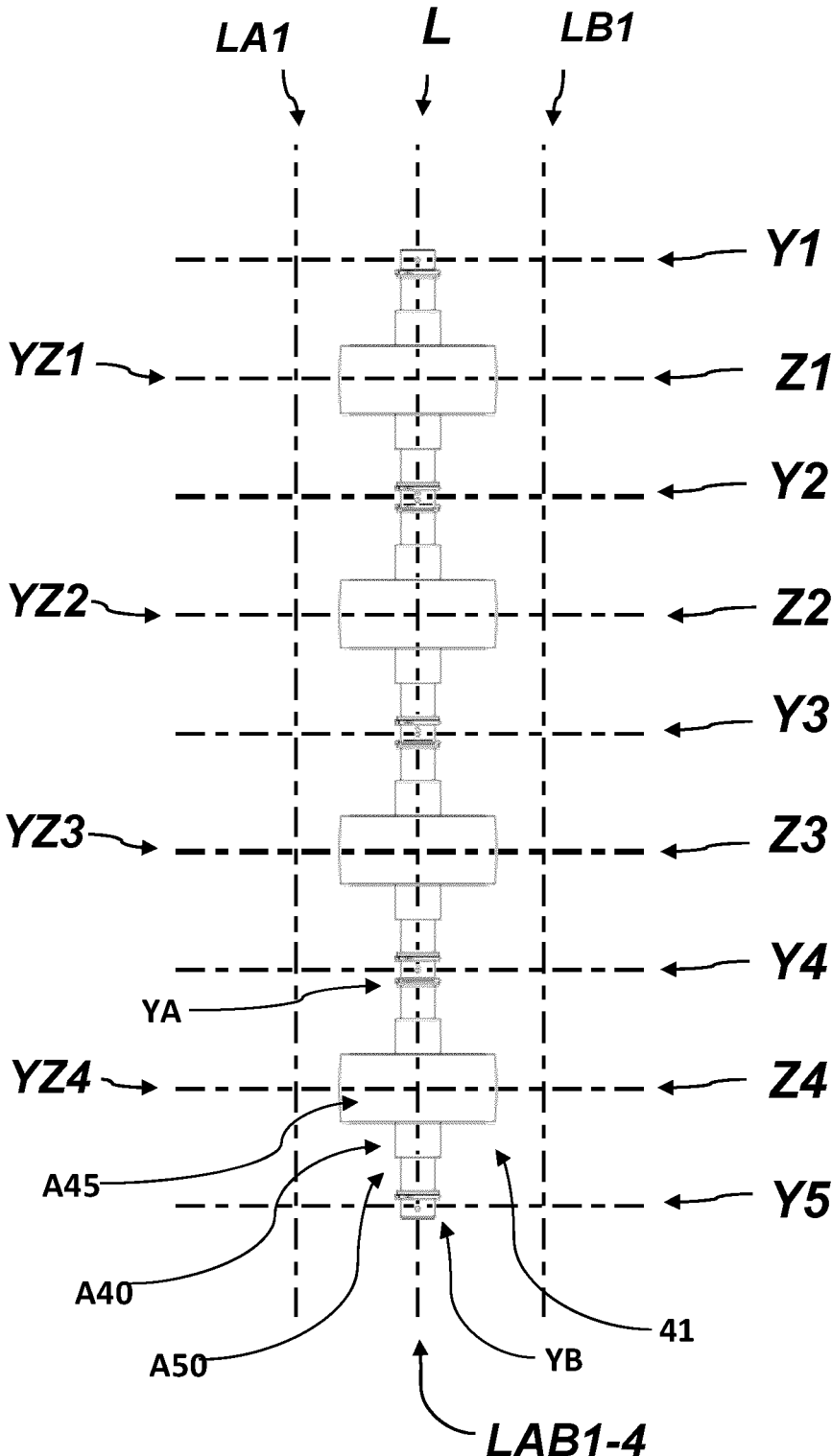
FIG. 35 is another schematic view of the embodiment induction angular wheel and/or induction actuator mechanically and applied invention of a displacement and induction field differentiating direction of electromagnetic and superconducting potentialities within the particular embodiment such as shown on FIG. 1.

In FIGS. 35, LAB1 to LAB4 are parallel to axis 105, with their YA and YB respective degrees ZA and ZB being aligned respectively in θA and θB along Y1 to Y5 along and main L centerline axis crossings and with Z1 to Z4 being parallel with YZ1 to YZ4 and perpendicular with L.

Figure 36:
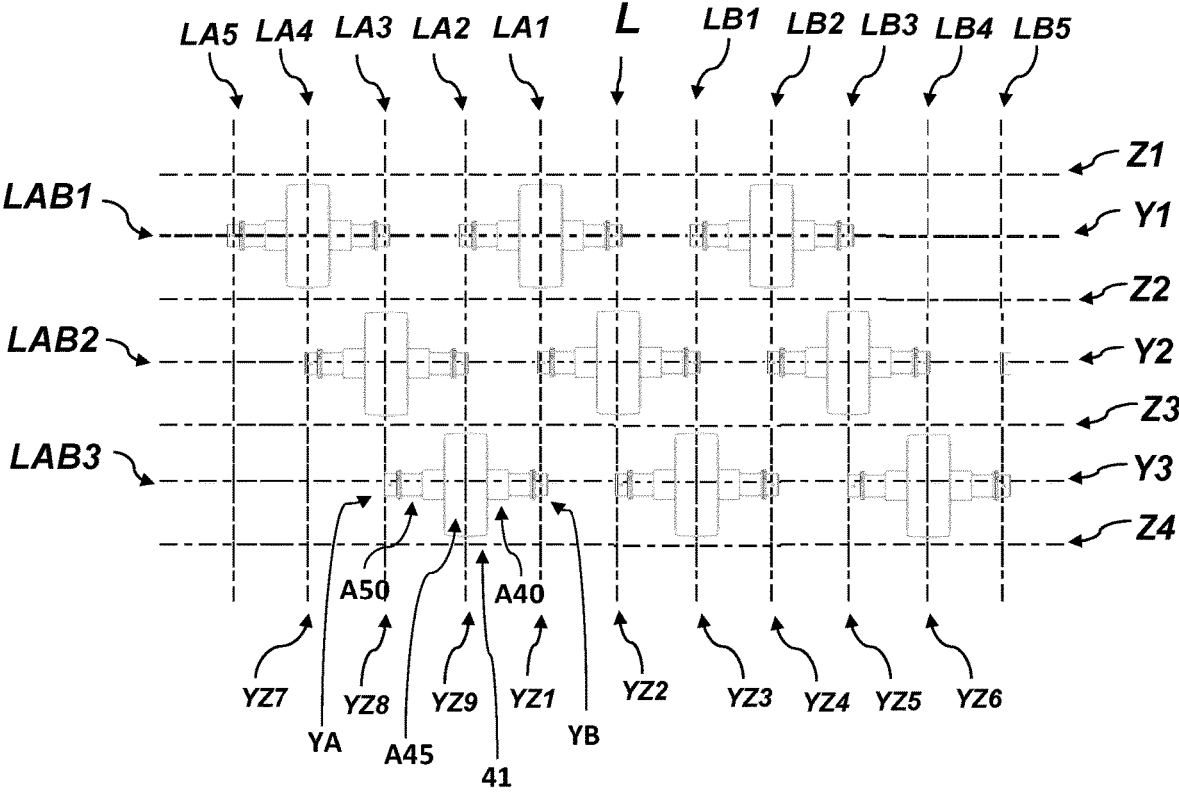
FIG. 36 is another schematic view of the embodiment induction angular wheel and/or induction actuator mechanically and applied invention of a displacement and induction field differentiating direction of electromagnetic and superconducting potentialities within the particular embodiment such as shown on FIG. 1.

In FIGS. 36, LAB1 to LAB3 are perpendicular to axis 105, with their YA and YB respective degrees ZA and ZB being aligned respectively in θA and θB along Y1 to Y3, from LA1 to LA5, and from LB1 to LB5 centerline axis crossings, and with Z2 and Z3 being perpendicular with YZ1 to YZ8 and parallel with L axis.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A continuously variable helical transmission system comprising:
a first frame;
a central drive shaft configured to rotate about its longitudinal axis within the first frame; and
a set of rotatable angled wheels attached to the first frame, each of the wheels being configured to pivot about an axis being radial to the first frame;
wherein one or more of the wheels rotatably engages a bushing assembly configured to rotate about the central drive shaft;
wherein a rotation of the central drive shaft causes the rotation of the wheels about their radial axis which results in a longitudinal translation of the first frame.

2. The continuously variable helical transmission system of claim 1, wherein the central drive shaft and the bushing assembly each comprises a different one of a radially extending projection and a helical groove, the projection being configured to engage the helical groove.

3. The continuously variable helical transmission system of claim 1, wherein each of the wheels rotates about a wheel assembly.

4. The continuously variable helical transmission system of claim 3, wherein the wheel assembly comprises a caster.

5. The continuously variable helical transmission system of claim 3, wherein the wheel assembly comprises a miter gear configured to engage the bushing assembly.

6. The continuously variable helical transmission system of claim 2, wherein the bushing assembly further comprises a bushing cage configured to radially enclose a central bushing.

7. The continuously variable helical transmission system of claim 6, wherein the bushing cage comprises a linear slot configured to receive the projection.

8. The continuously variable helical transmission system of claim 3, wherein the bushing assembly is adjacent to the wheel assembly along the longitudinal axis of the central drive shaft.

9. The continuously variable helical transmission system of claim 3, wherein the bushing assembly is radially beneath the wheel assembly.

10. The continuously variable helical transmission system of claim 1, wherein the wheels are configured to rotate such as to have a variable angle between a wheel axis and the longitudinal axis of the central drive shaft.

11. The continuously variable helical transmission system of claim 1, wherein the first frame is configured to comprise a plurality of sets of rotatable angled wheels.

12. A helical propulsion system configured to be received in a tubular rail having an open circular cross-section, and to engage an inner surface of the tubular rail, the helical propulsion system comprising the continuously variable helical transmission system of claim 1.

13. A method of varying the translation velocity of a helical drive system, the method comprising:
rotating a central drive shaft to cause the rotation of the wheels about their radial axis resulting in a longitudinal translation of the first frame;
engaging a helical groove of a bushing assembly to rotate the bushing assembly about a longitudinal axis of the central drive shaft;
rotating a set of rotatable angled wheels attached to the frame about an axis being radial to the longitudinal axis of the central drive shaft.

14. The method of claim 13, wherein engaging the helical groove of the bushing assembly comprises sliding a projection radially extending from the central drive shaft within the helical groove.

15. The method of claim 13, wherein rotating the set of rotatable angled wheels comprises rotating a plurality of angled wheel assemblies.

16. The method of claim 15, wherein rotating the set of rotatable angled wheels comprises rotating one or more primary miter gears of the bushing assembly, one or more of the primary miter gears engaging a secondary miter gear of the angled wheel assemblies.

17. The method of claim 16, wherein rotating the set of rotatable angled wheels comprises rotating the rotatable angled wheels to have a variable angle between a wheel axis and the longitudinal axis of the central drive shaft, the angle being between 0° and 360°.

18. The method of claim 13, wherein the bushing assembly is adjacent to the set of rotatable angled wheels along the longitudinal axis of the central drive shaft.

19. The method of claim 13, wherein the bushing assembly is radially beneath the set of rotatable angled wheels.

20. The method of claim 13 further comprising rotatably driving the central drive shaft.

* * * * *